(12) United States Patent
Kanayama et al.

(10) Patent No.: US 12,504,277 B2
(45) Date of Patent: Dec. 23, 2025

(54) SHAPE INSPECTION DEVICE, PROCESSING DEVICE, HEIGHT IMAGE PROCESSING DEVICE

(71) Applicant: Keyence Corporation, Osaka (JP)

(72) Inventors: Kaoru Kanayama, Osaka (JP); Takashi Atoro, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 98 days.

(21) Appl. No.: 18/644,184

(22) Filed: Apr. 24, 2024

(65) Prior Publication Data

US 2024/0271925 A1 Aug. 15, 2024

Related U.S. Application Data

(63) Continuation of application No. 17/749,174, filed on May 20, 2022, now Pat. No. 12,000,688.

(30) Foreign Application Priority Data

Jul. 20, 2021 (JP) .................................. 2021-119958

(51) Int. Cl.
*G01B 11/25* (2006.01)
*G01B 11/02* (2006.01)
(Continued)

(52) U.S. Cl.
CPC ........ *G01B 11/2522* (2013.01); *G01B 11/022* (2013.01); *G01B 11/2518* (2013.01);
(Continued)

(58) Field of Classification Search
CPC .............. G01B 11/022; G01B 11/2518; G01B 11/2522; G06T 7/50; G06T 7/60; G06T 2207/10016
See application file for complete search history.

(56) References Cited

U.S. PATENT DOCUMENTS

| 7,489,410 B2 | 2/2009 | Nishio |
|---|---|---|
| 7,667,857 B2 | 2/2010 | Nishio |

(Continued)

FOREIGN PATENT DOCUMENTS

| JP | 8178619 A | 7/1996 |
|---|---|---|
| JP | 2006189315 A | 7/2006 |

(Continued)

OTHER PUBLICATIONS

Office Action issued in corresponding Japanese Patent Application No. 2021-119958 mailed Jul. 1, 2025 (11 pages).

(Continued)

*Primary Examiner* — Michael P LaPage
(74) *Attorney, Agent, or Firm* — Kilyk & Bowersox, P.L.L.C.

(57) ABSTRACT

Provided are a shape inspection device, a processing device, a height image processing method, and a height image processing program capable of accurately inspecting a measurement object. A profile data generation unit sequentially generates a plurality of pieces of profile data as the measurement object relatively moves in a Y-axis direction. A height image generation unit extracts characteristic points for the respective pieces of profile data, and moves the respective pieces of profile data in a plane intersecting with a Y axis such that the extracted characteristic points are aligned in a line in a direction corresponding to the Y axis. Then, the height image generation unit arranges the moved profile data in a direction corresponding to the Y axis to correct a height image.

7 Claims, 34 Drawing Sheets

(51) Int. Cl.
*G06T 7/50* (2017.01)
*G06T 7/60* (2017.01)

(52) U.S. Cl.
CPC ................. *G06T 7/50* (2017.01); *G06T 7/60* (2013.01); *G06T 2207/10016* (2013.01)

(56) References Cited

U.S. PATENT DOCUMENTS

| | | | |
|---|---|---|---|
| 7,751,065 B2 | 7/2010 | Nishio et al. | |
| 8,675,209 B2 | 3/2014 | Usami | |
| 9,866,747 B2 | 1/2018 | Satoyoshi | |
| 10,746,529 B1 | 8/2020 | Miyagawa | |
| 10,746,536 B2 | 8/2020 | Tsuchida | |
| 10,767,976 B2 | 9/2020 | Tsuchida | |
| 10,921,114 B2 | 2/2021 | Fuyuno et al. | |
| 11,073,376 B2 | 7/2021 | Fuyuno | |
| 11,112,236 B2 | 9/2021 | Homma | |
| 2008/0088856 A1* | 4/2008 | Nishio | G01B 11/026 356/623 |
| 2014/0052555 A1* | 2/2014 | MacIntosh | G07G 1/12 705/23 |
| 2015/0355102 A1* | 12/2015 | Kido | G06T 7/0004 348/46 |
| 2017/0160080 A1 | 6/2017 | Lacaze et al. | |
| 2017/0249727 A1 | 8/2017 | Mayumi | |
| 2018/0106608 A1* | 4/2018 | Hibi | G06T 7/521 |
| 2020/0240774 A1* | 7/2020 | Kim | G01B 11/002 |
| 2020/0363191 A1 | 11/2020 | Tsuchida | |
| 2020/0388053 A1 | 12/2020 | Wallack et al. | |
| 2023/0026608 A1 | 1/2023 | Kanayama et al. | |
| 2023/0296373 A1 | 9/2023 | Warashina | |

FOREIGN PATENT DOCUMENTS

| | | | |
|---|---|---|---|
| JP | 2010164326 A | 7/2010 | |
| JP | 2012233920 A * | 11/2012 | ............. G01B 11/26 |
| JP | 2013221799 A | 10/2013 | |
| JP | 2015148568 A | 8/2015 | |
| JP | 2017151066 A | 8/2017 | |
| WO | 9009561 A | 8/1990 | |

OTHER PUBLICATIONS

Office Action issued in corresponding Japanese Patent Application No. 2021-119958 mailed Mar. 4, 2025 (9 pages).
U.S. Appl. No. 17/585,634, filed Jan. 27, 2022 (82 pages).

* cited by examiner

FIG. 6

$$
\begin{matrix}
\vdots & \vdots & \vdots & & \vdots & \ddots \\
(x_i, y_1, z_{i1}, I_{i1}) & (x_i, y_2, z_{i2}, I_{i2}) & (x_i, y_3, z_{i3}, I_{i3}) & \cdots & (x_i, y_j, z_{ij}, I_{ij}) & \cdots \\
\vdots & \vdots & \vdots & \iddots & \vdots & \\
(x_3, y_1, z_{31}, I_{31}) & (x_3, y_2, z_{32}, I_{32}) & (x_3, y_3, z_{33}, I_{33}) & \cdots & (x_3, y_j, z_{3j}, I_{3j}) & \cdots \\
(x_2, y_1, z_{21}, I_{21}) & (x_2, y_2, z_{22}, I_{22}) & (x_2, y_3, z_{23}, I_{23}) & \cdots & (x_2, y_j, z_{2j}, I_{2j}) & \cdots \\
(x_1, y_1, z_{11}, I_{11}) & (x_1, y_2, z_{12}, I_{12}) & (x_1, y_3, z_{13}, I_{13}) & \cdots & (x_1, y_j, z_{1j}, I_{1j}) & \cdots
\end{matrix}
$$

FIG. 7A

THREE-DIMENSIONAL DATA

|  | $x_1$ | $x_2$ | $x_3$ | ... | $x_i$ | ... |
|---|---|---|---|---|---|---|
| $y_1$ | $z_{11}$ | $z_{21}$ | $z_{31}$ | ... | $z_{i1}$ | ... |
| $y_2$ | $z_{12}$ | $z_{22}$ | $z_{32}$ | ... | $z_{i2}$ | ... |
| $y_3$ | $z_{13}$ | $z_{23}$ | $z_{33}$ | ... | $z_{i3}$ | ... |
| ⋮ | ⋮ | ⋮ | ⋮ | ⋱ | ⋮ | |
| $y_j$ | $z_{1j}$ | $z_{2j}$ | $z_{3j}$ | ... | $z_{ij}$ | ... |
| ⋮ | ⋮ | ⋮ | ⋮ | | ⋮ | ⋱ |

LUMINANCE IMAGE DATA

|  | $x_1$ | $x_2$ | $x_3$ | ... | $x_i$ | ... |
|---|---|---|---|---|---|---|
| $y_1$ | $I_{11}$ | $I_{21}$ | $I_{31}$ | ... | $I_{i1}$ | ... |
| $y_2$ | $I_{12}$ | $I_{22}$ | $I_{32}$ | ... | $I_{i2}$ | ... |
| $y_3$ | $I_{13}$ | $I_{23}$ | $I_{33}$ | ... | $I_{i3}$ | ... |
| ⋮ | ⋮ | ⋮ | ⋮ | ⋱ | ⋮ | |
| $y_j$ | $I_{1j}$ | $I_{2j}$ | $I_{3j}$ | ... | $I_{ij}$ | ... |
| ⋮ | ⋮ | ⋮ | ⋮ | | ⋮ | ⋱ |

→ X2
↓ Y2

| Z-CORRECTION | | ON |
|---|---|---|
| | Z-CORRECTION REFERENCE REGION | (0, 0), (2, 10) |
| | HEIGHT TYPE | PEAK |
| | MASK UPPER LIMIT | 10 mm |
| | MASK LOWER LIMIT | 1 mm |
| X-CORRECTION | | ON |
| | EDGE DETECTION TARGET | HEIGHT |
| | X-CORRECTION REFERENCE REGION | (2, 10), (5, 30) |
| | EDGE LEVEL | 1 mm |
| | EDGE DIRECTION | BOTH DIRECTIONS |
| | DETECTION DIRECTION | FROM RIGHT TO LEFT |

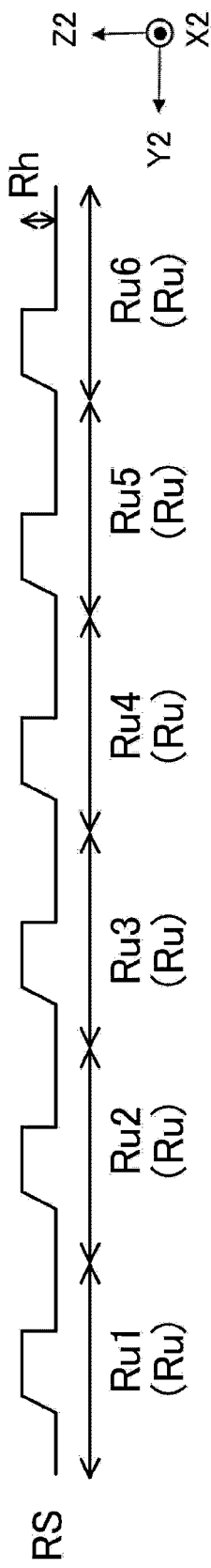
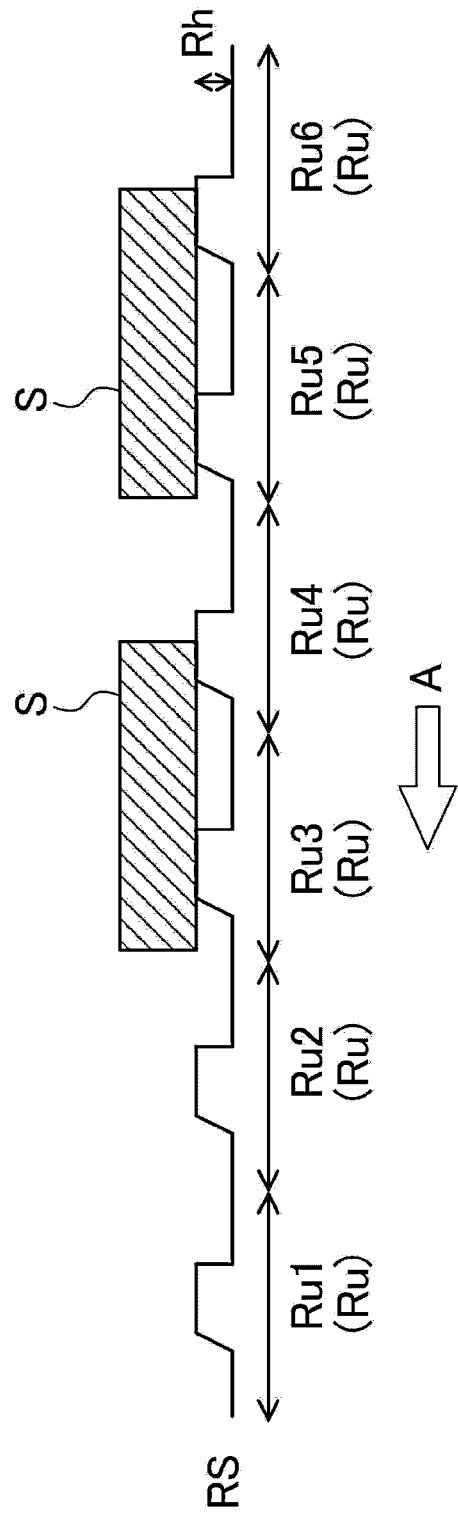
FIG. 27A
FIG. 27B

SHAPE INSPECTION DEVICE, PROCESSING DEVICE, HEIGHT IMAGE PROCESSING DEVICE

CROSS-REFERENCE TO RELATED APPLICATIONS

The present application is a continuation of U.S. patent application Ser. No. 17/749,174 filed May 20, 2022, which in turn claims foreign priority based on Japanese Patent Application No. 2021-119958, filed Jul. 20, 2021, the contents of which are incorporated herein by reference.

BACKGROUND OF THE INVENTION

1. Field of the Invention

The present invention relates to a technique of detecting a displacement of a measurement object by a triangulation method, and particularly to a shape inspection device, a processing device, a height image processing method, and a height image processing program for inspecting a shape of a measurement object based on generated profile data.

2. Description of Related Art

As devices that measure profiles of measurement objects, optical displacement meters of a light cutting type are known. In a typical optical displacement meter of an optical cutting method, a moving measurement object is irradiated with light, and profile data representing a three-dimensional shape of the measurement object can be generated based on a light reception signal indicating a light receiving amount of the reflected light reflected from the surface of the measurement object. A height image of the measurement object can be obtained by arranging a plurality of pieces of generated profile data in a movement direction of the measurement object.

For example, when a profile of the measurement object moving in the horizontal direction is measured by an optical displacement meter, the measurement object may vibrate in a height direction or a lateral direction (width direction). When the measurement object vibrates in the height direction during the measurement, a vibration component in the height direction is added to the profile data of the measurement object. Further, when the measurement object vibrates in the lateral direction during the measurement, a vibration component in the lateral direction is added to the profile data of the measurement object. The height image does not accurately reflect the shape of the measurement object due to the addition of the vibration component in some cases.

Therefore, an inspection method in which an influence of the vibration component is suppressed by estimating and removing the vibration component by image processing is known, for example, as disclosed in JP 2017-151066 A and JP 2006-189315 A.

In optical displacement meters described in JP 2017-151066 A and JP 2006-189315 A, a vibration component is estimated by image processing. Since a premise of the estimation of the vibration component by the image processing is to be performed based on the periodicity of the displacement in the height direction of the measurement object, it is difficult to estimate the vibration component in the lateral direction although the vibration component in the height direction can be estimated. In addition, the estimated vibration component in the height direction is based on the periodicity of displacement in the height direction, and thus, there is a possibility that a part of the shape of the measurement object included in the height image is also estimated as the vibration component erroneously.

Therefore, in the optical displacement meters described in JP 2017-151066 A and JP 2006-189315 A, it is difficult to generate a height image accurately reflecting a shape of a measurement object when the measurement object is moving in some cases.

SUMMARY OF THE INVENTION

An object of the present invention is to provide a shape inspection device, a processing device, a height image processing method, and a height image processing program capable of generating a height image accurately reflecting a shape of a measurement object even in a case where vibration in a height direction and vibration in a lateral direction occur with respect to profile data of the measurement object.

In order to achieve the above object, according to one embodiment of the invention, a shape inspection device of an optical cutting method includes: a light projecting unit that irradiates a measurement object relatively moving in a direction of a Y axis, which intersects with an X axis, with slit light spreading in a direction of the X axis or spot light scanning in the X-axis direction; a light receiving unit that receives reflected light from each position in the X-axis direction and outputs a light reception signal indicating a light receiving amount; a profile data generation unit that generates pieces of profile data of the measurement object in a plane intersecting with the Y-axis direction based on the light reception signal; a height image generation unit that acquires the pieces of profile data sequentially generated by the profile data generation unit as the measurement object relatively moves in the Y-axis direction, and generates a height image of the measurement object; a display control unit that causes a display unit to display the height image generated by the height image generation unit; a setting unit that receives a setting of a correction reference region for correcting the pieces of profile data generated by the profile data generation unit on the height image displayed on the display unit; and an inspection unit that inspects a shape of the measurement object based on the pieces of profile data generated by the profile data generation unit.

Here, the height image generation unit may further extract characteristic points included in the correction reference region for the pieces of profile data generated by the profile data generation unit, respectively, and correct the height image by moving each of the pieces of profile data in a plane intersecting with a direction corresponding to the Y axis based on positions of the extracted characteristic points.

According to this configuration, a two-dimensional region extending in the direction corresponding to the Y axis is set as the correction reference region in the setting unit at the time of setting the shape inspection device. Thereafter, the height image generation unit extracts the characteristic points included in the correction reference region for the pieces of profile data, respectively, obtained by the profile data generation unit during the operation of the shape inspection device. Then, the height image generation unit calculates an offset amount (movement amount) in the X-axis direction or a Z-axis direction, which is a height direction, necessary to align the extracted characteristic points in a line in the direction corresponding to the Y-axis for each of the pieces of profile data. The calculated offset amount is an amount representing a displacement amount from each ideal existence position of the profile data. Then, the height image generation unit offsets (moves) each of the pieces of the profile data in the plane intersecting with the Y axis (plane defined by the X-axis direction and the Z-axis direction) in accordance with the calculated offset amount. That is, each of the pieces of the profile data is offset based on the offset amount, which is a difference between the ideal existence position and an actual existence position of the profile data, thereby correcting a displacement from the ideal existence position. Then, the height image generation unit arranges the profile data from which the displacement from the ideal existence position has been removed in the direction corresponding to the Y axis to generate a height image for inspection that accurately reflects the shape of the measurement object.

In this manner, the height image generation unit calculates the movement amount for each of the pieces of profile data so as to reduce the displacement between the pieces of profile data, and offsets each of the pieces of profile data based on the calculated movement amount (offset amount). Thus, it is possible to generate a height image from which a vibration component generated in the profile data obtained by measuring the measurement object has been reduced without changing a shape of the profile data and regardless of the periodicity of vibration occurring on the measurement object.

According to another embodiment of the invention, the height image generation unit may calculate a reference height based on heights of a plurality of the characteristic points extracted from the pieces of profile data. That is, the reference height serving as an alignment reference of the pieces of profile data is calculated based on the heights of the characteristic points extracted from the plurality of pieces of profile data whose positions are different in the direction corresponding to the Y axis.

According to this configuration, the height image generation unit corrects the profile data so as to reduce a vibration component in the height direction (Z-axis direction) generated in the profile data obtained by measuring the measurement object. That is, each of the pieces of profile data can be offset in the Z-axis direction such that the characteristic points of the pieces of profile data exist at the ideal existence positions, and the height image for inspection accurately reflecting the shape of the measurement object can be generated.

According to still another embodiment of the invention, the height image generation unit may calculate a reference X-position based on X-positions of a plurality of the characteristic points extracted from the pieces of profile data. That is, the reference X-position serving as an alignment reference of the pieces of profile data can be calculated based on the X-positions of the characteristic points extracted from the plurality of pieces of profile data whose positions are different in the direction corresponding to the Y axis.

According to this configuration, the height image generation unit can remove a vibration component in a lateral direction (X-axis direction) generated in the profile data obtained by measuring the measurement object. That is, each of the pieces of profile data can be offset in the X-axis direction such that the characteristic points of the pieces of profile data exist at ideal existence positions, and a height image for inspection accurately reflecting a shape of the measurement object can be generated.

According to still another embodiment of the invention, the setting unit receives, as the correction reference region, a setting of an X-correction reference region in a fixed coordinate system and a Z-correction reference region in a relative coordinate system with the measurement object as a reference. Then, the height image generation unit extracts a characteristic point in the X-axis direction from the X-correction reference region for each of the pieces of profile data. In addition, the height image generation unit calculates a reference X-position based on X-positions of a plurality of the characteristic points calculated from the X-correction reference region. Then, the height image generation unit offsets each of the pieces of profile data in the X-axis direction in accordance with a difference between the X-position of the characteristic point calculated from the X-correction reference region and the reference X-position. That is, the profile data is offset such that the displacement in the X direction is corrected between the plurality of pieces of profile data having different positions in the direction corresponding to the Y axis. Thereafter, the height image generation unit arranges the offset profile data in the direction corresponding to the Y axis to generate an X-correction height image from which the displacement in the X direction has been removed.

Next, the height image generation unit sets the Z-correction reference region based on a position of the measurement object included in the X-correction height image. That is, the Z-correction reference region is set not in the fixed coordinate system with respect to the X-correction height image but in the relative coordinate system with the measurement object as the reference. Then, the height image generation unit extracts a characteristic point in the Z-axis direction from the Z-correction reference region for each of the pieces of profile data. In addition, the height image generation unit calculates a reference height based on heights of a plurality of the characteristic points calculated from the Z-correction reference region. Then, the height image generation unit offsets each of the pieces of profile data in the Z-axis direction in accordance with a difference between the height of the characteristic point calculated from the Z-correction reference region and the reference height. That is, the profile data is offset such that the displacement in the Z direction is removed between the plurality of pieces of profile data having different positions in the direction corresponding to the Y axis. Thereafter, the height image generation unit arranges the offset profile data in the direction corresponding to the Y axis to generate a height image for inspection in which the displacements in the X direction and the Z-axis direction are reduced.

According to this configuration, the height image generation unit can more accurately correct a vibration component generated in the profile data obtained by measuring the measurement object even when the plurality of correction reference regions are set. That is, it is possible to set an appropriate correction reference region according to a measured position of the measurement object without accurately determining a position to measure the measurement object, and the vibration component generated in the profile data can be corrected more accurately.

According to still another embodiment of the invention, the setting unit receives, as the correction reference region, a setting of a Z-correction reference region in a fixed coordinate system and an X-correction reference region in a relative coordinate system with a height of the measurement object as a reference. Then, the height image generation unit extracts a characteristic point in the Z-axis direction from the Z-correction reference region for each of the pieces of profile data. In addition, the height image generation unit calculates a reference height based on heights of a plurality of the characteristic points calculated from the Z-correction reference region. Then, the height image generation unit offsets each of the pieces of profile data in the Z-axis direction in accordance with a difference between the height of the characteristic point calculated from the Z-correction reference region and the reference height. That is, the profile data is offset such that the displacement in the Z direction is reduced between the plurality of pieces of profile data having different positions in the direction corresponding to the Y axis. Thereafter, the height image generation unit generates the Z-correction height image from which the displacement in the Z direction is removed by arranging the offset profile data in the direction corresponding to the Y axis.

Next, the height image generation unit sets the X-correction reference region based on the reference height. That is, the X-correction reference region is set not in the fixed coordinate system with respect to the Z-correction height image but in the relative coordinate system with the reference height as the reference. Then, the height image generation unit extracts a characteristic point in the X-axis direction from the X-correction reference region for each of the pieces of profile data. In addition, the height image generation unit calculates a reference X-position based on X-positions of a plurality of the characteristic points calculated from the X-correction reference region. Then, the height image generation unit offsets each of the pieces of profile data in the X-axis direction in accordance with a difference between the X-position of the characteristic point calculated from the X-correction reference region and the reference X-position. That is, the profile data is offset such that the displacement in the X direction is reduced between the plurality of pieces of profile data having different positions in the direction corresponding to the Y axis. Thereafter, the height image generation unit arranges the offset profile data in the direction corresponding to the Y axis to generate a height image for inspection from which the displacements in the Z direction and the X-axis direction have been removed.

According to this configuration, the height image generation unit can more accurately correct vibration occurring in the profile data obtained by measuring the measurement object even when the plurality of correction reference regions are set. That is, it is possible to set an appropriate correction reference region according to a measured position of the measurement object without accurately determining a position to measure the measurement object, and the vibration component generated in the profile data can be corrected more accurately.

Note that the present invention can also be implemented as a height image processing method and a height image processing program used in an optical cutting displacement meter. In addition, the present invention also includes a computer-readable storage medium storing a height image processing program.

As described above, it is possible to generate the height image accurately reflecting the shape of the measurement object even in the case where the vibration in the height direction or the vibration in the lateral direction occur with respect to the measurement object.

BRIEF DESCRIPTION OF THE DRAWINGS

FIG. 6 is a view illustrating detected peak positions and peak luminance values;

FIGS. 7A and 7B are views illustrating three-dimensional data and luminance image data;

FIGS. 27A and 27B are views illustrating reference plane estimation;

DETAILED DESCRIPTION OF PREFERRED EMBODIMENTS

Hereinafter, embodiments of the present aspect will be described in detail with reference to the drawings. Note that the following description of the preferred embodiments is merely an example in essence, and is not intended to limit the present aspect, its application, or its use.

[1] First Embodiment (1) Configuration of Shape Inspection Device

Figure 1:
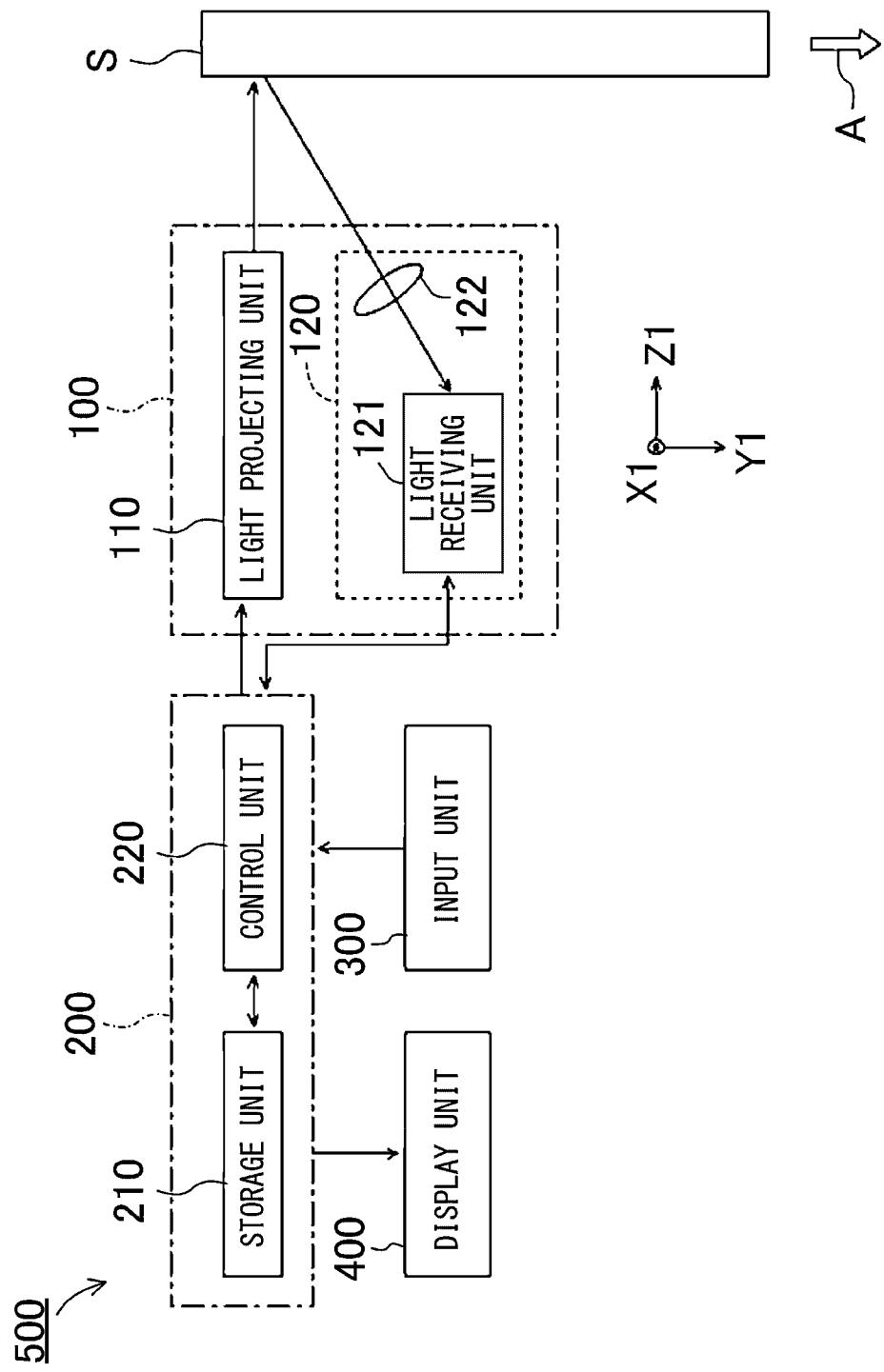
FIG. 1 is a block diagram illustrating a configuration of a shape inspection device according to a first embodiment of the present invention.

Hereinafter, a shape inspection device, a processing device, a height image processing method, and a height image processing program according to the embodiments of the present invention will be described with reference to the drawings. FIG. 1 is a block diagram illustrating a configuration of a shape inspection device 500 according to a first embodiment of the present invention. The shape inspection device 500 is used, for example, to measure a three-dimensional shape of a measurement object S moved at a constant speed by a belt conveyor or the like and inspect the measured three-dimensional shape of the measurement object S. In FIG. 1, a movement direction A of the measurement object S is indicated by a white arrow. A movement direction A of the measurement object S can also be referred to as a conveyance direction.

As illustrated in FIG. 1, the shape inspection device 500 includes an imaging head 100, a processing device (processor) 200, an input unit 300, and a display unit 400. The imaging head 100 includes a light projecting unit (light projector) 110 and an imaging unit 120. The light projecting unit 110 and the imaging unit 120 constitute an optical displacement meter of a light cutting type. This optical displacement meter may include the processing device 200. Then, the imaging unit 120 includes a light receiving unit (light receiver) 121 and a light-receiving lens 122. Further, the processing device 200 includes a storage unit 210 and a control unit (controller) 220.

Figure 2:
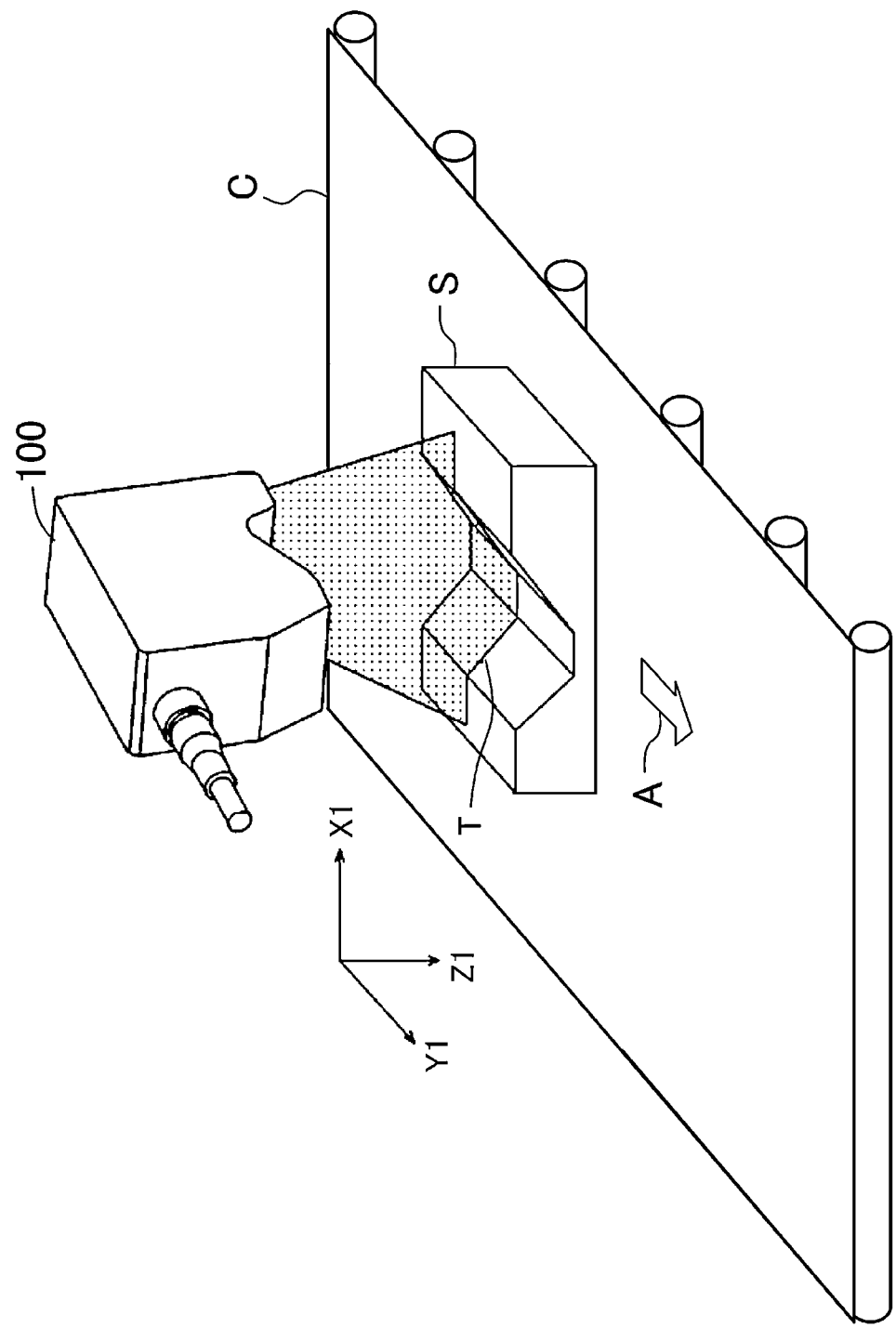
FIG. 2 is an external perspective view of an imaging head and a measurement object.

FIG. 2 is an external perspective view of the imaging head 100 and the measurement object S. As illustrated in FIG. 2, each of the imaging heads 100 is installed such that the Y1 direction is substantially parallel to the movement direction A of the measurement object S. The imaging head 100 is attached to, for example, a fixing base, a support, a bracket, or the like, and is used in a fixed state although not illustrated. A direction orthogonal to the Y1 direction in a plane including the movement direction A is an X1 direction. A direction orthogonal to the X1 direction and the Y1 direction is a Z1 direction. The X1 direction, the Y1 direction, and the Z1 direction are examples of an X-axis direction, a Y-axis direction, and a Z-axis direction, respectively.

The light projecting unit 110 includes a light source, and is configured to be capable of emitting, in the Z1 direction, line-shaped light spreading in the X1 direction as illustrated in FIG. 2 or spot light scanning in the X1 direction. The light source can be configured as, for example, a laser diode (LD), but the embodiment is not limited thereto. The light source may be, for example, a light emitting diode (LED) or a super luminescent diode (SLD). The line-shaped light and the spot light can also be referred to as measurement light.

Figure 3:
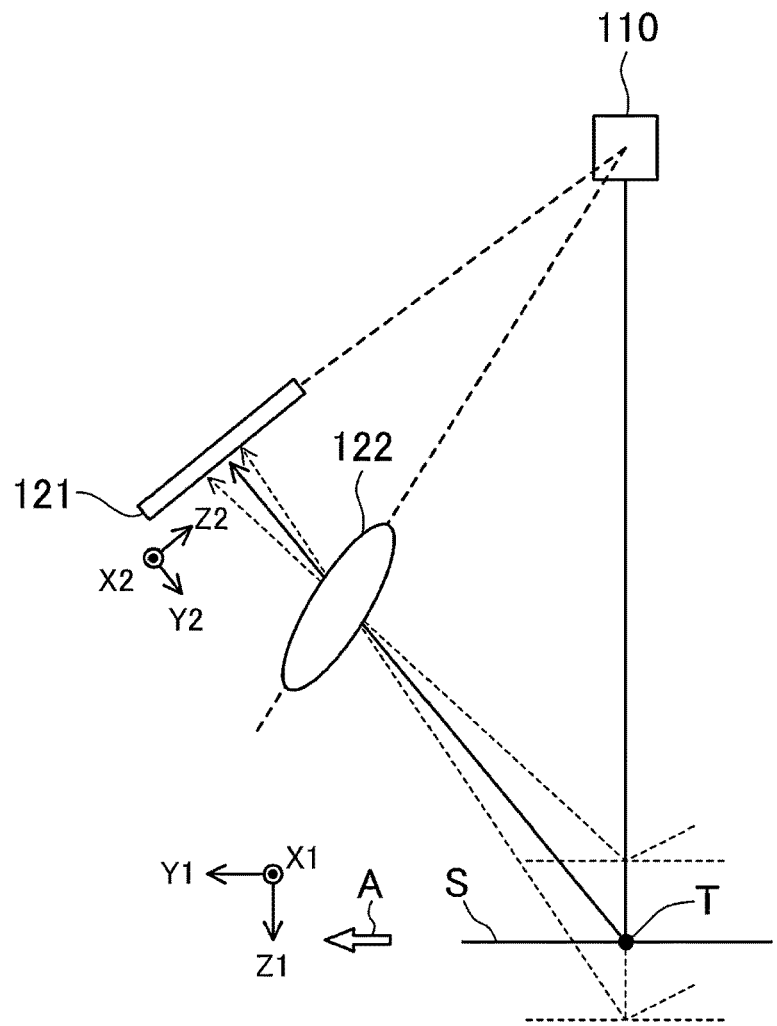
FIG. 3 is a view illustrating a relationship between a light irradiation position on a surface of the measurement object and a light incident position on a light receiving unit.

FIG. 3 is a view illustrating a relationship between a light irradiation position on the surface of the measurement object S and a light incident position on the light receiving unit 121. As illustrated in FIG. 3, the light, which has been projected from the light projecting unit 110 and reflected at each position in the X1 direction of the measurement object S, is incident on the light receiving unit 121 through the light-receiving lens 122. The light receiving unit 121 includes, for example, a complementary metal oxide semiconductor (CMOS) sensor or a charge coupled device (CCD) sensor, and has a light receiving surface on which a plurality of pixels are two-dimensionally disposed. Two directions orthogonal to each other on the light receiving surface of the light receiving unit 121 are referred to as an X2 direction as the X-axis direction and a Z2 direction as the Z-axis direction. In addition, a direction orthogonal to the X2 direction and the Z2 direction is referred to as a Y2 direction. The Y2 direction is an example of a direction corresponding to a Y axis. The light receiving unit 121 generates a light reception signal indicating the amount of light received by the light receiving unit 121, and the light receiving unit 121 outputs the generated light reception signal to the processing device 200.

The storage unit 210 illustrated in FIG. 1 includes a random access memory (RAM), a read-only memory (ROM), a hard disk, a semiconductor memory, or the like, and stores a height image processing program. The height image processing program may be provided in a form stored in a computer-readable storage medium and installed in the storage unit 210. Alternatively, in a case where the processing device 200 is connected to a network such as the Internet, the height image processing program may be installed in the storage unit 210 from a server (a cloud server) on the network.

The control unit 220 includes a computer or the like capable of executing the height image processing program, and includes, for example, a central processing unit (CPU), and controls the operation of the imaging head 100 based on the height image processing program. In addition, the control unit 220 is configured to be capable of generate profile data, three-dimensional data, luminance image data, or the like of the measurement object S. The profile data indicates a profile of the measurement object S in a plane defined by the X2 direction as the X-axis direction and the Z2 direction as the Z-axis direction. The three-dimensional data indicates a three-dimensional shape of the measurement object S. The luminance image data indicates a surface image (texture image) of the measurement object S. The processing device 200 will be described later in detail.

The input unit 300 includes, for example, an input device or an operation device such as a keyboard and a pointing device, and can be operated by a user. The user can perform predetermined designation, input predetermined information, performs predetermined installation, and the like to the processing device 200 by operating the input unit 300.

The display unit 400 is configured using, for example, a liquid crystal display panel or an organic electroluminescence (EL) panel. The display unit 400 can display the profile data, the three-dimensional data, the luminance image data, or the like of the measurement object S based on the profile data, the three-dimensional data, or the luminance image data generated by the processing device 200.

(2) Profile Data, Height Image, and Luminance Image

The measurement object S in the example of FIG. 2 has a groove, which has a trapezoidal cross section extending in the Y1 direction, on the surface. The imaging head 100 irradiates the surface of the measurement object S moving in the movement direction A with the line-shaped light along the X1 direction. Hereinafter, a linear region of the surface at a position in the Y1 direction of the measurement object S irradiated with the line-shaped light is referred to as an irradiation region T.

As illustrated in FIG. 3, light reflected by the irradiation region T is incident on the light receiving unit 121 through the light-receiving lens 122. In such a case, when a reflection position of light in the irradiation region T is different in the Z1 direction, an incident position of the reflected light on the light receiving unit 121 is different in the Z2 direction. In addition, when a reflection position of light in the irradiation region T is different in the X1 direction, an incident position of the reflected light on the light receiving unit 121 is different in the X2 direction. As a result, the light incident position of the light receiving unit 121 in the Z2 direction represents a position of the irradiation region T in the Z1 direction, and the light incident position of the light receiving unit 121 in the X2 direction represents the position of the irradiation region T in the X1 direction.

Figure 4:
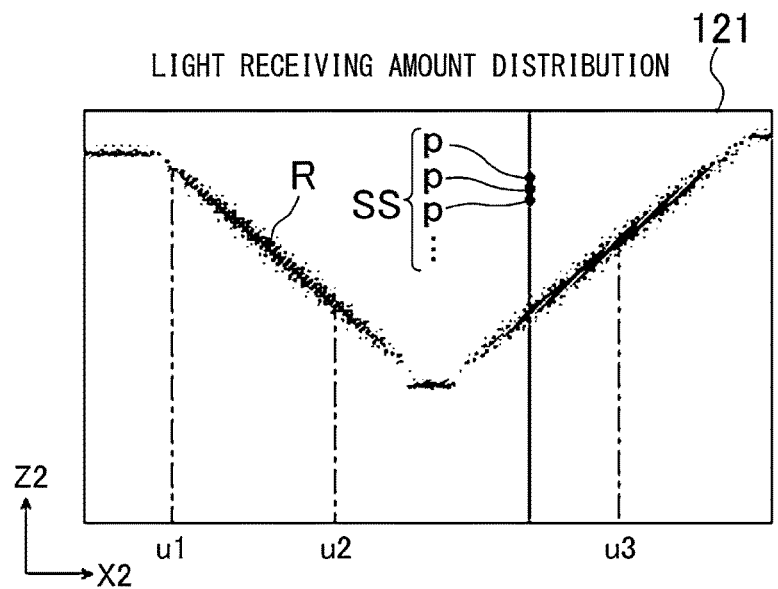
FIG. 4 is a view illustrating a light receiving amount distribution on a light receiving surface of the light receiving unit.

FIG. 4 is a view illustrating a light receiving amount distribution on the light receiving surface of the light receiving unit 121. The light receiving amount distribution is generated based on a light receiving amount of each of pixels p of the light receiving unit 121 in FIG. 4. As described above, the plurality of pixels p of the light receiving unit 121 are two-dimensionally disposed along the X2 direction and the Z2 direction. Each of the arrays of the plurality of pixels p along the Z2 direction is referred to as a pixel array SS. A plurality of the pixel arrays SS are arranged in the X2 direction on the light receiving surface of the light receiving unit 121.

Figure 5A:
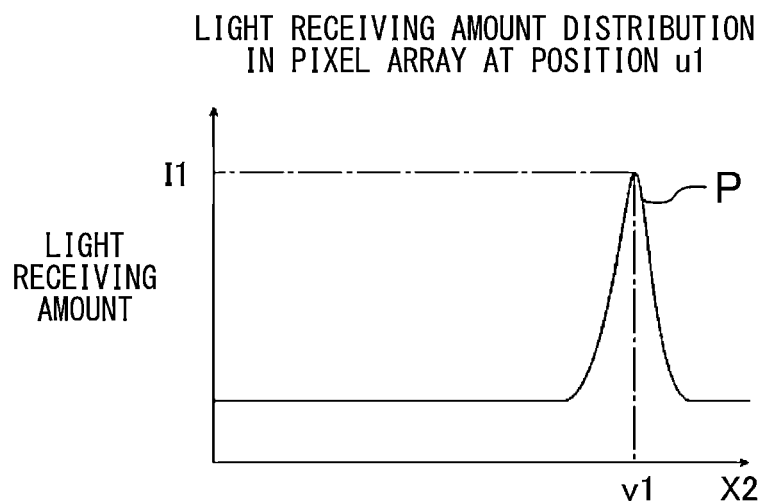
FIGS. 5A to 5C are views illustrating a light receiving amount distribution in a pixel array in an X2 direction.
Figure 5B:
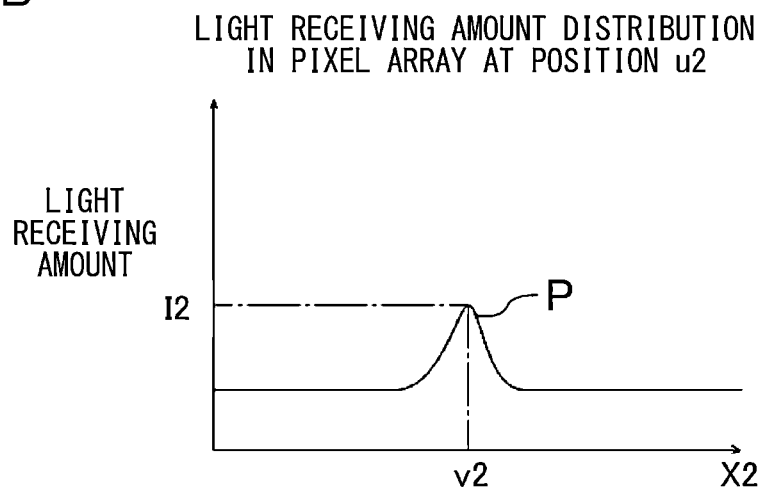
Figure 5C:
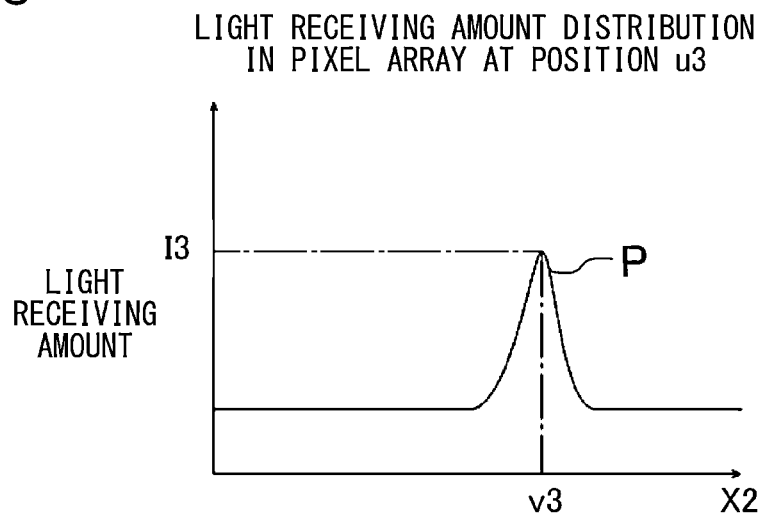

The light reflected from the irradiation region T in FIG. 2 is incident on a light reception region R illustrated in FIG. 4. As a result, the light receiving amount of the light reception region R increases in the light reception signal. FIG. 5A is a view illustrating a light receiving amount distribution in the pixel array SS at one position u1 in the X2 direction. FIG. 5B is a view illustrating a light receiving amount distribution in the pixel array SS at another position u2 in the X2 direction. FIG. 5C is a view illustrating a light receiving amount distribution in the pixel array SS at still another position u3 in the X2 direction. In FIGS. 5A to 5C, the horizontal axis represents a position in the Z2 direction, and the vertical axis represents the light receiving amount.

As illustrated in 5A to 5C, a peak P (maximum value) corresponding to the light reception region R in FIG. 4 appears in the light receiving amount distribution in each of the pixel arrays SS. A position of the peak P in the Z2 direction is referred to as a peak position, and a luminance value (light receiving amount) of the peak position is referred to as a peak luminance value. In the pixel array SS at the position u1, the peak position is v1, and the peak luminance value is I1. In the pixel array SS at the position u2, the peak position is v2, and the peak luminance value is I2. In the pixel array SS at the position u3, the peak position is v3, and the peak luminance value is I3. The peak position indicates the surface (reflection surface) of the measurement object S in the irradiation region T.

One peak position and one peak luminance value are detected in each of a plurality of light receiving amount distributions corresponding to the plurality of pixel arrays SS. Note that a plurality of peaks may appear in the light receiving amount distribution in the pixel array SS due to a plurality of times of reflection or diffuse reflection. In such a case, one peak position and a peak luminance value corresponding to the peak position are detected in a state where a process of excluding a false peak that does not indicate the surface of the measurement object S in the irradiation region T has been performed. The detected peak luminance value indicates a surface state of the measurement object S in the irradiation region T, and is used to generate a luminance image.

Profile data representing a profile of the measurement object S (a shape of the irradiation region T) is generated based on the peak position detected for each of the pixel arrays SS. The peak positions detected in the light receiving amount distributions of FIGS. 5A to 5C are arranged in the X2 direction and illustrated as a continuous line, thereby generating profile data representing the profile of the measurement object S.

A plurality of positions of the measurement object S in the Y1 direction are sequentially irradiated with light from the light projecting unit 110 in response to the relative movement of the measurement object S in the movement direction A. Therefore, as the measurement object S relatively moves in the movement direction A, light reflected by a plurality of the irradiation regions T at the plurality of positions in the Y1 direction of the measurement object S is sequentially incident on the light receiving unit 121. As a result, the peak positions and peak luminance values in the pixel arrays SS at a plurality of positions in the X2 direction are detected for each of the positions in the Y2 direction corresponding to the Y1 direction.

FIG. 6 is a view illustrating a relationship between the detected peak position and peak luminance value. As illustrated in FIG. 6, a peak position zij and a peak luminance value Iij are detected in association with each other for a point (each of i and j is an integer of one or more) defined by a position xi in the X2 direction and a position yj in the Y2 direction, which is a time-axis direction. As a result, the position xi, the position yj, the peak position zij, and the peak luminance value Iij are stored in association with each other in the storage unit 210 of FIG. 1.

FIG. 7A is a view illustrating a height image Hi representing the three-dimensional shape of the measurement object S. As illustrated in FIG. 7A, three-dimensional data is generated by arranging the peak positions zij respectively associated with the points defined by the positions xi and yj. That is, the height image Hi representing the three-dimensional shape of the measurement object S is generated by arranging pieces of profile data, generated to correspond to the plurality of positions yj, in the Y2 direction.

FIG. 7B is a view illustrating the luminance image data. As illustrated in FIG. 7B, the luminance image data is generated by arranging the peak luminance values Iij respectively associated with the points defined by the positions xi and yj. That is, the luminance image data is generated by arranging the peak luminance values, detected to correspond to pieces of the profile data of the plurality of positions yj, in the Y2 direction.

In this manner, the three-dimensional data of the surface of the measurement object S and the luminance image data are generated by the movement of the measurement object S relative to the imaging head 100. Although the measurement object S is moved in the present embodiment, the embodiment is not limited thereto. It suffices that the measurement object S is moved relative to the imaging head 100. Therefore, the imaging head 100 may be moved without moving the measurement object S, and both the measurement object S and the imaging head 100 may be moved. Even in such cases, the three-dimensional data and the luminance image data of the measurement object S can be generated.

(3) Control Unit (Controller)

Figure 8:
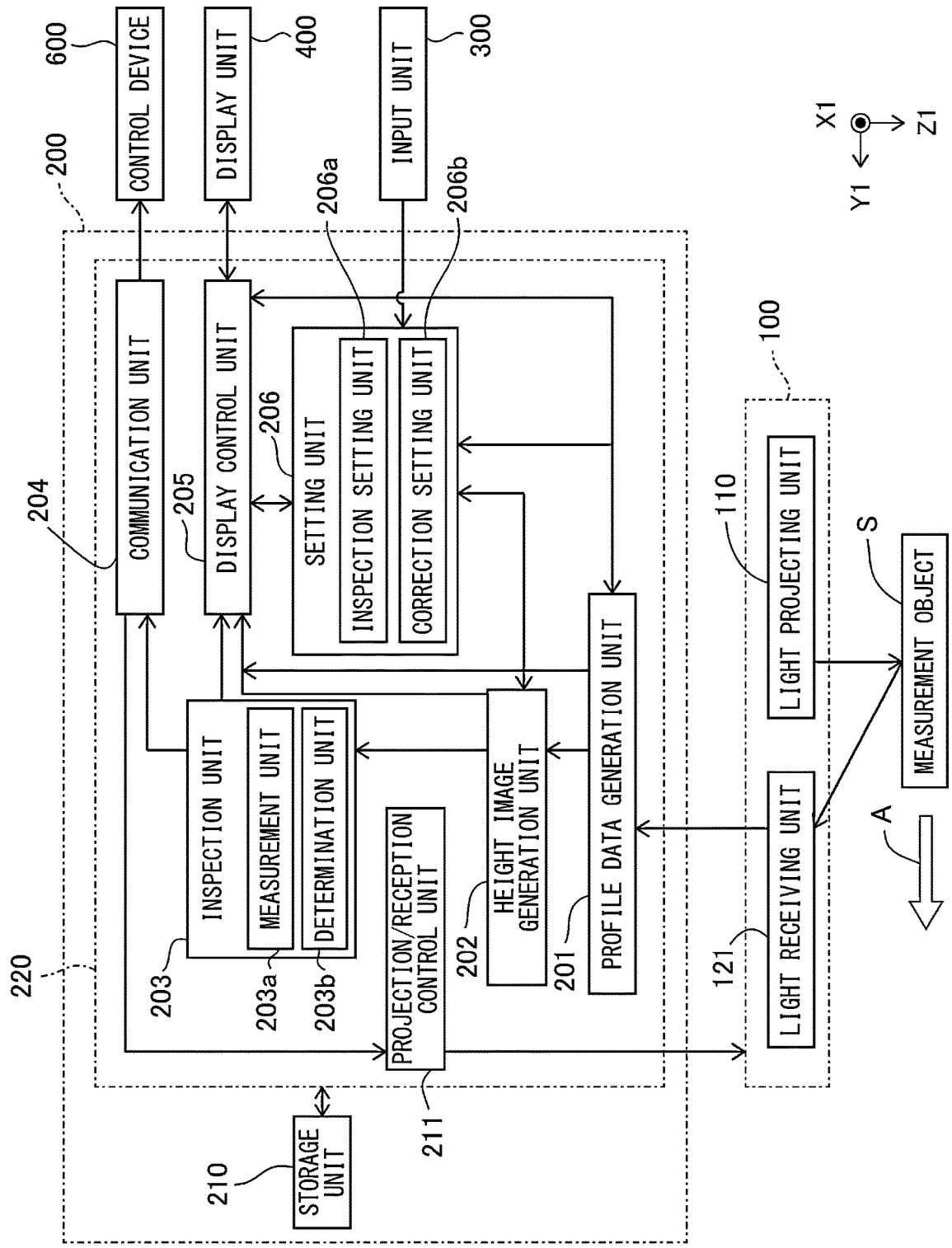
FIG. 8 is a block diagram illustrating a configuration of a processing device in FIG. 1.

FIG. 8 is a block diagram illustrating a detailed configuration of the processing device 200 of FIG. 1. As illustrated in FIG. 8, the control unit 220 of the processing device 200 includes a profile data generation unit (profile data generator) 201, a height image generation unit (height image generator) 202, an inspection unit (inspector) 203, a communication unit 204, a display control unit (display controller) 205, a setting unit (setting receiver) 206, and a light projection/reception control unit (light projection/reception controller) 211. The control unit 220 may execute the height image processing program to implement functions of the profile data generation unit 201, the height image generation unit 202, the inspection unit 203, the communication unit 204, the display control unit 205, and the setting unit 206. Any two or more of the functions may be integrated and provided as one processing unit.

The light projection/reception control unit 211 controls the light projecting unit 110 to emit light in the Z1 direction at a predetermined period, and controls the light receiving unit 121 to receive light having passed through the light-receiving lens 122. In the example of FIG. 8, the light projection/reception control unit 211 controls the light projecting unit 110 such that the measurement object S relatively moving in the movement direction A is periodically irradiated with light. As the reflected light from the measurement object S is repeatedly received by the light receiving unit 121, the light reception signal indicating the light receiving amount is sequentially output.

The profile data generation unit 201 generates profile data Pd corresponding to each position of the moving measurement object S in the Y2 direction based on the light reception signal output from the light receiving unit 121. The profile data generation unit 201 also serves as a portion that outputs the generated profile data Pd to the height image generation unit 202, the display control unit 205, and the setting unit 206.

The height image generation unit 202 is the portion that arranges a plurality of pieces of the profile data Pd generated by the profile data generation unit 201 in the Y2 direction, and generates the height image Hi representing the three-dimensional shape of the measurement object S. The height image generation unit 202 also serves as a portion that outputs the generated height image Hi to the inspection unit 203, the display control unit 205, and the setting unit 206.

The inspection unit 203 inspects the measurement object S based on the height image Hi generated by the height image generation unit 202, and includes a measurement unit 203a and a determination unit 203b. The measurement unit 203a performs predetermined measurement on the height image Hi of the measurement object S. The determination unit 203b inspects the measurement object S based on a measurement result measured by the measurement unit 203a. For example, the measurement unit 203a measures a length, an angle, and the like of a predetermined site of the measurement object S. Then, the determination unit 203b determines whether the measurement object S is a non-defective product based on such measurement results and a preset threshold or the like. The inspection unit 203 also serves as a portion that outputs an inspection result of the measurement object S to the communication unit 204 and the display control unit 205.

In addition, the inspection unit 203 may perform inspection based on a plurality of pieces of profile data generated by the profile data generation unit 201 with different positions in the Y2 direction. That is, the inspection unit 203 may inspect the measurement object S using the height image Hi constituted by the plurality of pieces of profile data Pd instead of inspecting the measurement object S using one piece of the profile data Pd. In a case where the inspection is performed using the height image Hi constituted by the plurality of pieces of profile data Pd, positions of the respective pieces of profile data Pd can be offset such that a displacement between the plurality of pieces of profile data Pd constituting the height image Hi is reduced as will be described later.

The communication unit 204 is a portion that outputs the inspection result obtained by the inspection unit 203 to an external control device 600 such as a PLC. In addition, the communication unit 204 can also receive a signal from the control device 600. In this case, the light projection/reception control unit 211 may control the light projecting unit 110 and the light receiving unit 121 based on the signal received as an external trigger from the control device 600.

The display control unit 205 is a portion that causes the display unit 400 to display the profile data Pd generated by the profile data generation unit 201 and the height image Hi for setting generated by the height image generation unit 202. The "setting" is an operation performed by the user before operating the shape inspection device 500, and is executed by the setting unit 206. The height image Hi is an image to be displayed on the display unit 400 at the time of performing various settings of the shape inspection device 500 illustrated in FIG. 1, and thus, can also be referred to as a setting image.

When the input unit 300 is operated by the user, the setting unit 206 is a portion that detects the operation and receives various settings and the like related to the control unit 220. The setting unit 206 includes an inspection setting unit 206a and a correction setting unit 206b. The inspection setting unit 206a sets an inspection parameter to be used by the inspection unit 203. The inspection setting unit 206a sets an inspection region and a tolerance range of the measurement object S based on the profile data Pd or the height image Hi of the measurement object S displayed on the display unit 400. The correction setting unit 206b sets a method of positioning (aligning) the profile data Pd generated by the profile data generation unit 201 based on the profile data Pd or the height image Hi displayed on the display unit 400. Details of the correction setting unit 206b will be described later.

(4) Correction of Height Image Hi

When the measurement object S moves relative to the imaging head 100, vibration, such as a lateral shake or a vertical shake, sometimes occurs on at least one of the measurement object S and the imaging head 100. Since a vibration component is added, a shape of the measurement object included in the height image Hi generated by the height image generation unit 202 becomes an image different from an actual shape of the measurement object S.

On the other hand, the profile data generation unit 201 generates the profile data Pd in which the light spreading in the X1 direction is received at each position of the moving measurement object S in the Y1 direction. Therefore, a shape of the profile data Pd generated at each position in the Y1 direction correctly represents the shape of the measurement object S at each position in the Y1 direction. That is, the height image Hi obtained by arranging pieces of the profile data Pd, generated at the respective positions in the Y1 direction, in the Y2 direction relatively accurately represents the shape of the measurement object S in a range where there is no influence of the vibration component. However, when there is the influence of the vibration component, it is assumed a case where the height image generation unit 202 arranges the profile data Pd with a displacement from the original position, caused by the vibration of the measurement object S during the movement, in the Y2 direction, and thus, generates the height image Hi different from the actual shape of the measurement object S.

Therefore, the height image generation unit 202 calculates the amount of the displacement caused in the profile data Pd due to the vibration of the measurement object S. Then, the height image generation unit 202 offsets (moves) the profile data Pd generated at each position in the Y1 direction, by the displacement amount, in at least one of the Z2 direction and the X2 direction. As a result, the height image generation unit 202 can generate the height image Hi closer to the shape of the measurement object S.

When the height image generation unit 202 offsets the profile data Pd generated by the profile data generation unit 201 in at least one of the Z2 direction and the X2 direction, the shape of each piece of the profile data Pd generated at each position in the Y1 direction is maintained. Therefore, the height image generation unit 202 can correct the height image Hi without distorting the shape of measurement object S included in the height image Hi. Hereinafter, a concept of the correction of the height image Hi will be described.

(Concept of Correction of Height Image)

As illustrated in FIG. 2, the measurement object S moves relative to the imaging head 100. In this case, a displacement occurs between pieces of the profile data Pd sequentially generated by the profile data generation unit 201 due to vibration occurring on the belt conveyor C, vibration occurring on the measurement object S during conveyance, or the like. This displacement includes an X-misalignment caused by vibration of the measurement object S in the X1 direction (lateral direction) and a Z-misalignment caused by vibration of the measurement object S in the Z1 direction (height direction). Note that the vibration of the measurement object S in the X1 direction causes a shift in the X2 direction in the profile data Pd generated by the profile data generation unit 201. In addition, the vibration of the measurement object S in the Z1 direction causes a shift in the Z2 direction in the profile data Pd generated by the profile data generation unit 201.

An ideal height image and a height image including a vibration component will be described with reference to FIGS. 9 to 10B.

Figure 9:
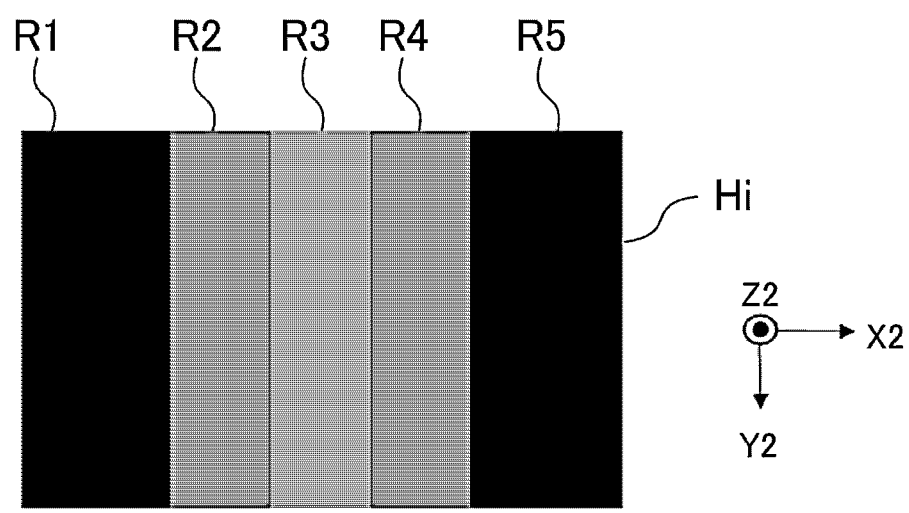
FIG. 9 is an ideal height image of the measurement object.

FIG. 9 illustrates the ideal height image Hi of the measurement object S. Here, the "ideal height image" is the height image Hi obtained when there is no vibration in the belt conveyor C that conveys the measurement object S, the measurement object S itself, and the surrounding environment, and the measurement object S is moved on a straight line with respect to the imaging head 100.

The height image Hi of the measurement object S illustrated in FIG. 9 is divided into five regions R1 to R5. Here, a height of the measurement object S is represented by a color density. A region having a higher density as illustrated in the region R1 and the region R5 represents that the height with respect to a reference plane is relatively high, and a region having a lower density as illustrated in the region R3 represents that the height with respect to the reference plane is relatively low. In this manner, the height image Hi of the measurement object S is formed of a rectangle having a uniform height in each of the regions R1 to R5.

Figure 10A:
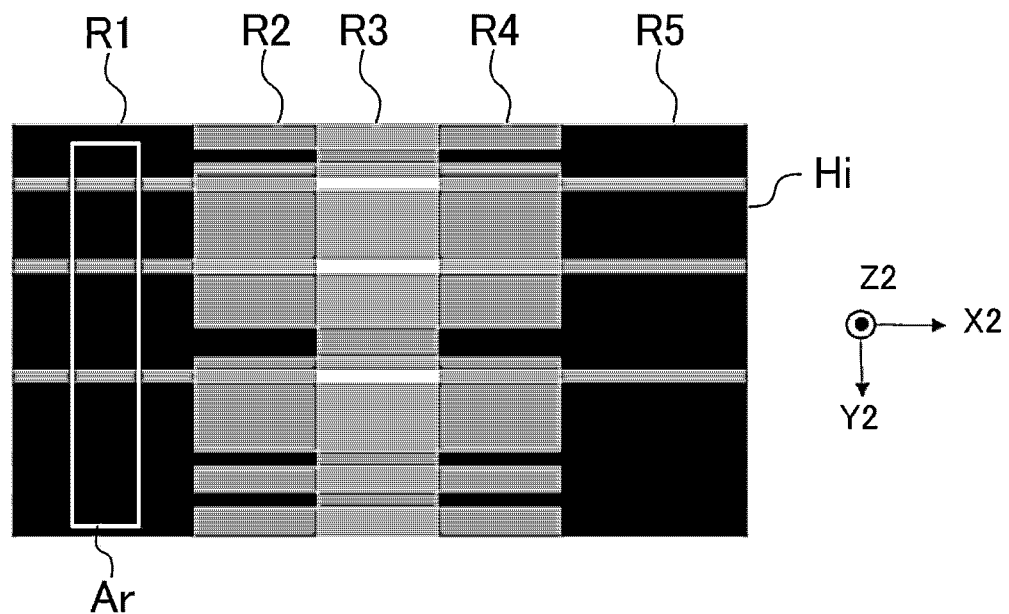
FIGS. 10A and 10B are height images in a case where aperiodic vibration is applied.

Next, a case where vibration occurs in the Z1 direction of the measurement object S, that is, a case where the measurement object S vertically shakes with respect to the imaging head 100 will be described with reference to FIG. 10A. In the case where the vibration occurs in the Z1 direction of the measurement object S, the height image Hi to which the vibration is applied in the Z2 direction of the light receiving unit 121 is obtained. FIG. 10A is an example of this height image Hi. Each of the plurality of pieces of profile data Pd constituting the height image Hi is displaced in the Z2 direction, and each of the regions R1 to R5 has a region having a height different from that of the ideal height image illustrated in FIG. 9.

Figure 10B:
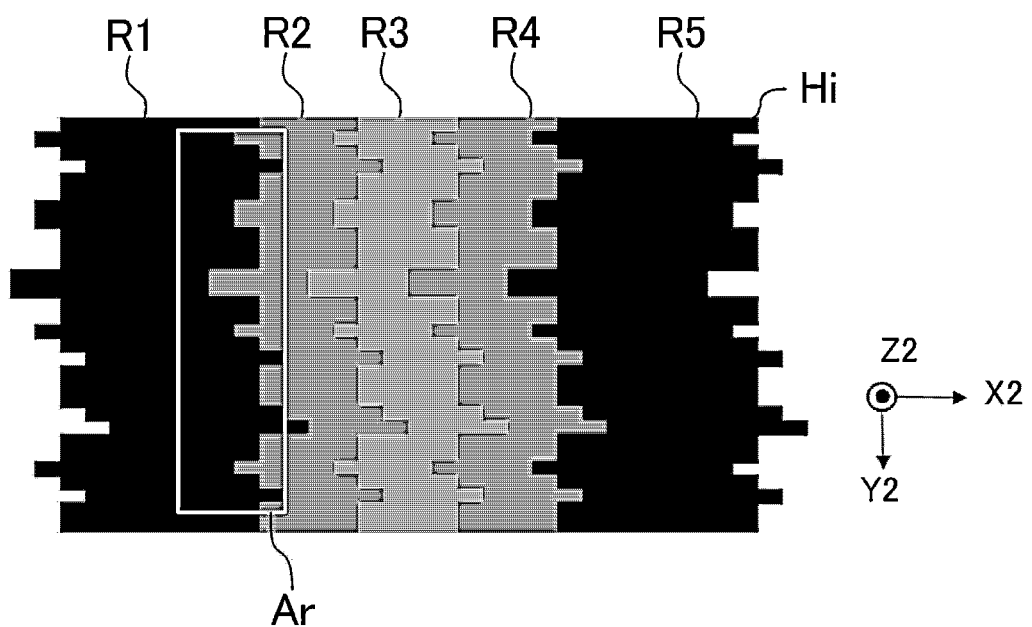

FIG. 10B illustrates a case where the measurement object S vibrates in the X1 direction, that is, a case where the measurement object S laterally shakes with respect to the imaging head 100. In the case where the measurement object S vibrates in the X1 direction, the height image Hi to which the vibration is applied in the X2 direction of the light receiving unit 121 is obtained. FIG. 10B is an example of this height image Hi. Each of the plurality of pieces of profile data Pd constituting the height image Hi is displaced in the X2 direction, and each of the regions R1 to R5 has a shape laterally deformed from a rectangular shape.

In a case where the height image Hi illustrated in FIG. 10A is corrected based on the conventional frequency analysis, a periodic vibration component can be removed, but it is difficult to accurately remove an aperiodic vibration component. That is, in the conventional vibration correction, a vibration component is estimated as "what is periodic", and a periodic component regarded as the vibration component is removed from the height image Hi. Therefore, in a case where there is a region having a different height level only in a part in the Y2 direction or a case where a region having a different height level is present aperiodically as illustrated in FIG. 10A, it is difficult to generate the height image Hi from which the vibration component has been accurately removed. In such a case, it is difficult to completely remove the vibration component so that a residual region exists, or an overcorrection region is generated due to erroneous overcorrection, in each of the regions R1 to R5. Such generation of the residual region or the overcorrection region is caused by aperiodic generation of the vibration component. In this manner, in the conventional vibration correction, it is difficult to generate the height image Hi from which the aperiodic vibration component has been accurately removed.

In addition, the frequency analysis is performed in the height direction in the conventional vibration correction, and thus, it is difficult to correct the displacement in the X2 direction illustrated in FIG. 10B. The measurement object S moving on the belt conveyor C also undergoes aperiodic vibration (displacement) in the height direction, periodic vibration (displacement) in the X direction, and aperiodic vibration (displacement) in the X direction. However, it is difficult to cope with such vibration (displacement) with the conventional vibration correction, and thus, it is difficult to accurately inspect the measurement object S.

When profile alignment (vibration correction) according to the present embodiment is applied to the height image Hi illustrated in FIG. 10A to which the vibration component in the Z2 (height) direction has been applied or the height image Hi illustrated in FIG. 10B to which the vibration component in the X2 (lateral) direction has been applied, a height image similar to the ideal height image Hi illustrated in FIG. 9 is obtained. That is, the height image Hi in which the vibration component in the Z2 direction and the vibration component in the X2 direction have been corrected is obtained.

As described above, each piece of the profile data is offset so as to reduce the displacement between the pieces of profile data in the profile alignment (vibration correction) according to the present embodiment. Therefore, the vibration (displacement) occurring in the measurement object S can be corrected regardless of the periodicity of the vibration, and the measurement object S can be inspected more accurately. That is, the height image generation unit 202 can generate the height image Hi in which the vibration component is reduced by suppressing the displacement between the pieces of profile data Pd having the aperiodic vibration.

Note that the profile alignment (vibration correction) may be performed in both the Z2 direction and the X2 direction when the displacement in the Z1 direction and the displacement in the X1 direction occur on the measurement object S. That is, the profile alignment (vibration correction) may be executed in at least one of the Z2 direction and the X2 direction.

(Overview of Correction of Z-Misalignment)

Figure 11A:
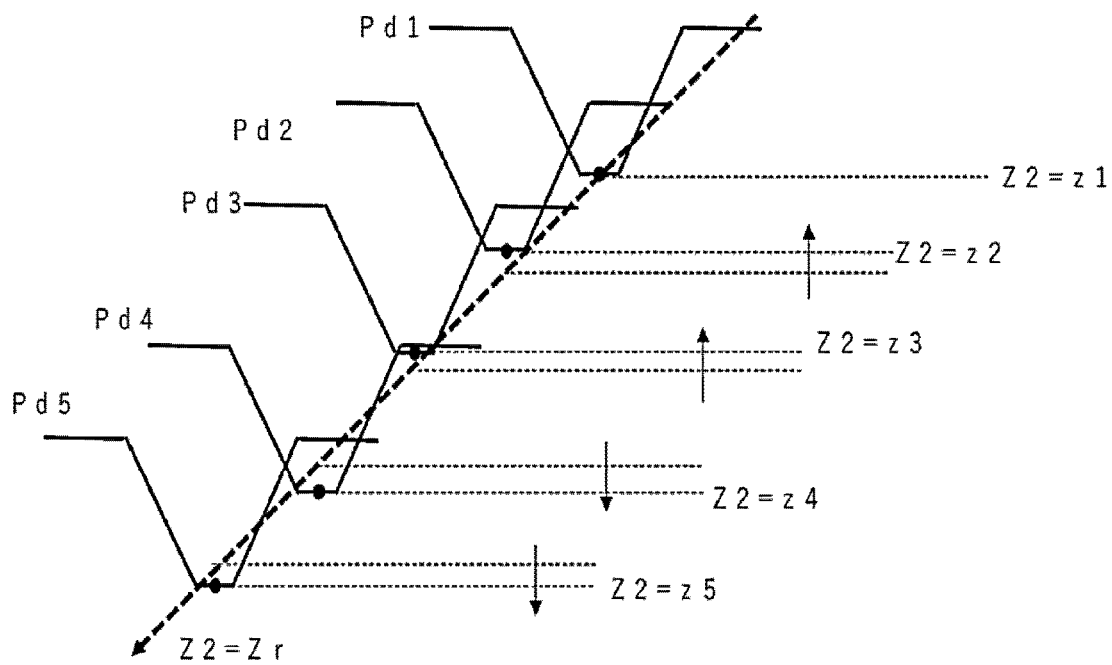
FIGS. 11A and 11B are views illustrating correction of profile data.
Figure 11B:
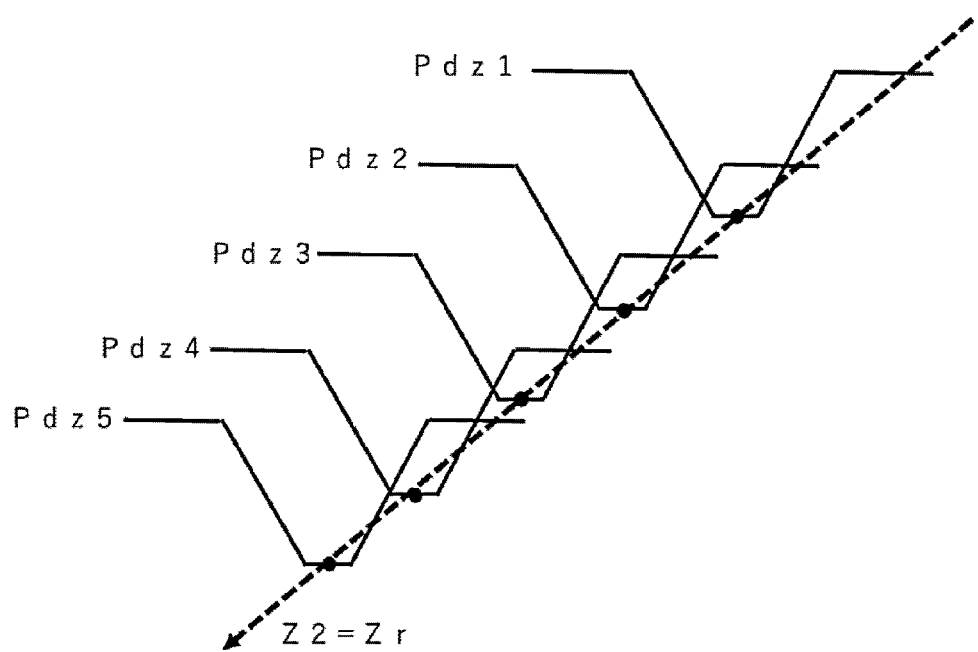

FIGS. 11A and 11B are views for describing correction of the Z-misalignment in more detail. The plurality of pieces of the profile data Pd generated by the profile data generation unit 201 with different positions in the Y2 direction are denoted by Pd1, Pd2, Pd3, Pd4, and Pd5 illustrated in FIG. 11A. In addition, the movement direction of the measurement object S is indicated by a dotted arrow.

When the measurement object S is conveyed on the belt conveyor C without vibrating, a Z-height of each piece of the profile data Pd1 to Pd5 is aligned on this arrow of which height in the Z2 direction is a reference Z-height Zr. However, the profile data Pd is displaced upward or downward from the reference Z-height Zr in the example of FIG. 11A.

Therefore, the height image generation unit 202 calculates a Z-displacement amount, which is a difference between the reference Z-height Zr and an actual Z-height, for each piece of the profile data Pd. Then, the height image generation unit 202 offsets (moves) the profile data Pd in the Z2 direction in accordance with the Z-displacement amount. That is, the height image generation unit 202 calculates an offset amount (movement amount) of each piece of the profile data Pd so as to reduce the displacement between pieces of the profile data Pd. Then, the height image generation unit 202 offsets the profile data Pd in accordance with the offset amount calculated for each profile data.

As a result, it is possible to obtain pieces of profile data Pdz in which the plurality of pieces of profile data Pd whose positions in the Y2 direction are different are aligned so as to have the equal height in the Z2 direction as illustrated in FIG. 11B. That is, the height image generation unit 202 can reduce the displacement between pieces of the profile data Pd regardless of the periodicity of the displacement of the profile data Pd, and the obtained profile data Pdz is aligned on a straight line along the reference height Zr. The height image generation unit 202 arranges the pieces of profile data Pdz, offset (moved) in the Z2 direction in this manner, in the Y2 direction, and generates the height image Hi representing the three-dimensional shape of the measurement object S.

In the height image Hi, the Z-displacement between the plurality of pieces of profile data Pd whose positions in the Y2 direction are different is corrected. Since the inspection unit 203 performs the inspection using the height image Hi from which the Z-displacement has been removed in this manner, the height image Hi can be referred to as a height image for inspection.

(Overview of Correction of X-Misalignment)

Figure 12A:
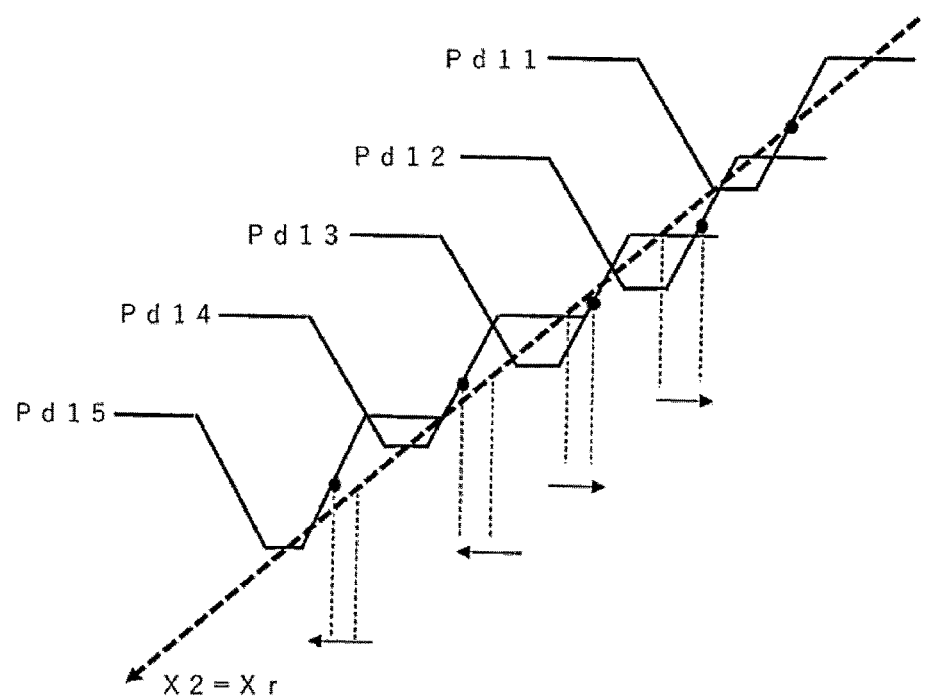
FIGS. 12A and 12B are views illustrating correction of profile data.
Figure 12B:
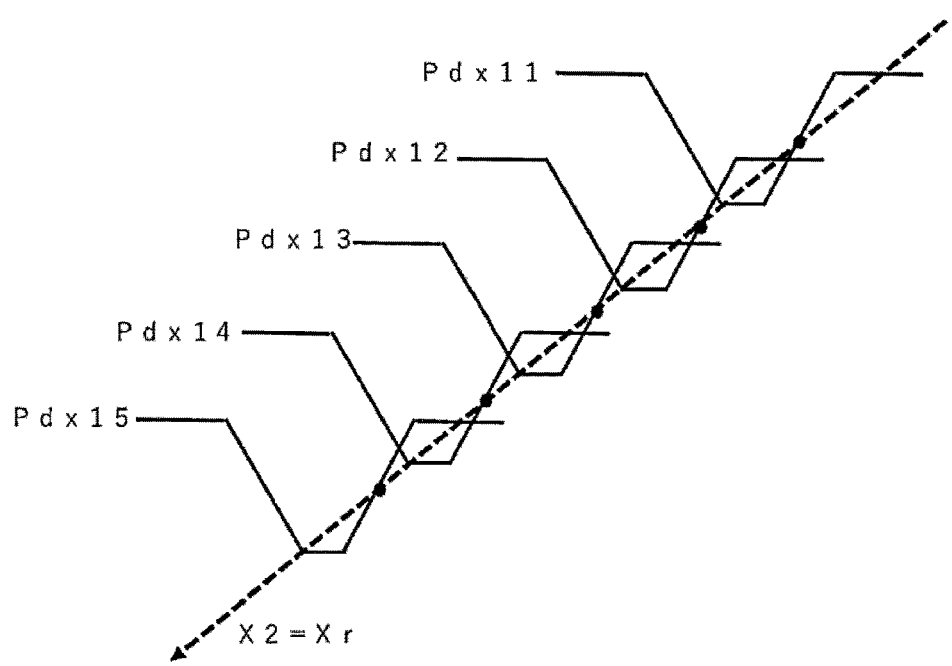

FIGS. 12A and 12B are views for describing correction of the X-misalignment described above in more detail.

When the measurement object S is conveyed on the belt conveyor C without vibrating, X-positions of pieces of profile data Pd11 to Pd15 are aligned on an arrow of which position in the X2 direction is a reference X-position Xr. However, the profile data Pd is displaced rightward or leftward from the reference X-position in the example of FIG. 12A.

Therefore, the height image generation unit 202 calculates an X-displacement amount which is a difference between the reference X-position Xr and an actual X-position for each piece of the profile data Pd. Then, the height image generation unit 202 offsets (moves) the profile data Pd in the X2 direction in accordance with the X-displacement amount.

As a result, the height image generation unit 202 can reduce the displacement between pieces of the profile data Pd regardless of the periodicity of the displacement of the profile data Pd, and can obtain pieces of profile data Pdx in which the plurality of pieces of profile data Pd whose positions in the Y2 direction are different are aligned so as to have the equal X-position in the X2 direction as illustrated in FIG. 12B. The height image generation unit 202 arranges the pieces of profile data Pdx, offset in the X2 direction in this manner, in the Y2 direction, and generates the height image Hi representing the three-dimensional shape of the measurement object S.

In the height image Hi, the X-displacement between the plurality of pieces of profile data Pd whose positions in the Y2 direction are different is corrected. Since the inspection unit 203 performs the inspection using the height image Hi from which the X-displacement has been removed in this manner, the height image Hi can be referred to as a height image for inspection.

Hereinafter, the Z-misalignment correction and the X-misalignment correction will be specifically described with reference to a user interface displayed on the display unit 400.

1. Z-Misalignment Correction (User Interface for Setting of Z-Misalignment Correction)

Figure 13A:
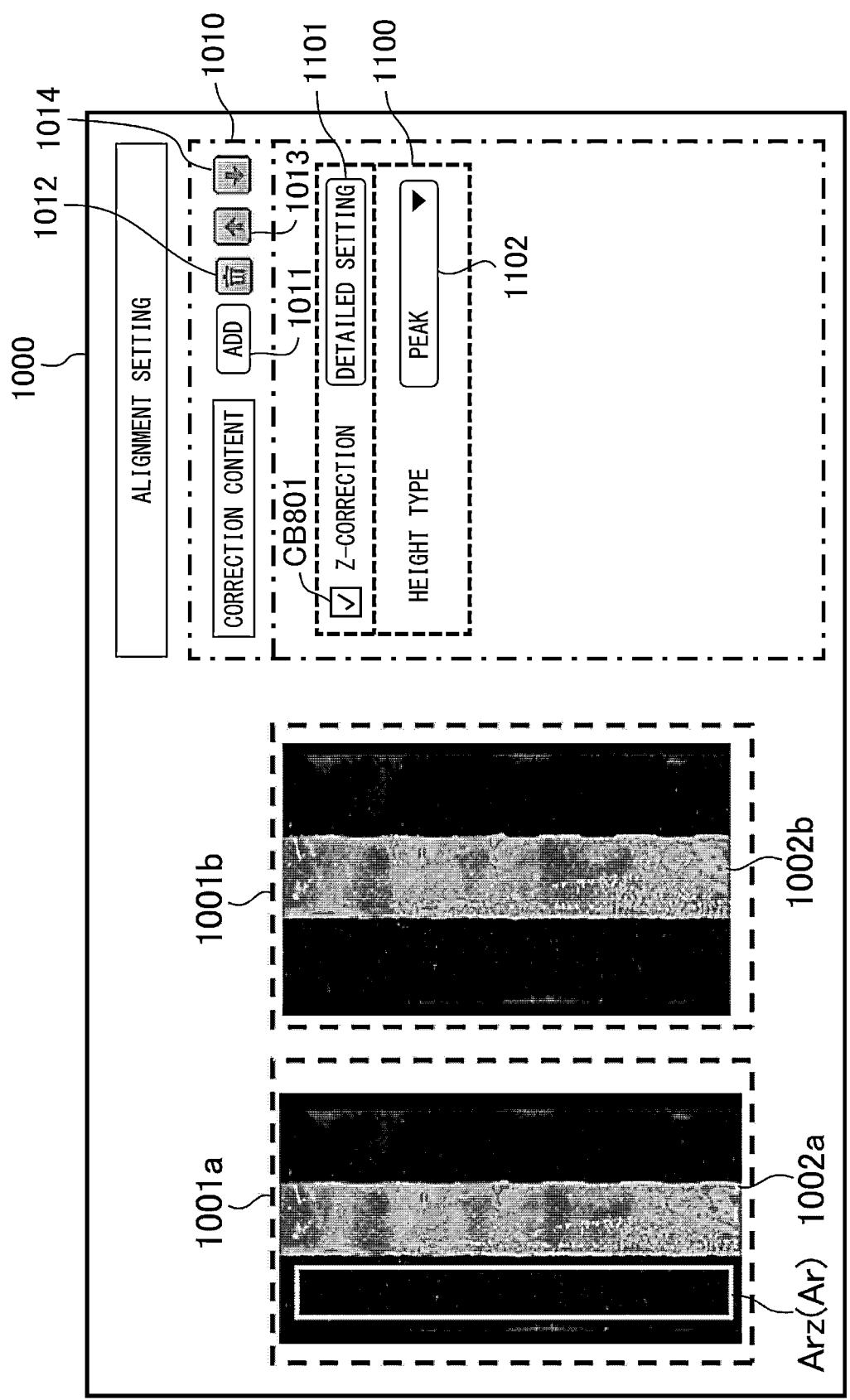
FIGS. 13A and 13B are views illustrating a user interface.

FIG. 13A is an example of a user interface of an alignment setting screen 1000 displayed on the display unit 400. On this alignment setting screen 1000, an alignment setting of the Z-misalignment can be performed. The alignment setting screen 1000 includes a pre-alignment image display region 1001a, a post-alignment image display region 1001b, and a parameter setting region 1010. A pre-alignment image 1002a is displayed in the pre-alignment image display region 1001a. In addition, a Z-correction reference region Arz is displayed as a correction reference region Ar so as to be superimposed on the pre-alignment image 1002a. A post-alignment image 1002b is displayed in the post-alignment image display region 1001b. In the parameter setting region 1010, an add button 1011, a deletion button 1012 configured to delete a setting item, an up button 1013 and a down button 1014 configured to change the order of setting items, and a Z-correction setting region 1100 for performing a correction setting of the Z-misalignment are displayed.

In the Z-correction setting region 1100, a check box CB801 for switching whether to execute Z-correction, a detailed setting button 1101 configured to perform a detailed setting of the Z-correction, and a height type selection field 1102, which is a method of calculating a height which serves as a reference of the Z-correction, are displayed.

Figure 13B:
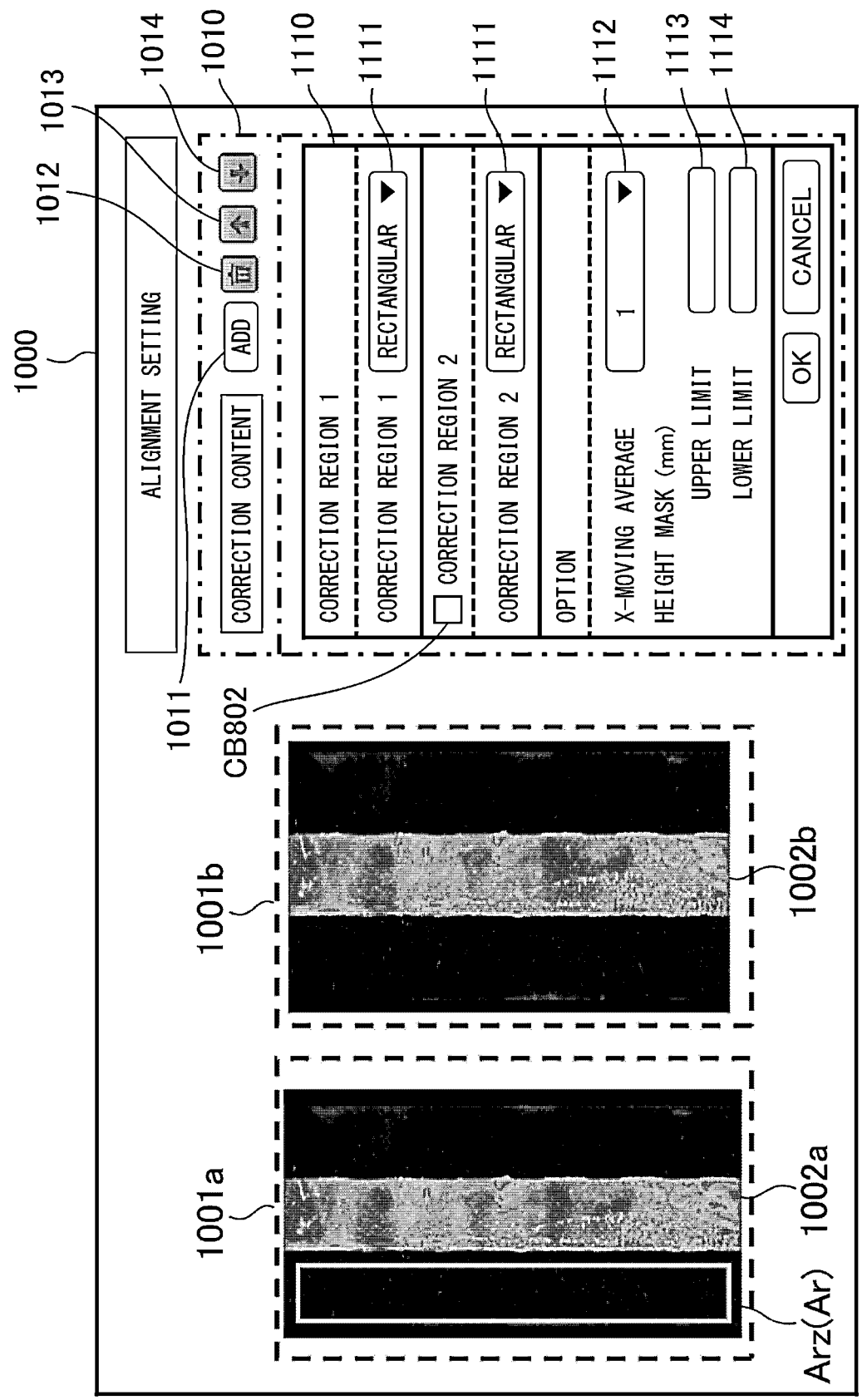

When the display control unit 205 detects that the detailed setting button 1101 has been selected by the input unit 300, the display control unit 205 displays the Z-correction detailed setting region 1110 on the alignment setting screen 1000 of the display unit 400. An example of the Z-correction detailed setting region 1110 is illustrated in FIG. 13B.

In the Z-correction detailed setting region 1110, a correction region selection field 1111 for selecting a shape of the Z-correction reference region Arz, a check box CB802 for switching whether to set a second Z-correction reference region Arz as the correction reference region Ar, a correction region selection field 1111 for selecting a shape of the second Z-correction reference region ARz, a moving average selection field 1112 for setting a moving average in the X2 direction, and a mask upper limit setting field 1113 and a mask lower limit setting field 1114 configured to set a mask for profile data of a certain value or more and a certain value or less are displayed.

(Correction Setting Procedure and Generation of Height Image for Inspection)

A method of generating a height image for inspection based on an alignment setting set on the alignment setting screen 1000 will be described with reference to flowcharts of FIGS. 14A to 14C.

Figure 14A:
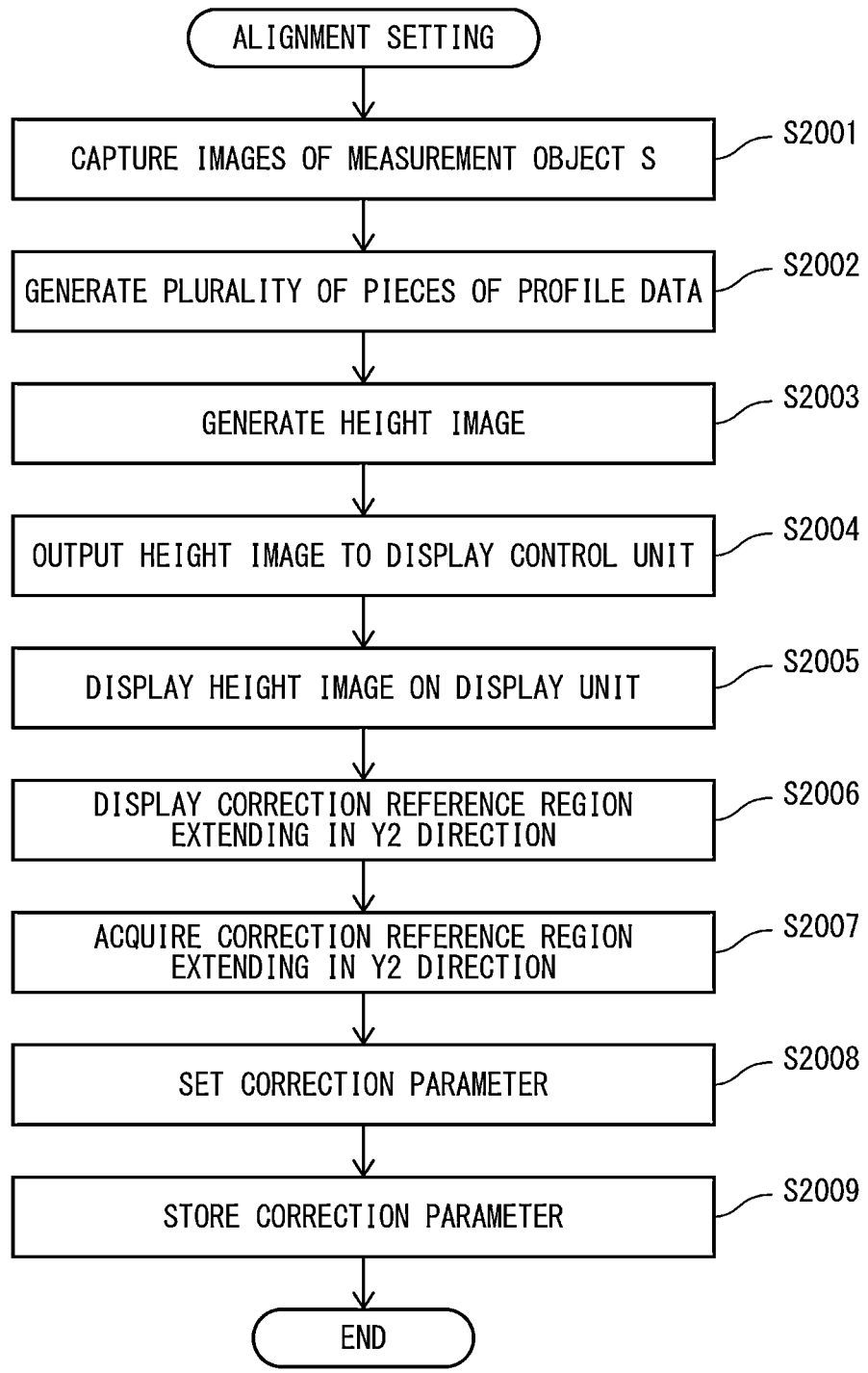
FIGS. 14A to 14C are flowcharts illustrating processing performed by a control unit.

FIG. 14A is a view illustrating an alignment setting procedure of the Z-misalignment correction. After a start, first, the light projection/reception control unit 211 controls the imaging head 100 so as to periodically perform light projection by the light projecting unit 110 and light reception by the light receiving unit 121, and repeatedly captures images of the measurement object S (Step S2001).

Next, the profile data generation unit 201 generates the plurality of pieces of profile data Pd based on light reception signals repeatedly output by the capturing in Step S2001 (Step S2002).

Subsequently, the height image generation unit 202 generates the height image Hi representing a three-dimensional shape of the measurement object S based on the plurality of pieces of profile data Pd generated in Step S2002 (Step S2003).

Thereafter, the height image generation unit 202 outputs the height image Hi generated in S2003 to the display control unit 205 (Step S2004).

Then, the display control unit 205 causes the display unit 400 to display the height image Hi output from the height image generation unit 202 in S2004 (Step S2005).

Next, the display control unit 205 detects an operation of the input unit 300 performed by the user, and displays the Z-correction reference region Arz extending in the Y2 direction on the display unit 400 as the correction reference region Ar (Step S2006).

Next, the correction setting unit 206b acquires the Z-correction reference region Arz extending in the Y2 direction set in S2006 from the display control unit 205 (Step S2007).

In addition, the correction setting unit 206b receives a setting of a correction parameter performed by the user (Step S2008). The correction parameter set herein may include the presence or absence of the Z-correction set in the check box CB801, a height type selected in the height type selection field 1102, a shape of the Z-correction reference region Arz selected in the correction region selection field 1111, the presence or absence of the setting of the second Z-correction reference region Arz selected in the check box CB, a moving average number in the X direction selected in the moving average selection field 1112, a mask upper limit value set in the mask upper limit setting field 1113 and a mask lower limit value set in the mask lower limit setting field 1114. Hereinafter, the Z-correction reference region Arz refers to at least one of the Z-correction reference region Arz and the second Z-correction reference region Arz.

Next, the correction setting unit 206b stores the correction parameter set in S2008 in the correction setting unit 206b (Step S2009). The storage of the correction parameter will be described later with reference to FIG. 17.

Note that it is not essential to display the Z-correction reference region Arz on the display unit 400. For example, the correction setting unit 206b may receive an input of two coordinates and set a region having the received coordinates as a diagonal of a rectangle as the Z-correction reference region Arz.

The alignment setting is completed by the above processes of S2001 to S2008.

Next, the method of generating a height image for inspection will be described with reference to flowcharts of FIG. 14B.

First, the height image generation unit 202 acquires the Z-correction reference region Arz set by the correction setting unit 206b and the correction parameter from the correction setting unit 206b (Step S2011).

Subsequently, the light projection/reception control unit 211 controls the imaging head 100 so as to periodically perform light projection by the light projecting unit 110 and light reception by the light receiving unit 121, and repeatedly captures images of the measurement object S (Step S2012).

Next, the profile data generation unit 201 generates the plurality of pieces of profile data Pd based on light reception signals repeatedly output by the capturing in Step S2012 (Step S2013).

Next, the height image generation unit 202 offsets (moves) pieces of the profile data Pd acquired in S2013 in the Z2 direction in accordance with the correction reference region Ar and the correction parameter acquired in S2011 so as to reduce a displacement between the pieces of profile data Pd. As a result, profile alignment which is displacement correction of the profile data Pd is performed (Step S2014). Details of the profile alignment in S2014 will be described with reference to FIG. 14C.

Subsequently, the height image generation unit 202 arranges the pieces of profile data Pd aligned in S2014 in the Y2 direction to be joined with each other. As a result, the height image for inspection in which the displacement in the Z2 direction between the plurality of pieces of profile data whose positions in the Y2 direction are different is reduced is generated (Step S2015).

The height image is corrected by the above processes of S2011 to S2015.

Next, the profile alignment in S2014 will be described in detail with reference to flowcharts in FIG. 14C.

First, the height image generation unit 202 identifies profile data existing in the Z-correction reference region Arz for each of the plurality of pieces of profile data Pd acquired from the profile data generation unit 201 (Step S2021).

Next, the height image generation unit 202 extracts a characteristic point from the profile data Pd in the Z-correction reference region Arz, identified in S2021, for each of the plurality of pieces of profile data Pd (Step S2022).

Subsequently, the height image generation unit 202 calculates the reference Z-height Zr based on a Z-height of the characteristic point calculated from each of the plurality of pieces of profile data Pd (Step S2023). As the reference Z-height Zr, for example, an average value of Z-heights of a plurality of characteristic points can be used. In addition, a Z-height of a characteristic point extracted from the profile data Pd of the first line in the Z-correction reference region Arz may be used as the reference Z-height Zr.

Next, the height image generation unit 202 calculates a difference between the reference Z-height Zr and the Z-height of the characteristic point extracted from one piece of profile data, for each of the plurality of pieces of profile data Pd (Step S2024). The difference calculated herein corresponds to an offset amount of one piece of profile data during the profile alignment. Note that the difference that is the offset amount is calculated so as to reduce the displacement between the plurality of pieces of profile data Pd.

Next, the height image generation unit 202 offsets each of the plurality of pieces of profile data Pd in the Z2 direction by the difference that is the offset amount calculated in S2024 (Step S2025).

Through the above processes of S2021 to S2025, profiles are aligned, and an aperiodic displacement is also reduced regardless of a displacement period (vibration period) of the plurality of pieces of profile data Pd.

(Relationship Between Correction Parameter and Correction Content)

A relationship between the correction parameter set in FIGS. 13A and 13B and the alignment of the profile data Pd will be described.

(Z-Correction Reference Region Arz)

The Z-correction reference region Arz is set as a two-dimensional region extending in the Y2 direction. That is, in an X2-Y2 plane, the two-dimensional region having the Y2 direction as the longitudinal direction is set as the Z-correction reference region Arz. Since the Z-correction reference region Arz extending in the Y2 direction is set in this manner, the reference Z-height Zr can be set along the Y2 direction. Then, the height image generation unit 202 arranges the plurality of pieces of profile data Pd generated at the respective positions in the Y2 direction in accordance with the reference Z-height Zr set along the Y2 direction. That is, pieces of the profile data Pd are aligned by the height image generation unit 202 so as to reduce the displacement generated between the pieces of profile data Pd whose positions in the Y2 direction are different.

The height image generation unit 202 calculates the offset amount so as to correct the displacement generated between pieces of the profile data Pd whose positions in the Y2 direction are different, and offsets the profile data Pd. The reference Z-height is calculated along the Y2 direction in order to correct the displacement generated between the pieces of profile data whose positions in the Y2 direction are different. In order to calculate the reference Z-height along the Y2 direction, a region that corresponds to the Y1 direction, which is the movement direction of the measurement object S, instead of the X2 direction and extends in the Y2 direction, which is the time-axis direction, is designated as the Z-correction reference region Arz.

(Height Type Selection Field 1102)

The height type selection field 1102 illustrated in FIG. 13A is a selection field for selecting a method of extracting a characteristic point from each of the plurality of pieces of profile data Pd extending in the Y2 direction. The height type selection field 1102 may adopt a drop-down method in which "peak", "bottom", "average", and the like are prepared in advance. For example, the correction setting unit 206b receives a setting of "peak" as the height type, which is one of the correction parameters, in response to detection of selection of "peak" in the height type selection field 1102 by the display control unit 205. When detecting that "peak" is set as the height type, the height image generation unit 202 performs the Z-misalignment correction corresponding to the height type "peak" on each of the plurality of pieces of profile data Pd acquired from the profile data generation unit 201.

Specifically, the height image generation unit 202 extracts, as the characteristic point, a point at which a height of the profile data Pd becomes the peak, for each of the plurality of pieces of profile data Pd acquired from the profile data generation unit 201. Then, the height image generation unit 202 calculates the reference Z-height Zr serving as an alignment reference of the profile data Pd based on a plurality of the characteristic points extracted during the setting. Next, the height image generation unit 202 extracts the characteristic point at which the height of the profile data Pd becomes the peak for each of the plurality of pieces of profile data Pd acquired from the profile data generation unit 201 during the operation. Then, the height image generation unit 202 offsets the profile data Pd in the Z2 direction such that a Z-height of the extracted characteristic point becomes the reference Z-height Zr. That is, the height image generation unit 202 can reduce the displacement generated between the profile data Pd whose positions in the Y2 direction are different by performing alignment of (aligning) pieces of the profile data Pd with the reference Z-height Zr as the alignment reference.

When "bottom" is selected in the height type selection field 1102, the height image generation unit 202 extracts, as the characteristic point, a point at which the height of the profile data Pd is the bottom, instead of the position at which the height of the profile data Pd is the peak. The same description as the case of "peak" described above is applied other than the method of extracting the characteristic point.

When "average" is selected in the height type selection field 1102, the height image generation unit 202 can use an average value of the Z-heights of pieces of the profile data Pd existing in the Z-correction reference region Arz as the Z-height of the characteristic point.

(Correction Region Selection Field 1111)

The correction region selection field 1111 illustrated in FIG. 13B selects a shape of the Z-correction reference region Arz. For example, the correction region selection field 1111 may adopt a drop-down method in which "rectangle", "follow", and the like are prepared in advance.

When detecting that "rectangle" is selected in the correction region selection field 1111, the display control unit 205 displays the Z-correction reference region Arz in the pre-alignment image display region 1001a. In addition, the correction setting unit 206b may receive movement of an arbitrary side of the Z-correction reference region Arz such that a region of the Z-correction reference region Arz can be changed accordingly. Further, the correction setting unit 206b may receive an input of coordinates of at least two points by the user and set a rectangle having the two points as a diagonal as the Z-correction reference region Arz in addition to the correction region selection field 1111 or instead of the correction region selection field 1111.

When detecting that "rectangle" is selected in the correction region selection field 1111, the correction setting unit 206b sets "rectangle" as the correction region which is one of the correction parameters. Further, the correction setting unit 206b acquires the Z-correction reference region Arz from the display control unit 205, and receives a setting as the Z-correction reference region Arz.

In addition, when detecting that "follow" is selected in the correction region selection field 1111, the correction setting unit 206b receives a setting of "follow" as the correction region which is one of the correction parameters. Note that this "following" is suitable in a case where the Z-correction reference region Arz has a shape along an arbitrary edge. When "follow" is selected in the correction region selection field 1111, the height image generation unit 202 extracts a characteristic point from each of the plurality of pieces of profile data Pd acquired from the profile data generation unit 201 during the setting. Then, the height image generation unit 202 calculates the Z-correction reference region Arz based on the characteristic point, an offset amount from the characteristic point set in advance in the correction setting unit 206b, and a width of the Z-correction reference region Arz. The height image generation unit 202 sets the Z-correction reference region Arz, calculated in this manner, in the correction setting unit 206b. Note that the profile alignment performed in the case where the second Z-correction reference region Arz is set as the correction reference region Ar in addition to the Z-correction reference region Arz will be described later.

(Mask Upper Limit Setting Field 1113 and Mask Lower Limit Setting Field 1114)

The mask upper limit setting field 1113 illustrated in FIG. 13B is a setting field for setting a mask for the profile data Pd having a Z-height of a certain value or more. In addition, the mask lower limit setting field 1114 is a setting field for setting a mask for the profile data Pd having a Z-height of a certain value or less.

For example, the mask upper limit setting field 1113 and the mask lower limit setting field 1114 may receive an input of any value in response to the operation of the input unit 300 performed by the user. For example, there is a case where it is difficult to predict, in advance, at which position in the width direction of the belt conveyor C the measurement object S appears when the measurement object S is conveyed on the belt conveyor C. In such a case, a mask may be set in a Z-height range of the profile data Pd used for the characteristic point extraction while setting the Z-correction reference region Arz in a wide range.

When an upper limit value is input to the mask upper limit setting field 1113, the correction setting unit 206*b* receives a setting of the upper limit value input to the mask upper limit setting field 1113 as the mask upper limit value which is one of the correction parameters. In this case, the height image generation unit 202 acquires the mask upper limit value from the correction setting unit 206*b*, and extracts a characteristic point from the profile data Pd in a range of the mask upper limit value or less.

When a lower limit value is input to the mask lower limit setting field 1114, the correction setting unit 206*b* receives a setting of the lower limit value input to the mask lower limit setting field 1114 as the mask lower limit value which is one of the correction parameters. In this case, the height image generation unit 202 acquires the mask lower limit value from the correction setting unit 206*b*, and extracts a characteristic point from the profile data Pd in a range of the mask lower limit value or more.

When an upper limit value and a lower limit value are input in the mask upper limit setting field 1113 and the mask lower limit setting field 1114, the correction setting unit 206*b* receives a setting of the upper limit value input to the mask upper limit setting field 1113 and the lower limit value input to the mask lower limit setting field 1114 as the mask upper limit value and the mask lower limit value each of which is one of the correction parameters. In this case, the height image generation unit 202 acquires the mask upper limit value and the mask lower limit value from the correction setting unit 206*b*, and extracts a characteristic point from the profile data Pd in a range of the mask lower limit value or more and the mask upper limit value or less.

2. X-Misalignment Correction (User Interface for Setting of X-Misalignment Correction)

Figure 15A:
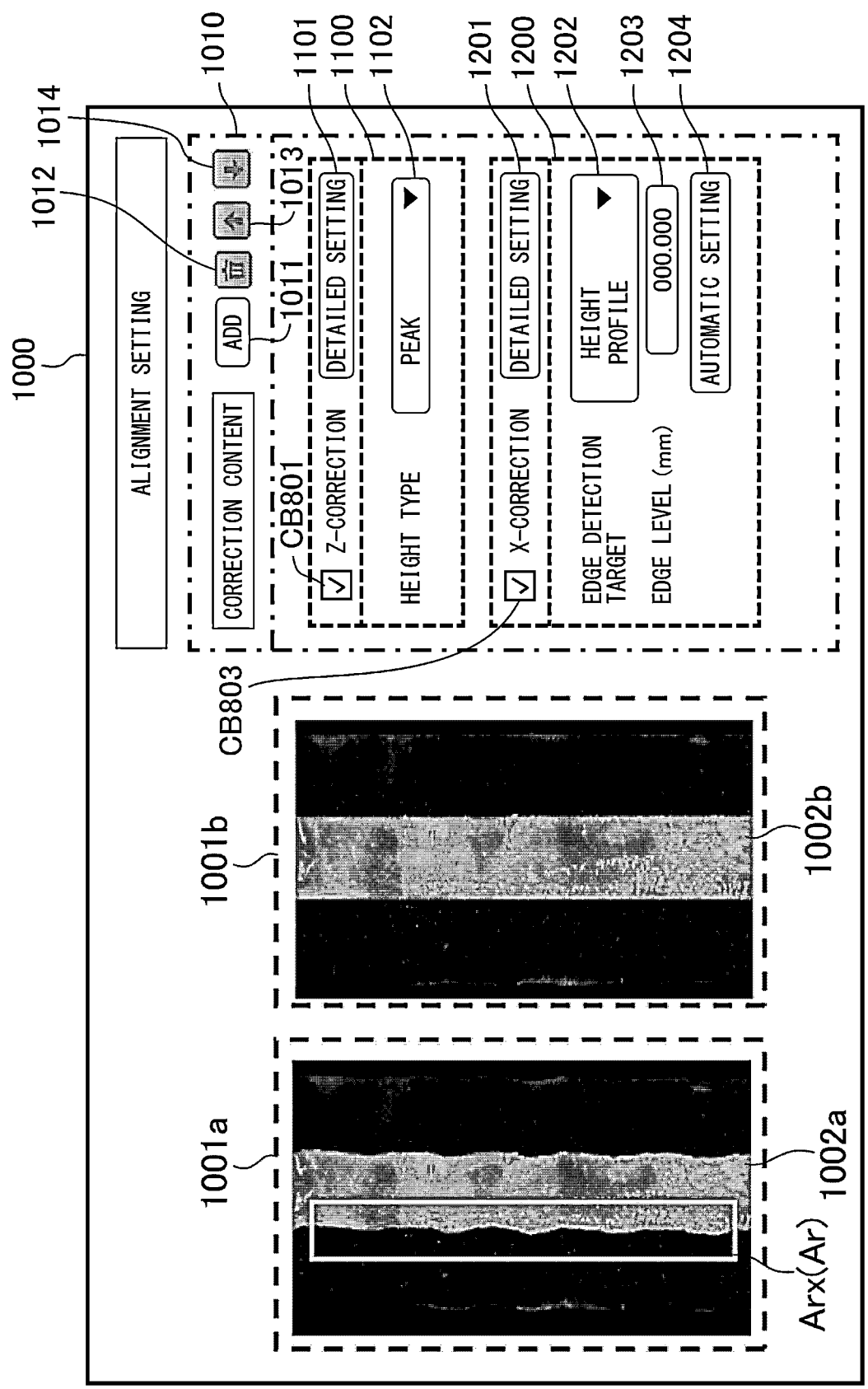
FIGS. 15A and 15B are views illustrating the user interface.
Figure 15B:
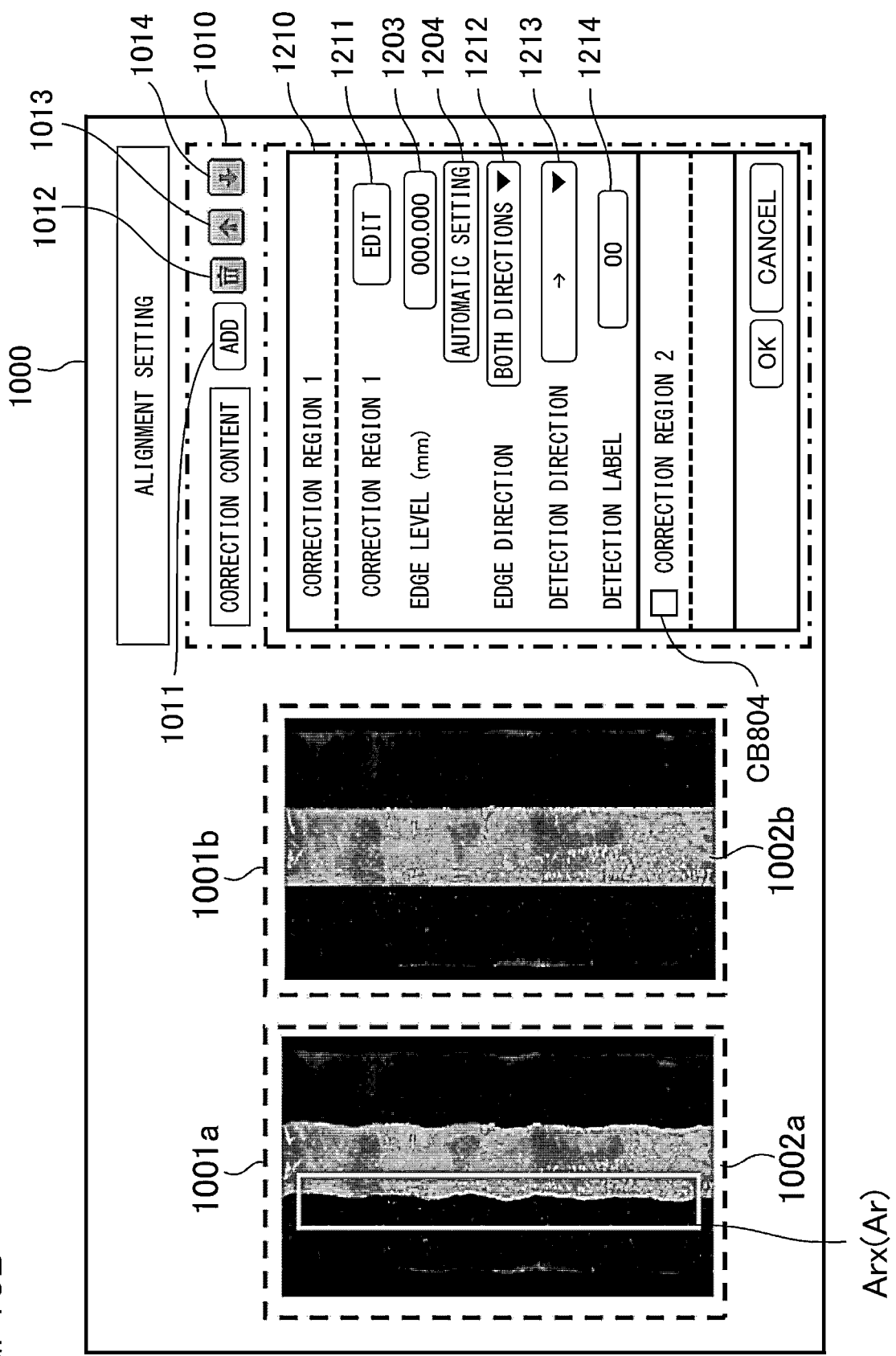

FIGS. 15A and 15B are views illustrating the alignment setting screen 1000 for performing an alignment setting of the X-misalignment. On this alignment setting screen 1000, the alignment setting of the X-misalignment can be performed. Here, portions different from those in FIG. 13A will be mainly described. The X-correction reference region Arx as the correction reference region Ar is displayed on the alignment setting screen 1000 so as to be superimposed on the pre-alignment image 1002*a*. In addition, an X-correction setting region 1200 for performing the X-misalignment correction setting is displayed in the parameter setting region 1010.

In the X-correction setting region 1200, a check box CB803 for switching whether to execute the X-correction, a detailed setting button 1201 configured to perform a detailed setting of the X-correction, an edge selection field 1202 for selecting an edge detection target, an edge level setting field 1203 for setting an edge level, and an automatic setting button 1204 for automatically setting an edge level are displayed.

When the display control unit 205 detects that the detailed setting button 1201 has been selected by the input unit 300, the display control unit 205 displays an X-correction detailed setting region 1210 on the alignment setting screen 1000 of the display unit 400. An example of the X-correction detailed setting region 1210 is illustrated in FIG. 15B. In the X-correction detailed setting region 1210, an edit button 1211 configured to set the X-correction reference region Arx, an edge level setting field 1203 for setting an edge level, an automatic setting button 1204 for automatically setting an edge level, an edge direction selection field 1212 for setting an edge direction, a detection direction selection field 1213 for selecting a detection direction of an edge, and a detection label setting field 1214 for setting a detection label are displayed. Further, a check box CB804 for selecting whether to use a second X-correction reference region Arx may be displayed. When detecting that the check box CB804 is checked, the correction setting unit 206*b* receives a setting of the second X-correction reference region Arx as the correction reference region Ar. Details are similar to the setting of the X-correction reference region Arx, and thus, are omitted.

(Correction Setting Procedure and Generation of Height Image for Inspection)

A method of generating a height image for inspection based on an alignment setting set on the alignment setting screen 1000 will be described.

Figure 14B:
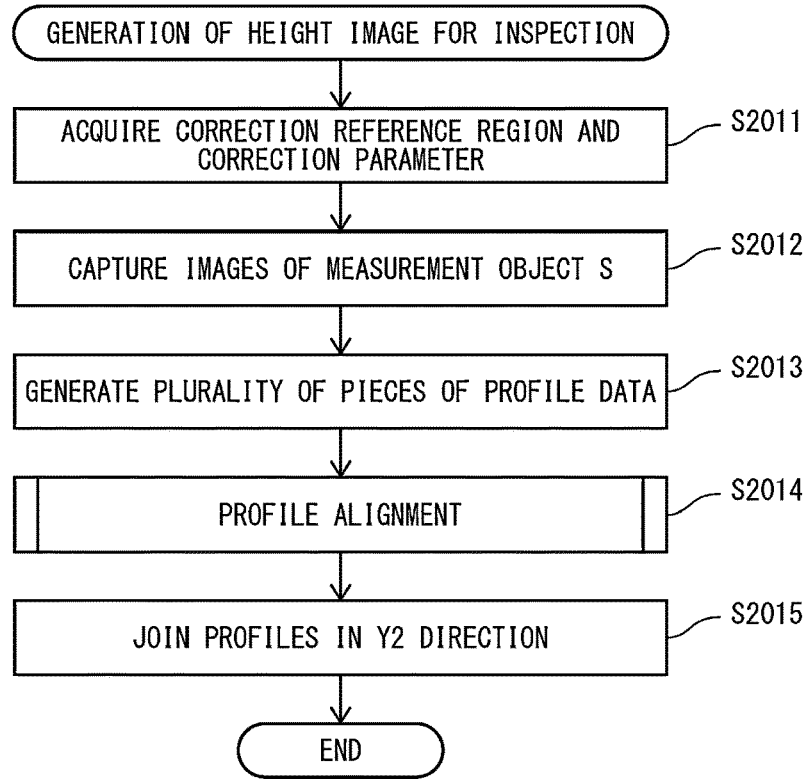
Figure 14C:
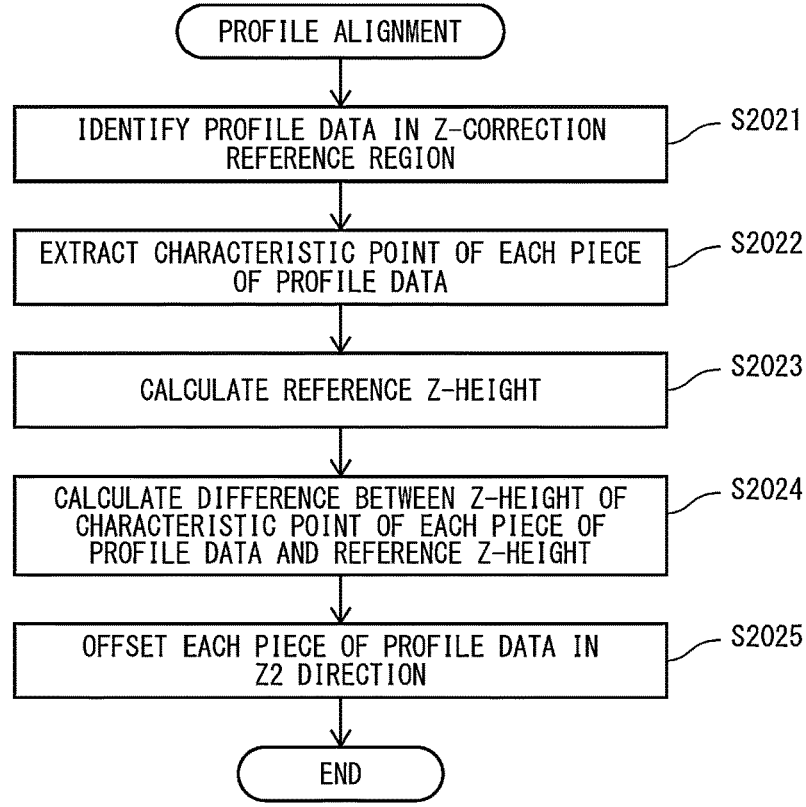

First, the alignment setting and generation of the height image Hi for inspection are performed according to the flowcharts of FIGS. 14A and 14B. Note that a difference from the flowcharts of FIGS. 14A and 14B will be mainly described herein. The X-correction reference region Arx is used as the correction reference region Ar.

In addition, the correction parameter set in S2008 may include various parameters set in FIGS. 15A and 15B such as the presence or absence of the X-correction set in the check box CB803 illustrated in FIG. 15A, the X-correction reference region Arx, an edge type selected in the edge selection field 1202, an edge level set in the edge level setting field 1203, an edge direction selected in the edge direction selection field 1212, a detection direction set in the detection direction selection field 1213, and a detection label set in the detection label setting field 1214. Hereinafter, the X-correction reference region Arx refers to at least one of the X-correction reference region Arx and the second X-correction reference region Arx.

In addition, the height image generation unit 202 offsets the profile data Pd acquired in S2013 in the X2 direction in S2014. As a result, profile alignment which is displacement correction of the profile data Pd is performed. Details of the profile alignment will be described with reference to FIG. 16.

Figures 16, 17:
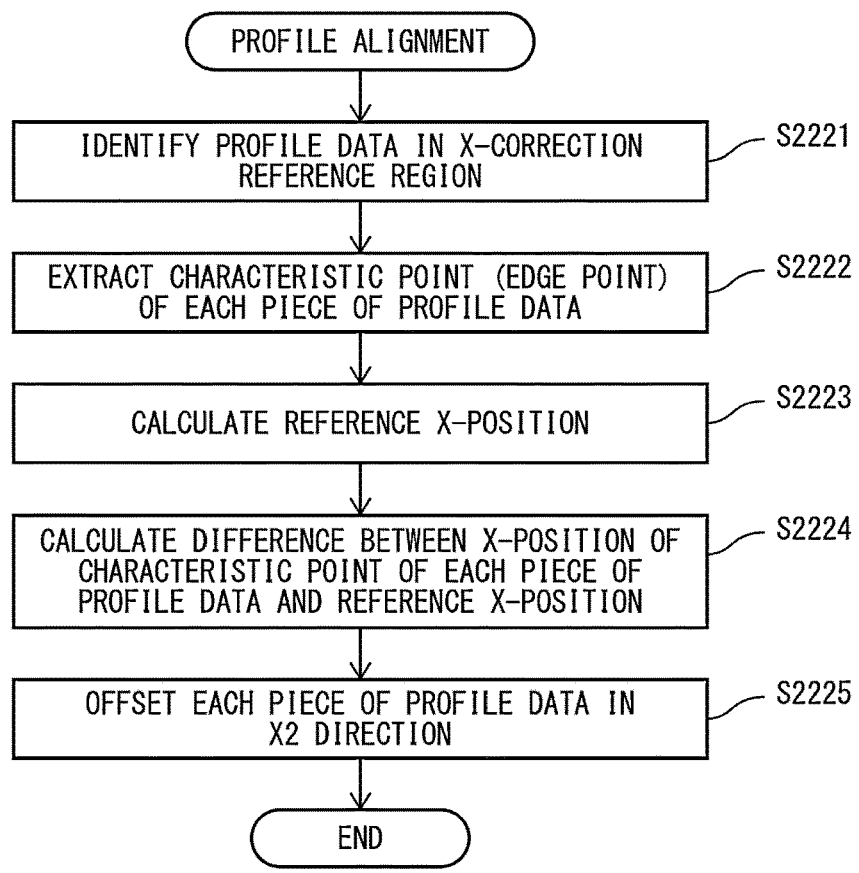
FIG. 16 is a flowchart illustrating processing performed by the control unit.
FIG. 17 is a view illustrating correction parameters.

Next, the profile alignment in S2014 will be described with reference to a flowchart in FIG. 16.

First, the height image generation unit 202 identifies the profile data Pd existing in the X-correction reference region Arx for each of the plurality of pieces of profile data Pd acquired from the profile data generation unit 201 (Step S2221).

Next, the height image generation unit 202 extracts an edge point, which is a characteristic point, from the profile data Pd in the X-correction reference region Arx extracted in S2221, for each of the plurality of pieces of profile data (Step S2222).

Subsequently, the height image generation unit 202 calculates the reference X-position Xr based on an X-position of the characteristic point calculated from each of the plurality of pieces of profile data Pd (Step S2223). As the reference X-position Xr, for example, an average value of X-positions of a plurality of characteristic points can be used. In addition, an X-position of a characteristic point extracted from the profile data Pd of the first line in the X-correction reference region Arx may be used as the reference X-position Xr.

Next, the height image generation unit 202 calculates a difference between the reference X-position Xr and the X-position of the characteristic point extracted from one piece of the profile data Pd, for each of the plurality of pieces of profile data Pd (Step S2224). The difference calculated herein corresponds to an offset amount of one piece of the profile data Pd during the profile alignment. Note that the difference that is the offset amount is calculated so as to reduce the displacement between the plurality of pieces of profile data Pd.

Next, the height image generation unit 202 offsets each of the plurality of pieces of profile data Pd in the X2 direction by the difference that is the offset amount calculated in S2244 (Step S2225).

Through the above processes of S2221 to S2225, profiles are aligned, and the aperiodic misalignment is corrected regardless of the displacement period (vibration period) of the plurality of pieces of profile data Pd.

(Relationship Between Correction Parameter and Correction Content)

A relationship between the correction parameter set in FIG. 16 and the profile alignment will be described.

(X-Correction Reference Region Arx)

The X-correction reference region Arx is set as a two-dimensional region extending in the Y2 direction. That is, in the X2-Y2 plane, the two-dimensional region having the Y2 direction as the longitudinal direction is set as the X-correction reference region Arx. Since the X-correction reference region Arx extending in the Y2 direction is set in this manner, the reference X-position Xr, which is a reference of X-positions, can be set along the Y2 direction. Then, the height image generation unit 202 arranges the plurality of pieces of profile data Pd generated at the respective positions in the Y2 direction in accordance with the reference X-position Xr set along the Y2 direction. That is, the height image generation unit 202 corrects the profile data Pd so as to reduce the displacement generated between pieces of the profile data Pd whose positions in the Y2 direction are different. Note that, in the X-correction reference region Arx, the Y2 direction represents a range in which the profile correction is applied, and the X2 direction represents a range in which the correction amount is calculated.

(Edge Selection Field 1202)

An edge selection field 1202 illustrated in FIG. 15A is a selection field for selecting an image to extract an edge point which is a characteristic point. For example, the edge selection field 1202 may be selectable between the height image Hi and a luminance image Ii. A case where the profile alignment is performed using the luminance image Ii will be described later.

(Edge Level Setting Field 1203)

The edge level setting field 1203 illustrated in FIG. 15A is a setting field configured to detect an edge point which is a characteristic point of the profile data Pd existing in the X-correction reference region Arx. The height image generation unit 202 detects a point at which the profile data Pd crosses an edge level set in the edge level setting field 1203 as an edge point which is a characteristic point.

The correction setting unit 206*b* acquires the edge level input to the edge level setting field 1203, and receives a setting of the edge level input to the edge level setting field 1203 as the edge level which is one of the correction parameters. In addition, when detecting that the automatic setting button 1204 is clicked, the correction setting unit 206*b* outputs an edge level setting instruction to the height image generation unit 202. The height image generation unit 202 that has received the edge level setting instruction automatically sets an edge level, and sets the edge level in the correction setting unit 206*b*. As the edge level, for example, an average value of pieces of profile data included in the X-correction reference region Arx may be used.

(Edge Direction Selection Field 1212)

The edge direction selection field 1212 illustrated in FIG. 15B is a setting field for setting a change direction of a profile at the time of detecting an edge point which is a characteristic point. The edge direction selection field 1212 may adopt a drop-down method in which "both directions", "rising", "falling", and the like are prepared in advance. For example, when detecting that "rising" is selected in the edge direction selection field 1212, the correction setting unit 206*b* receives a setting of "rising" as the edge direction which is one of the correction parameters. In a case where 1 mm is set as the edge level in the edge level setting field 1203 and "rising" is set as the edge direction in the edge direction selection field 1212, the height image generation unit 202 extracts a point where profile data crosses a referred plane, obtained by offsetting the reference plane by 1 mm, from the bottom to the top as an edge point which is a characteristic point. Note that, in a case where "falling" is selected as the edge direction, the height image generation unit 202 extracts a point where profile data crosses the referred plane from the top to the bottom as a characteristic point. In addition, in a case where "both directions" are selected as the edge direction, the height image generation unit 202 extracts a point crossing the referred plane in the X-correction reference region Arx as a characteristic point regardless of the direction crossing the referred plane.

(Detection Direction Selection Field 1213)

The detection direction selection field 1213 illustrated in FIG. 15B is a setting field for setting a direction of detecting an edge point which a characteristic point. The detection direction selection field 1213 may adopt a drop-down method in which options representing directions, such as "right to left (←)" and "left to right (→)", are prepared in advance. For example, when detecting that an option of detecting an edge from right to left is selected in the detection direction setting field 2045, the correction setting unit 206*b* receives a setting of "from right to left" as the detection direction which is one of the correction parameters. In this case, the height image generation unit 202 extracts edge points which are characteristic points in order from right to left of the profile data Pd.

Based on the X-correction reference region Arx, the edge level, the edge direction, and the detection direction, which are the correction parameters, set as described above, the height image generation unit 202 extracts the edge points as the characteristic points for the plurality of pieces of profile data Pd, respectively. Note that it is not always necessary to use all the above-described correction parameters at the time of extracting a characteristic point. At least the X-correction reference region Arx may be set as the correction parameter.

The X-misalignment correction of the profile data Pd and the generation of the height image for inspection will be further described.

The height image generation unit 202 extracts the edge point of the profile data Pd as the characteristic point, for each of the plurality of pieces of profile data Pd acquired from the profile data generation unit 201 during the setting. For example, the height image generation unit 202 can calculate an average of the extracted characteristic points from pieces of the profile data Pd, and set such an average value as the reference X-position Xr that is the correction reference of profile data. Then, the height image generation unit 202 extracts the edge point as the characteristic point of the profile data Pd for each of the plurality of pieces of profile data Pd acquired from the profile data generation unit 201 during the operation. Then, the height image generation unit 202 offsets the profile data Pd in the X2 direction such that an X-position of the extracted characteristic point becomes the reference X-position Xr. In this manner, it is possible to obtain pieces of the profile data Pd corrected such that the X-positions of the characteristic points are aligned on the reference X-position Xr. Then, the height image generation unit 202 arranges the pieces of profile data Pd, offset in the X2 direction, in the Y2 direction and joins the pieces of profile data Pd to generate the height image for inspection.

(Method of Storing Correction Parameter)

A method of storing the correction parameter for Z-correction set in FIGS. 13A and 13B and the correction parameter for X-correction set in FIGS. 15A and 15B will be described with reference to FIG. 17.

Each of the correction parameters is set in the correction setting unit 206b per correction method. As the correction parameter related to the Z-correction, the presence or absence of the Z-correction selected in the check box CB801, the Z-correction reference region Arz, the mask upper limit value, and the mask lower limit value are set. Here, the Z-correction reference region may store coordinates of two points located on a diagonal line of the Z-correction reference region Arz displayed on the display unit 22 as illustrated in FIG. 17. In addition, as the correction parameters related to the X-correction, the presence or absence of the X-correction selected in the check box 803, the X-correction reference region Arx, the edge level, the edge direction, and the detection direction are set.

That is, the correction setting unit 206b has a hierarchical structure classified into a higher hierarchy that stores a correction method and a lower hierarchy that stores correction parameters corresponding to the correction method. Each of the set correction parameters is stored in the correction setting unit 206b in a form dependent on the correction method which is the higher hierarchy. Since the correction parameters are set in the hierarchical form in this manner, it is possible to easily identify any correction method to which each of the correction parameters relates, and the correction processing can be efficiently implemented.

(Method of Calculating Offset Amount)

A method of calculating an offset amount will be described with reference to FIGS. 18A to 18C.

Figure 18A:
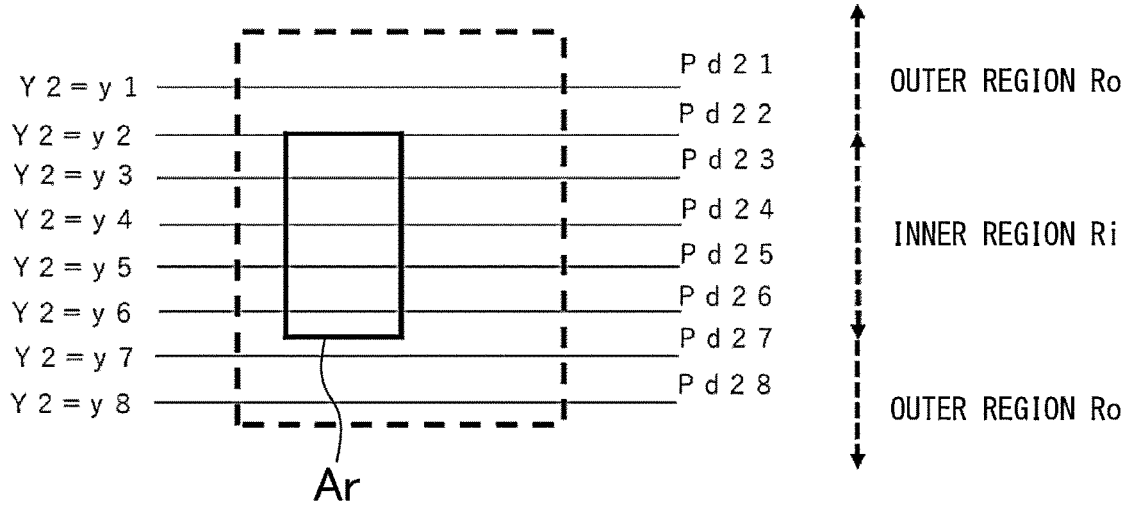
FIGS. 18A to 18C are views illustrating a set correction reference region.

FIG. 18A is a view illustrating a case where one region is designated as the correction reference region Ar. In this example, a height image is constituted by eight pieces of profile data Pd21 to Pd28 whose positions in the Y2 direction are different. In addition, among the eight pieces of profile data Pd21 to 28, Pd22 to Pd26 exist in an inner region Ri in the correction reference region Ar, and three pieces of the profile data Pd of Pd21, Pd27, and Pd28 exist in outer regions Ro outside the correction reference region Ar.

Further, it is not always possible to calculate an offset amount for all of the pieces of profile data Pd22 to Pd26 existing in the inner region Ri. There may be a case where it is difficult for the height image generation unit 202 to extract a characteristic point, and as a result, it is difficult to calculate the offset amount, for example, due to the absence of an edge exceeding an edge level set as a correction parameter or the like. For example, it is assumed that the height image generation unit 202 has failed in calculating an offset amount for the profile data Pd23. A method of calculating an offset amount in such a case will be described.

First, an offset amount of the profile data Pd22 in the inner region Ri is used as an offset amount of the profile data Pd21 in the outer region Ro. In addition, an offset amount of the profile data Pd26 in the inner region Ri is used as offset amounts of pieces of the profile data Pd27 and Pd28 in the outer region Ro. That is, the offset amount of the profile data Pd in the outer region Ro is calculated based on the offset amount of the profile data Pd in the inner region Ri. For example, an offset amount of the outermost profile data Pd in the inner region Ri may be used as the offset amount of the profile data Pd in the outer region Ro, or a value obtained by averaging offset amounts of the plurality of pieces of profile data Pd in order from the outside of the inner region Ri may be used. Furthermore, the offset amount of the profile data Pd of the outer region Ro may be calculated so as to gradually decrease as the distance from the inner region Ri increases.

Next, since an offset amount has been calculated for each piece of the profile data Pd regarding the offset amounts of the profile data Pd22 and Pd24 to Pd26 in the inner region Ri, the calculated offset amounts may be directly used.

Then, an offset amount of the profile data Pd23, which exists in the inner region Ri but has failed in calculating the offset amount, is calculated based on the offset amounts of the preceding and subsequent pieces of profile data Pd22 and Pd24. For example, the offset amount of Pd23 may be calculated from the internal division of the offset amounts of Pd22 and Pd24, or an average value of the offset amounts of Pd22 and Pd24 may be calculated as the offset amount of Pd23.

Figure 18B:
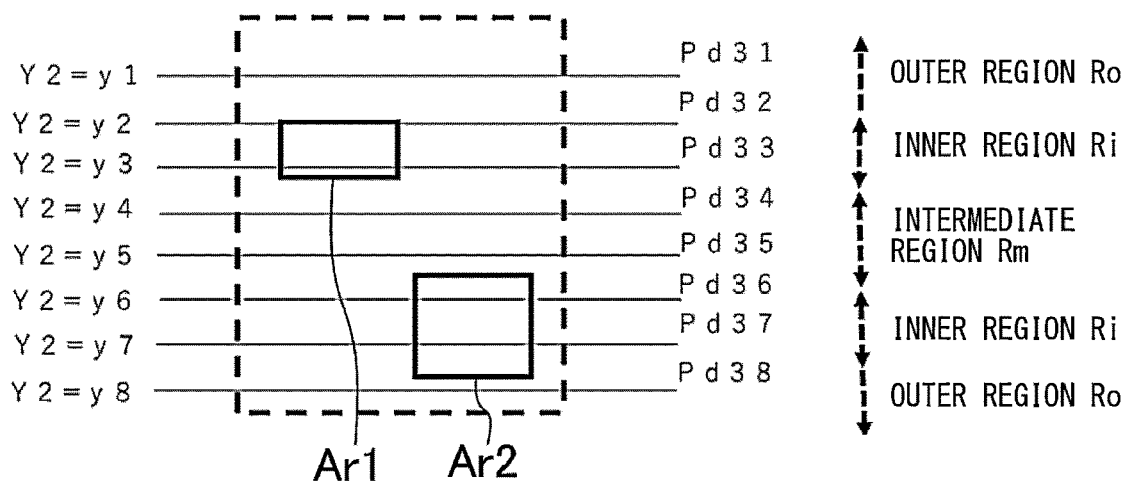

FIG. 18B is a view illustrating a case where a first correction reference region Ar1 and a second correction reference region Ar2 are designated as the correction reference regions Ar, and the first correction reference region Ar1 and the second correction reference region Ar2 do not overlap in the Y2 direction. In FIG. 18B, a content different from FIG. 18A will be mainly described.

In the example of FIG. 18B, the two correction reference regions Ar that do not overlap in the Y2 direction are designated, and there is an intermediate region Rm surrounded by the inner regions Ri. Offset amounts of pieces of profile data Pd34 and Pd35 existing in the intermediate region Rm can be calculated based on offset amounts of pieces of profile data Pd33 and Pd36 in the inner regions Ri. For example, the offset amounts of the pieces of profile data Pd34 and Pd35 existing in the intermediate region Rm may be calculated from the internal division of the offset amounts of Pd33 and Pd36, or may be calculated from an average of the offset amounts of Pd33 and Pd36. That is, the offset amount of the profile data Pd existing in the intermediate region Rm, that is not included in the correction reference region Ar, is calculated based on the offset amount of the profile data included in the first correction reference region Ar1 and the offset amount of the profile data included in the second correction reference region Ar2.

Figure 18C:
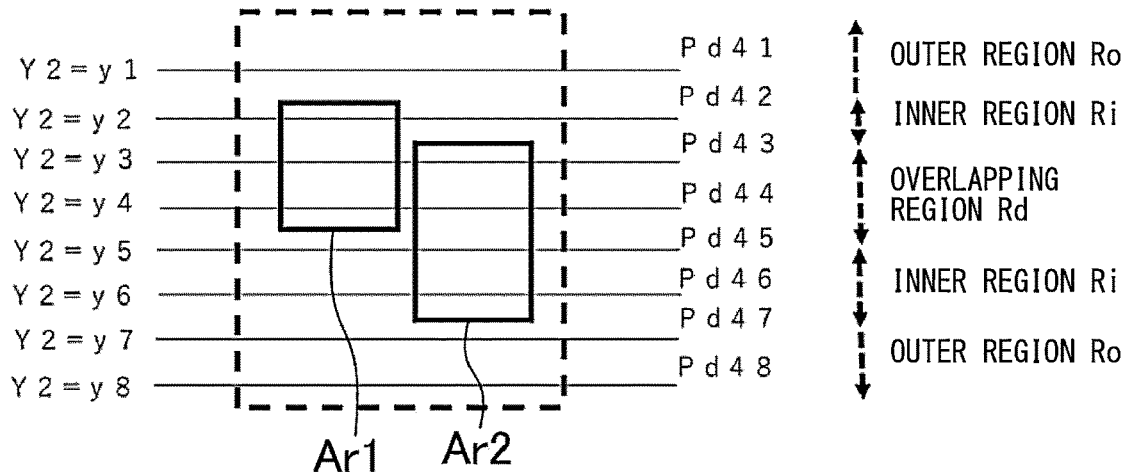

FIG. 18C is a view illustrating a case where the first correction reference region Ar1 and the second correction reference region Ar2 are designated as the correction reference regions Ar, and these correction reference regions Ar1 and Ar2 overlap in the Y2 direction. Here, a content different from FIGS. 18A and 18B will be mainly described.

Since the two correction reference regions Ar1 and Ar2 that overlap in the Y2 direction are designated in the example of FIG. 18C, there is an overlapping region Rd designated by the two correction reference regions Ar1 and Ar2. Offset amounts of pieces of profile data Pd43 and Pd44 existing in the overlapping region Rd can be calculated using an average value of an offset amount calculated for the profile data Pd existing in the first correction reference region Ar1 and an offset amount calculated for the profile data Pd existing in the second correction reference region Ar2. In addition, the offset amount of the profile data Pd existing in the overlapping region Rd can also be determined based on a change amount from the preceding or subsequent profile data Pd without being limited to the above average value. In addition, the height image generation unit 202 determines whether or not a difference between the offset amount calculated for the profile data Pd existing in the first correction reference region Ar1 and the offset amount calculated for the profile data Pd existing in the second correction reference region Ar2 falls within a predetermined threshold, and the average value of the offset amount calculated for the profile data Pd existing in the first correction reference region Ar1 and the offset amount calculated for the profile data Pd existing in the second correction reference region Ar2 is used as the offset amount of the profile data Pd existing in the overlapping region Rd when it is determined that the difference falls within the threshold. In addition, when the height image generation unit 202 determines that the difference does not fall within the threshold, the offset amount of the profile data Pd existing in the overlapping region Rd can also be determined based on the change amount from the preceding or subsequent profile data Pd.

In a case where a defective point such as a crack and a scratch is generated in a part of the measurement object S, the profile data Pd corresponding to the defective point is different from the original profile data Pd of the measurement object S. Even in such a case, the validity of each offset amount can be determined by comparing the offset amount for the profile data Pd existing in the first correction reference region Ar1 and the offset amount for the profile data Pd existing in the second correction reference region Ar2 calculated by the height image generation unit 202. When the respective offset amounts fall within the threshold, that is, the offset amounts are close to each other, the height image generation unit 202 determines that there is no defective point in the measurement object and both the offset amounts are valid. In addition, when the respective offset amounts deviate from each other by the threshold or more, the height image generation unit 202 determines that the defective point is generated in the measurement object and the validity of one of the offset amounts is low.

A description will be given regarding a method of determining an offset amount of the profile data Pd existing in the overlapping region Rd based on a change amount from an offset amount of the preceding or subsequent profile data Pd.

As an example, it is assumed that an offset amount of the profile data Pd43 calculated from the first correction reference region Ar1 is 10, and an offset amount of the profile data Pd43 calculated from the second correction reference region Ar2 is 100. In addition, it is assumed that an offset amount of the profile data Pd44 calculated from the first correction reference region Ar1 is 8, and an offset amount of the profile data Pd44 calculated from the second correction reference region Ar2 is 150.

In this case, the offset amount of the profile data Pd44 calculated from the first correction reference region Ar1 is changed by 2 from the offset amount of the immediately preceding profile data Pd43 calculated from the first correction reference region Ar1. On the other hand, the offset amount of the profile data Pd44 calculated from the second correction reference region Ar2 is changed by 50 from the offset amount of the immediately preceding profile data Pd43 calculated from the second correction reference region Ar2. Since a change amount from the offset amount of the immediately preceding profile data Pd is smaller in the offset amount calculated from the first correction reference region Ar1 than in the offset amount calculated from the second correction reference region Ar2, it is possible to use 8, which is the offset amount calculated from the first correction reference region Ar1, as the offset amount of the profile data Pd44.

That is, an offset amount of one piece of the profile data Pd existing in the overlapping region Rd can be determined by a comparison with an offset amount of at least one piece of the profile data Pd before and after the one piece of profile data Pd.

Specifically, the height image generation unit 202 compares an offset amount of one piece of the profile data Pd and an offset amount of referred profile data Pd existing before or after the one piece of profile data Pd regarding the offset amount calculated from the first correction reference region Ar1 to calculate a difference.

Further, the height image generation unit 202 compares an offset amount of one piece of the profile data Pd and an offset amount of referred profile data Pd existing before or after the one piece of profile data Pd regarding the offset amount calculated from the second correction reference region Ar2 to calculate a difference. Then, the height image generation unit 202 can compare the difference calculated from the first correction reference region Ar1 and the difference calculated from the second correction reference region Ar2 and determine the smaller difference as the offset amount of the one piece of profile data Pd. Since the offset amount of the profile data Pd is calculated based on the change amount from the preceding or subsequent profile data Pd in the first correction reference region Ar1 and the second correction reference region Ar2 in this manner, a gradual change estimated as a vibration component can be used as the offset amount.

Another Embodiment of X-Misalignment Correction

The method of performing the X-misalignment correction based on the edge point which is the extracted characteristic point has been described as above. Next, another embodiment of the X-misalignment correction will be described with reference to FIGS. 19, 20A, and 20B.

(User Interface)

Figure 19:
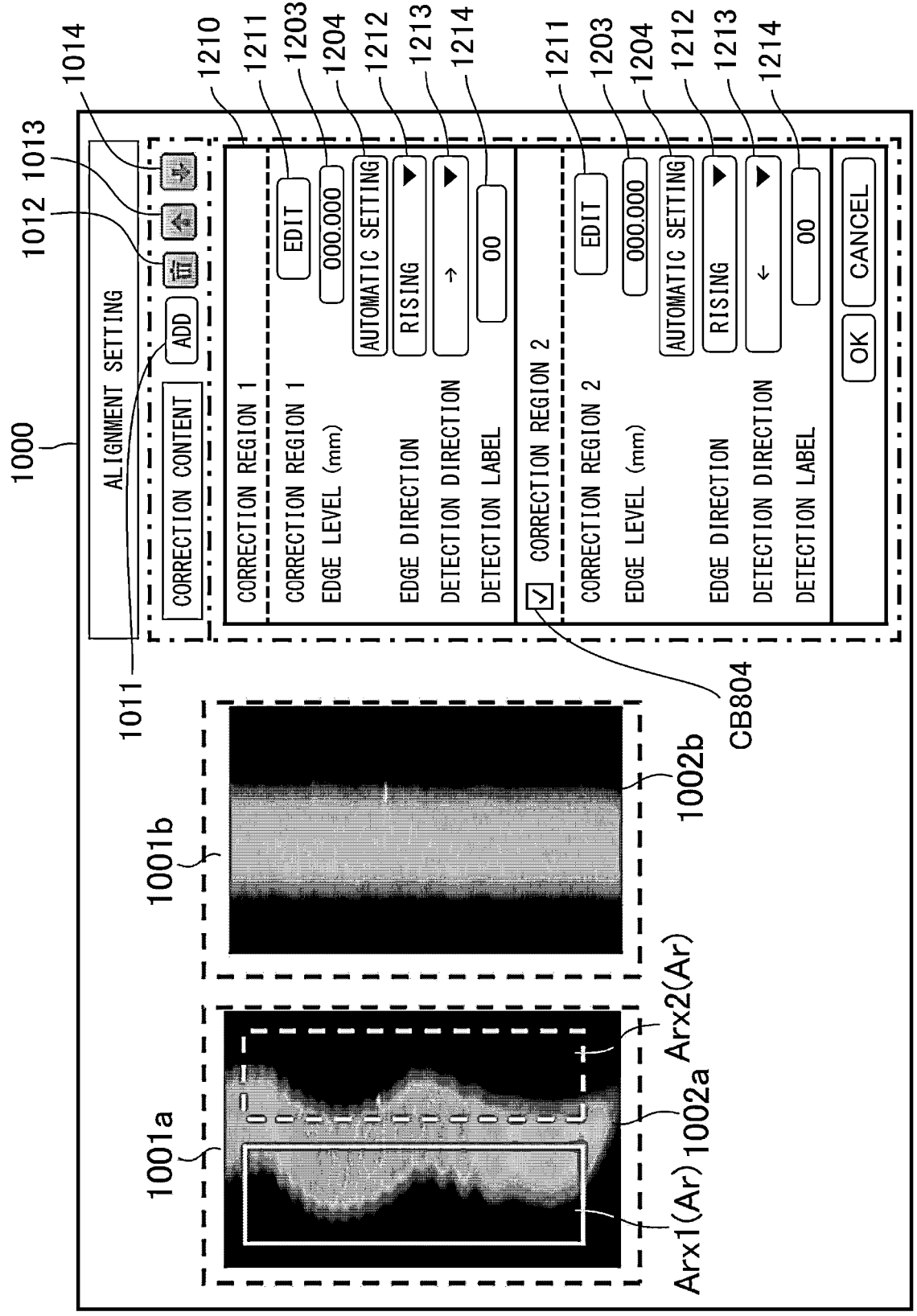
FIG. 19 is a view illustrating the user interface.

FIG. 19 is a view illustrating an example of the alignment setting screen 1000 for performing an X-misalignment correction setting. Here, a method of correcting the X-misalignment will be described.

When the display control unit 205 detects that the detailed setting button 1201 illustrated in FIG. 15A has been selected by the input unit 300, the display control unit 205 displays the X-correction detailed setting region 1210 on the alignment setting screen 1000 of the display unit 400. In the X-correction detailed setting region 1210, a first X-correction reference region Arx1 and a second X-correction reference region Arx2 can be set. In addition, the edit button 1211 configured to set the X-correction reference region Arx, the edge level setting field 1203 for setting an edge level, the automatic setting button 1204 for automatically setting an edge level, the edge direction selection field 1212 for setting an edge direction, the detection direction selection field 1213 for selecting a detection direction of an edge, and the detection label setting field 1214 for setting a detection label may be displayed for each of the first X-correction reference region Arx1 and the second X-correction reference region Arx2. Note that whether to use the second X-correction reference region Arx2 for the X-misalignment correction may be selected according to a selected state of the check box CB804.

(Correction Setting Procedure and Generation of Height Image for Inspection)

A method of generating a height image for inspection based on an alignment setting set on the alignment setting screen 1000 will be described with reference to flowcharts of FIGS. 20A and 20B.

Figure 20A:
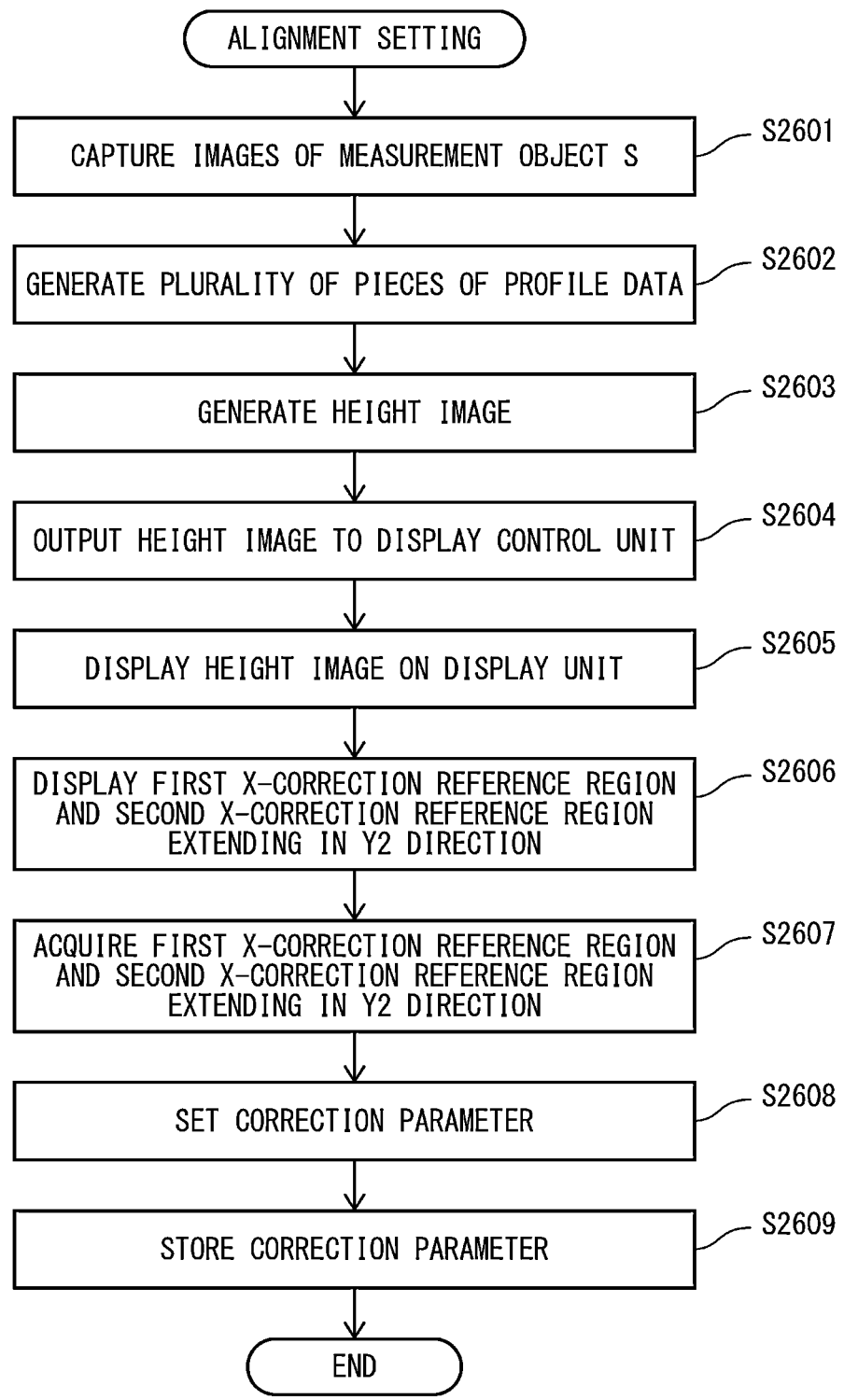
FIGS. 20A and 20B are flowcharts illustrating processing performed by the control unit.
Figure 20B:
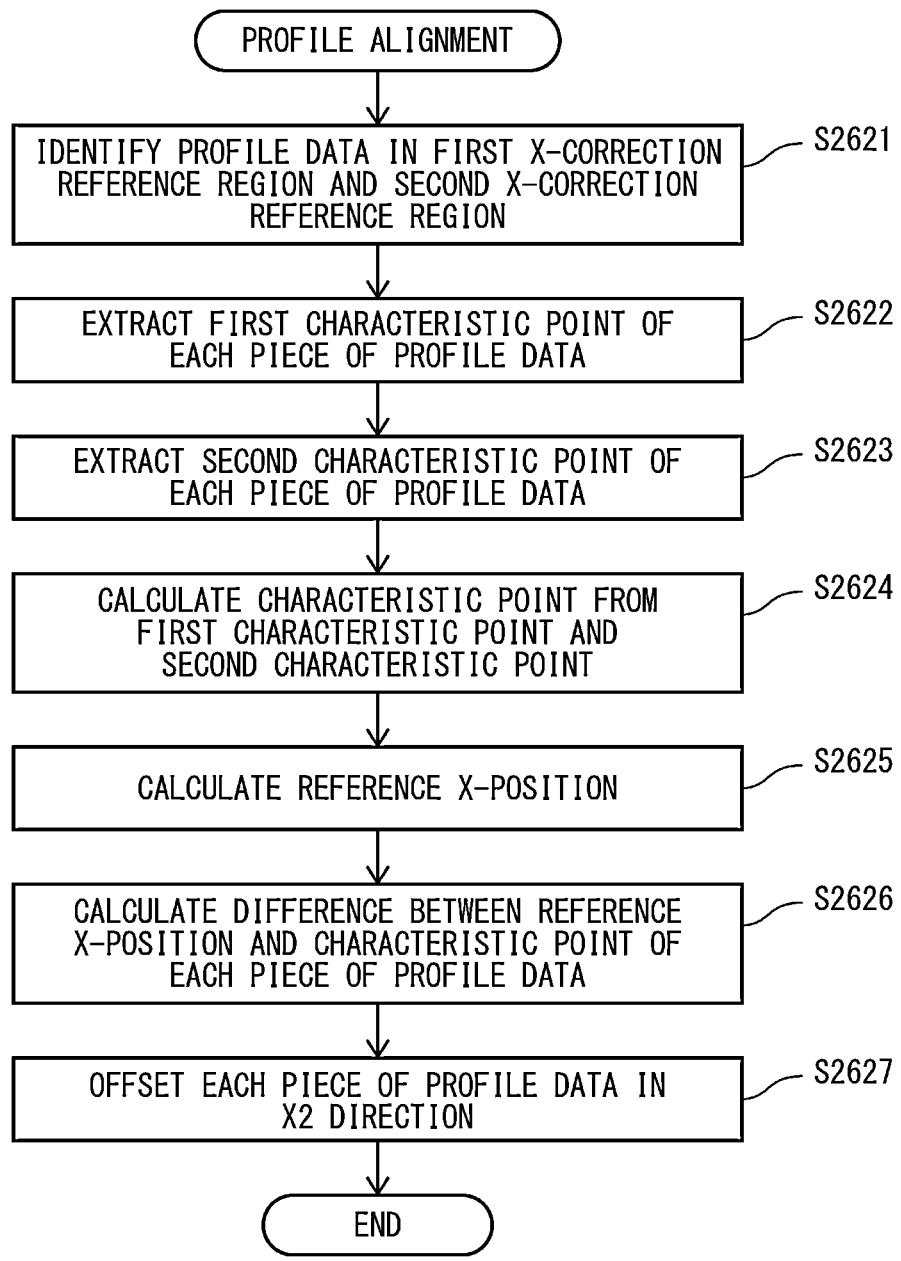

FIG. 20A is a view illustrating an alignment setting procedure for the X-misalignment. Here, a difference from the flowchart illustrated in FIG. 14A will be mainly described.

In Step S2606, the display control unit 205 detects an operation of the input unit 300 performed by a user, and displays the first X-correction reference region Arx1 and the second X-correction reference region Arx2 extending in the Y2 direction on the display unit 400.

Next, in Step S2607, the correction setting unit 206b acquires the first X-correction reference region Arx1 and the second X-correction reference region Arx2 extending in the Y2 direction set in S2606 from the display control unit 205.

In addition, in Step S2608, the correction setting unit 206b receives a setting of correction parameters performed by the user. The correction parameter set here further includes the first X-correction reference region Arx1 and the second X-correction reference region Arx2 as the X-correction reference regions Arx.

Next, a height image for inspection is generated by a procedure similar to that in FIG. 14B.

Next, the profile alignment illustrated in S2014 of FIG. 14B will be described with reference to the flowchart of FIG. 20B.

First, the height image generation unit 202 identifies the profile data Pd existing in the first X-correction reference region Arx1 and the second X-correction reference region Arx2 for each of the plurality of pieces of profile data Pd acquired from the profile data generation unit 201 (Step S2621).

Next, the height image generation unit 202 extracts an edge point, which is a first characteristic point, from the profile data Pd in the first X-correction reference region Arx1 identified in S2621, for each of the plurality of pieces of profile data Pd (Step S2622). This edge point, which is the first characteristic point, is a first auxiliary characteristic point configured to calculate a characteristic point.

Next, the height image generation unit 202 extracts an edge point, which is a second characteristic point, from the profile data Pd in the second X-correction reference region Arx2 identified in S2621, for each of the plurality of pieces of profile data Pd (Step S2623). This edge point, which is the second characteristic point, is a second auxiliary characteristic point configured to calculate a characteristic point.

Next, the height image generation unit 202 calculates the characteristic point based on the first characteristic point, which is the auxiliary characteristic point extracted in S2622, and the second characteristic point, which is the auxiliary characteristic point extracted in S2623, for each of the plurality of pieces of profile data Pd (Step S2624). In the calculation of the characteristic point, for example, an average value of the first characteristic point and the second characteristic point may be used, or a weighted average value may be used.

Subsequently, the height image generation unit 202 calculates the reference X-position Xr based on an X-position of the characteristic point calculated from each of the plurality of pieces of profile data Pd (Step S2625). As the reference X-position Xr, for example, an average value of X-positions of a plurality of characteristic points can be used. In addition, an X-position of a characteristic point extracted from the profile data Pd of the first line in the X-correction reference region Arx may be used as the reference X-position Xr.

Next, the height image generation unit 202 calculates a difference between the reference X-position Xr and the X-position of the characteristic point extracted from one piece of profile data, for each of the plurality of pieces of profile data Pd (Step S2626). The difference calculated herein corresponds to an offset amount of one piece of the profile data Pd during the profile alignment.

Next, the height image generation unit 202 offsets each of the plurality of pieces of profile data Pd in the X2 direction by the offset amount calculated in S2626 (Step S2627).

Through the above processes of S2621 to S2627, the profile data is aligned. Since the characteristic point is calculated based on the plurality of auxiliary characteristic points in this manner, even a point that does not exist on one piece of profile data can be set as the characteristic point. Therefore, a vibration component generated in the profile data Pd can be corrected regardless of a shape of a measurement object.

3. Inclination Correction (Overview of Inclination Correction)

Figure 21A:
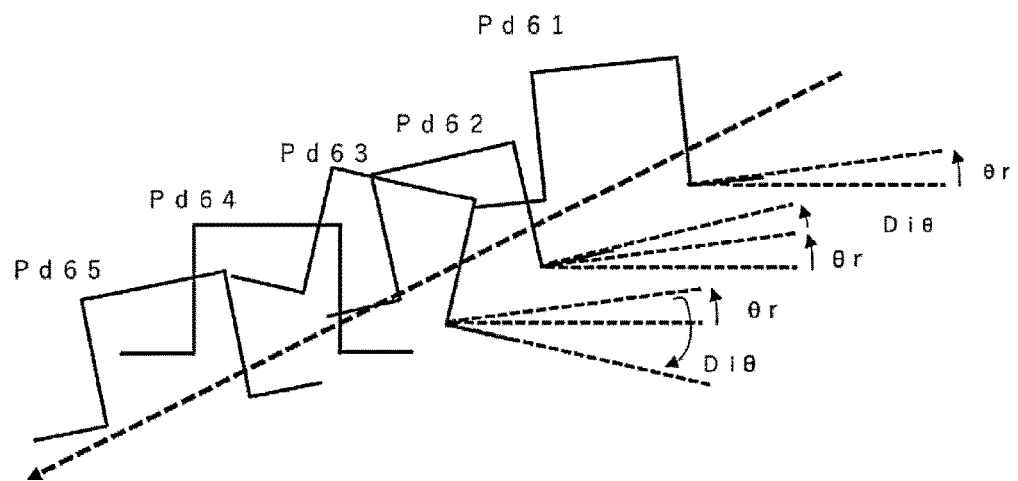
FIGS. 21A and 21B are views illustrating inclination correction.
Figure 21B:
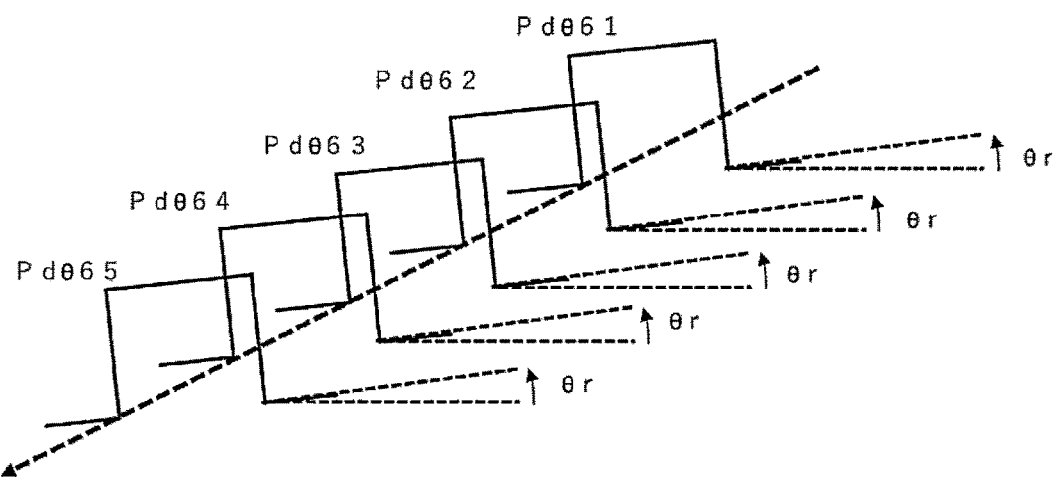

FIGS. 21A and 21B are views illustrating inclination correction. The plurality of pieces of the profile data Pd generated by the profile data generation unit 201 with different positions in the Y2 direction are denoted by Pd61, Pd62, Pd63, Pd64, and Pd65 illustrated in FIG. 21A. In addition, the movement direction of the measurement object S is indicated by a dotted arrow.

In a case where the measurement object S is conveyed on the belt conveyor C without vibrating, an inclination of each piece of the profile data Pd61 to Pd65 is constant. However, in a case where the inclination of the profile data Pd61 is defined as a correction reference angle θr as an example, the profile data Pd62 and Pd65 have positive inclinations with respect to the correction reference angle θr. In addition, the profile data Pd63 and Pd64 have negative inclinations with respect to the correction reference angle θr. Note that a case of rotating in the counterclockwise direction from the correction reference angle θr is referred to as the positive inclination, and a case of rotating in the clockwise direction is referred to as the negative inclination, but this is for the sake of description, and the present invention is not limited thereto.

In this manner, the measurement object S vibrates in a rotation direction with the movement direction as a rotation axis. As a result, the vibration in the rotation direction occurs in the pieces of profile data Pd, and the inclinations are not constant.

Therefore, the height image generation unit 202 calculates an inclination deviation amount Die, which is a difference between the correction reference angle θr and an actual inclination, for each piece of the profile data Pd. Then, the profile data is offset in the rotation direction in accordance with the calculated inclination deviation amount Die. In this manner, the plurality of pieces of profile data Pd whose positions in the Y2 direction are different are aligned so as to have the equal inclination in the Y2 direction as illustrated in FIG. 21B.

The height image generation unit 202 arranges the pieces of profile data Pd, offset in the rotation direction in this manner, in the Y2 direction, thereby generating the height image Hi representing the three-dimensional shape of the measurement object S.

The alignment of the profile data Pd illustrated in the present embodiment focuses on each piece of the profile data Pd. One piece of the profile data Pd is defined in the X2-Z2 plane. Therefore, if the correction reference angle θr in the X2-Z2 plane and an inclination of one piece of the profile X2-Z2 data Pd are known, the height image generation unit 202 can correct the inclination of the one piece of profile data Pd to the correction reference angle θr. In addition, this processing offsets each piece of the profile data Pd in the rotation direction.

Hereinafter, the inclination correction will be specifically described with a user interface.

(User Interface of Inclination Correction Setting)

Figure 22A:
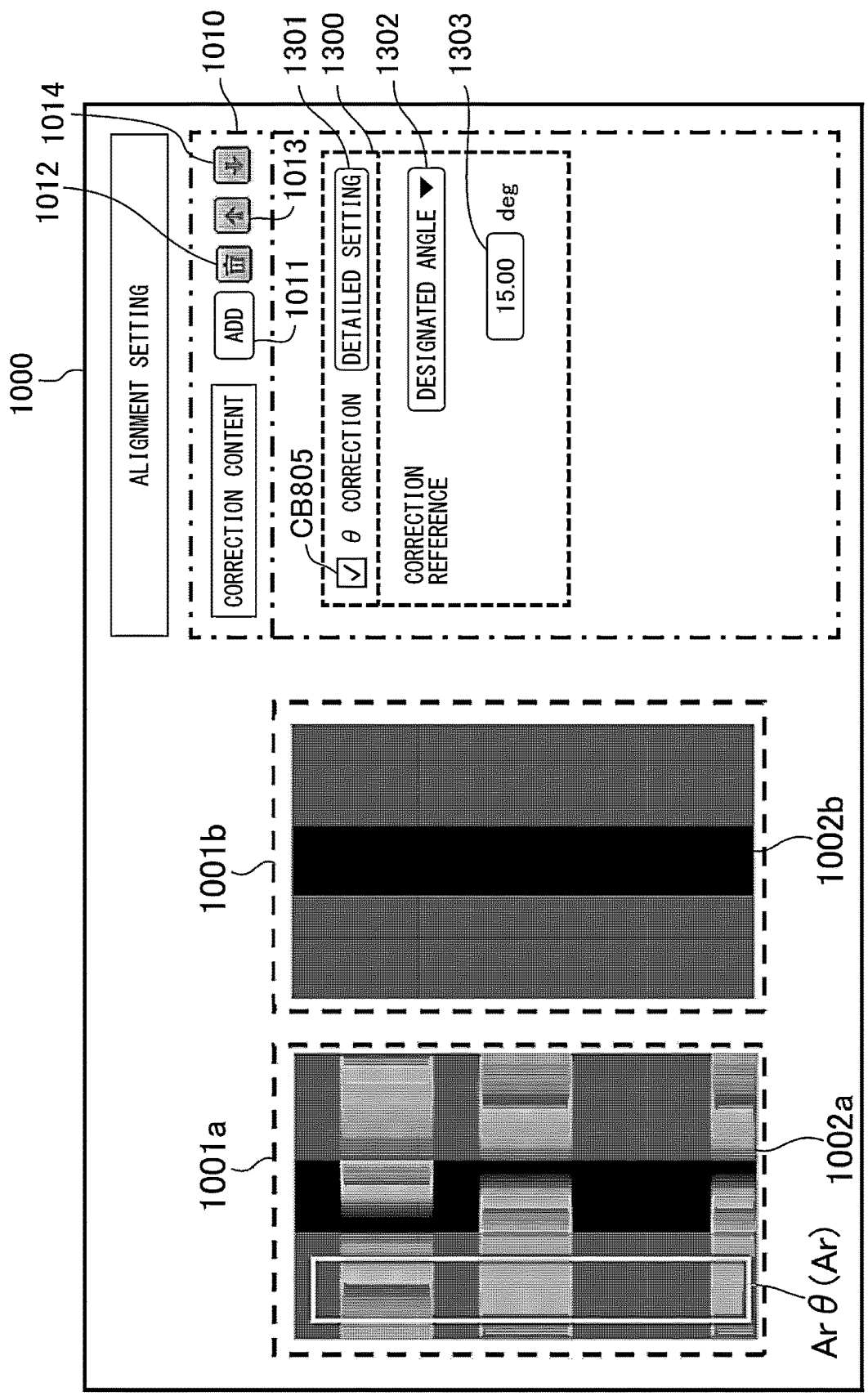
FIGS. 22A and 22B are views illustrating the user interface.

FIG. 22A is a view illustrating a user interface of the alignment setting screen 1000 displayed on the display unit 400. On this alignment setting screen 1000, an inclination alignment setting can be performed. Here, a difference from FIG. 13A will be mainly described.

An inclination correction reference region Are is displayed to be superimposed on the pre-alignment image 1002a. In addition, an inclination correction setting region 1300 for performing an inclination correction setting is displayed in the parameter setting region 1010.

In the inclination correction setting region 1300, a check box CB805 for switching whether to execute inclination correction, a detailed setting button 1301 configured to perform a detailed setting of the inclination correction, a correction reference selection field 1302 for selecting a correction reference, and a correction reference angle setting field 1303 for setting a correction reference angle are displayed.

The correction reference selection field 1302 may adopt a drop-down method in which "designated angle" and "follow first line" are prepared in advance. Note that "designated angle" is obtained as the correction setting unit 206b detects an angle which has been input in the correction reference angle setting field 1303 and sets the angle as the correction reference angle θr. In addition, "following the first line" means that the height image generation unit 202 identifies an inclination of a profile of the first line detected in the inclination correction reference region and sets the inclination as the correction reference angle θr.

In addition, when the display control unit 205 detects that the detailed setting button 1301 has been selected by the input unit 300, the display control unit 205 displays an inclination correction detailed setting region 1310 on the alignment setting screen 1000 of the display unit 400.

Figure 22B:
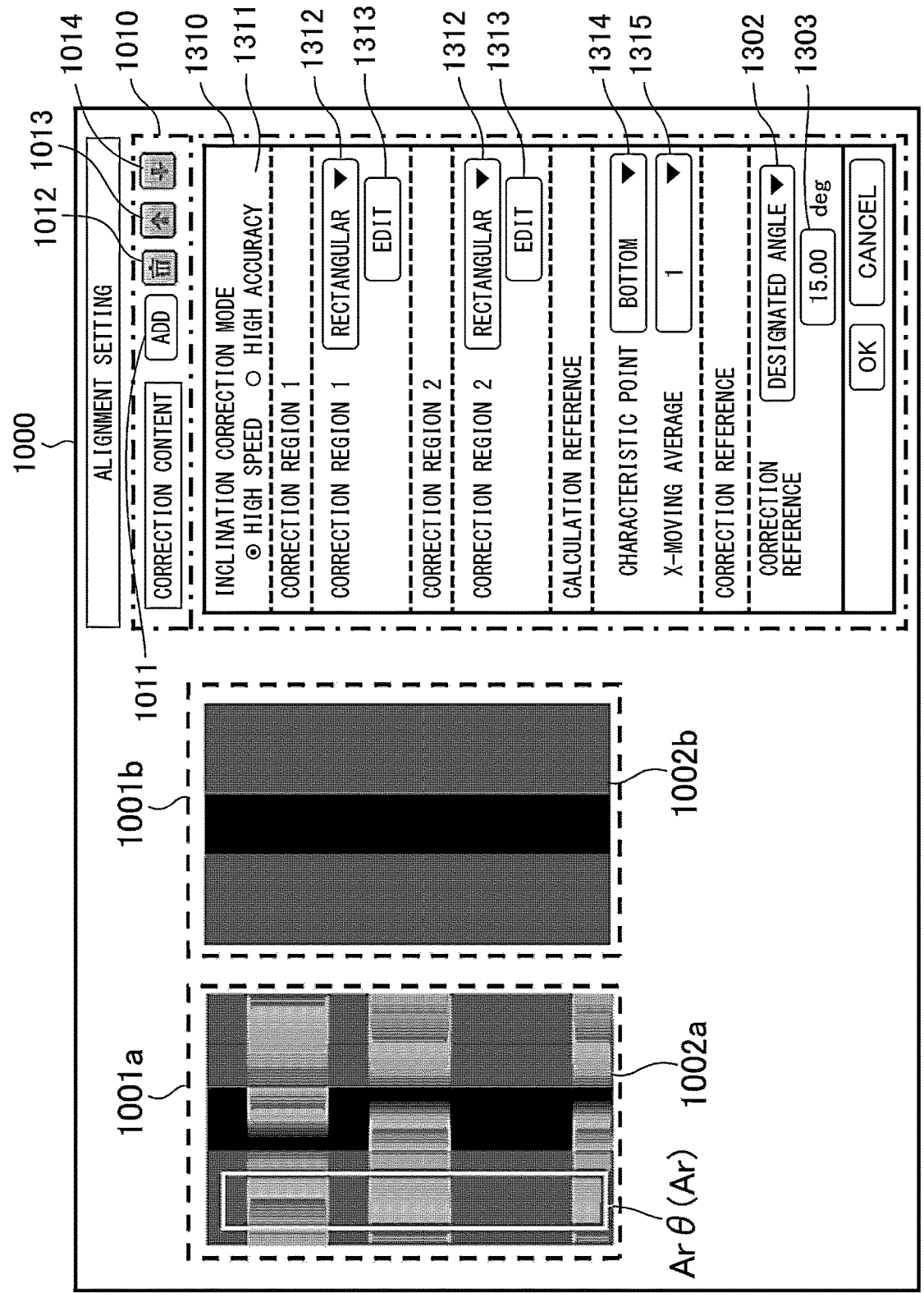

FIG. 22B is a view illustrating an example of the inclination correction detailed setting region 1310. In the inclination correction detailed setting region 1310, a correction mode selection field 1311 for selecting an inclination correction mode, an inclination correction reference region selection field 1312 for selecting a shape of the inclination correction reference region Are, which is the correction reference region Ar, an edit button 1313 configured to edit the inclination correction reference region Are, a calculation reference selection field 1314 for selecting a calculation reference of a characteristic point, a moving average setting field 1315 for setting a moving average in the X2 direction, a correction reference selection field 1302 for selecting a correction reference, and a correction reference angle setting field 1303 for setting a correction reference angle are displayed. Note that a first inclination correction reference region Arθ1 and a second inclination correction reference region Arθ2 may be settable as the inclination correction reference region Are.

When detecting that the detailed setting button 1301 is clicked, the correction setting unit 206b receives a setting of the correction mode, the inclination correction reference region Arθ, the calculation standard of the characteristic point, the moving average, and the correction reference as correction parameters.

(Correction Setting Procedure and Generation of Height Image for Inspection)

Figure 23A:
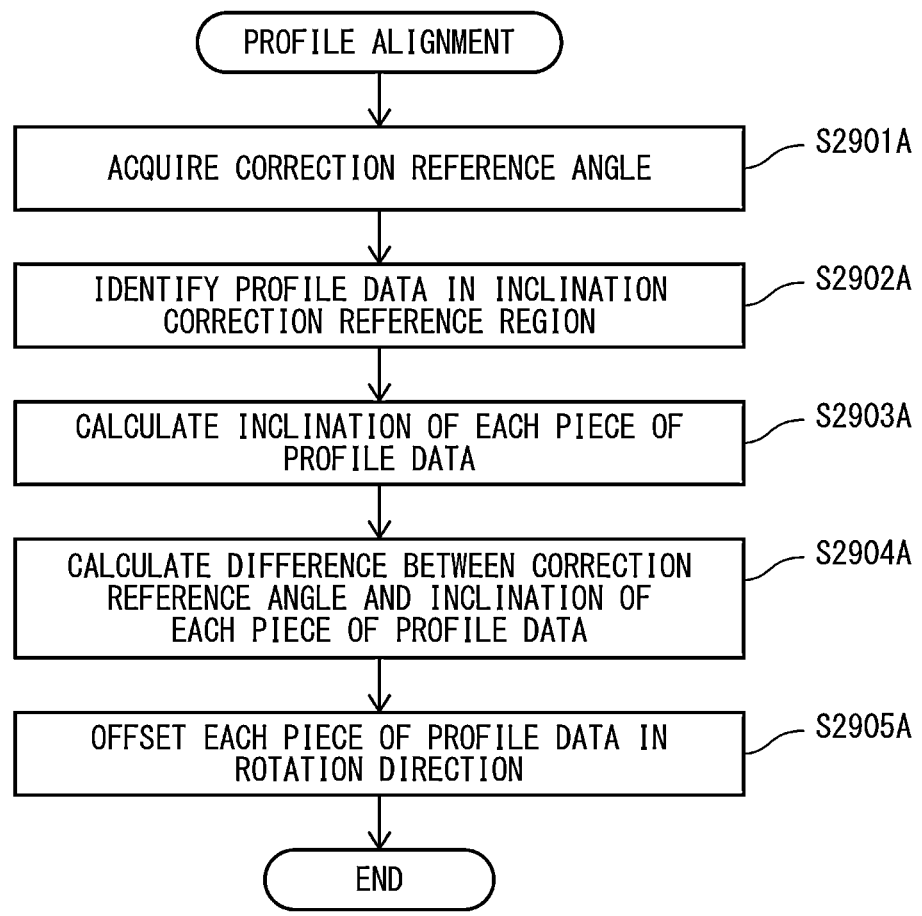
FIGS. 23A and 23B are flowcharts illustrating processing performed by the control unit.
Figure 23B:
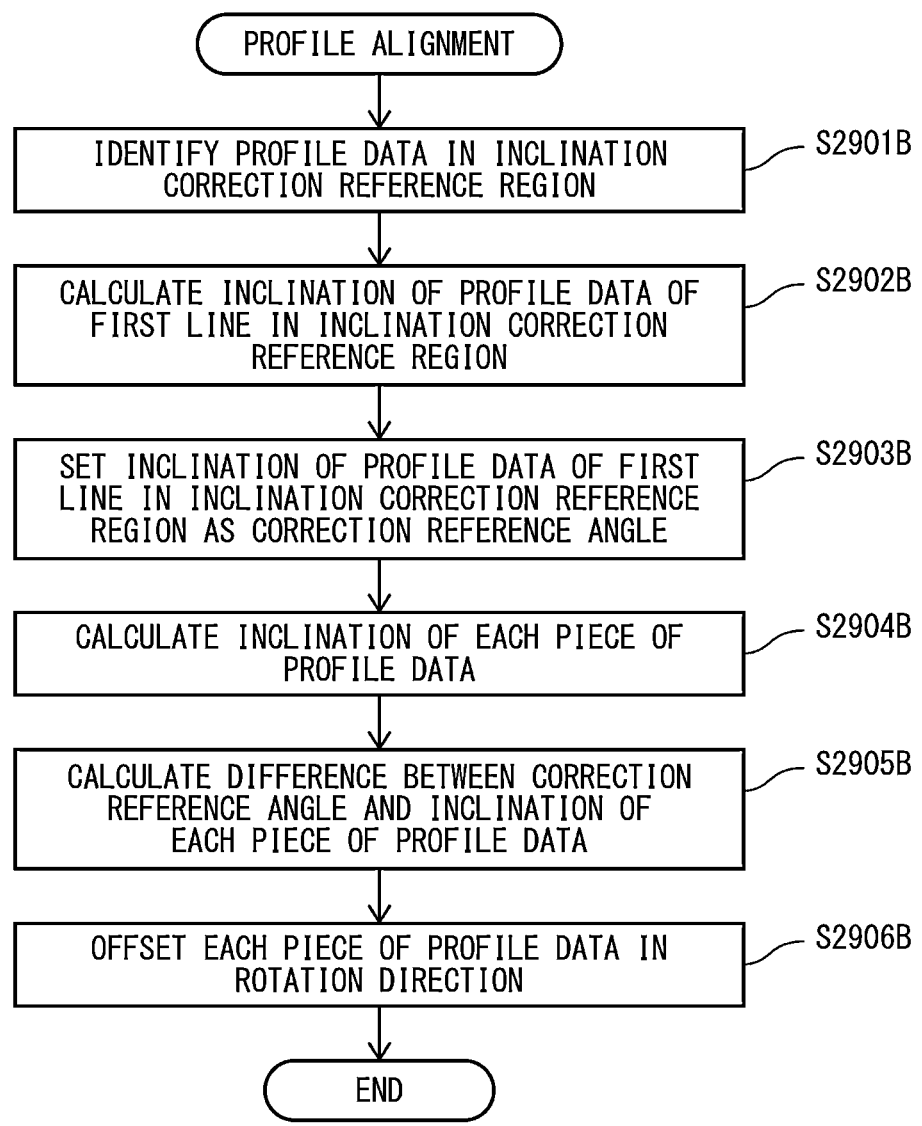

FIGS. 23A and 23B are flowcharts illustrating profile alignment procedures in the inclination correction. FIG. 23A illustrates the profile alignment procedure in a case where the "designated angle" is selected in the correction reference selection field 1302 and FIG. 23B illustrates the profile alignment procedure in a case where "follow first line" is selected in the correction reference selection field 1302. Note that the alignment setting and generation of a height image for inspection are similar to those in FIGS. 14A and 14B, respectively, and thus, are omitted.

First, a case where the profile data Pd is aligned with the correction reference angle θr set in the correction reference angle setting field 1303 will be described with reference to the flowchart of FIG. 23A.

The height image generation unit 202 acquires the correction reference angle θr from the correction setting unit 206b (Step S2901A).

Next, the height image generation unit 202 identifies the profile data Pd existing in the inclination correction reference region Are for each of the plurality of pieces of profile data Pd acquired from the profile data generation unit 201 (Step S2902A).

Next, the height image generation unit 202 calculates an inclination value of each piece of the profile data Pd in the inclination correction reference region Are identified in S2902A, for each of the plurality of pieces of profile data Pd (Step S2903A).

Subsequently, the height image generation unit 202 calculates a difference between the inclination value of the profile data Pd and the correction reference angle θr acquired in S2901A as an inclination correction amount Die, for each of the plurality of pieces of profile data Pd (Step S2904A).

Next, the height image generation unit 202 offsets the profile data Pd by the inclination correction amount Die in the rotation direction such that the inclination of one piece of the profile data Pd becomes the correction reference angle θr, for each of the plurality of pieces of profile data Pd (Step S2905A).

Through the above processes of S2901A to S2905A, the profile data Pd is offset in the rotation direction so that the inclination deviation in the rotation direction is aligned. Next, a case where an inclination of each piece of the profile data Pd is aligned with an inclination of the first line in the inclination correction reference region Are will be described with reference to the flowchart of FIG. 23B.

The height image generation unit 202 identifies profile data existing in the inclination correction reference region Are for each of the plurality of pieces of profile data Pd acquired from the profile data generation unit 201 (Step S2901B).

Next, the height image generation unit 202 identifies the profile data Pd of the first line existing in the inclination correction reference region Are, and calculates an inclination value of the profile data Pd (Step S2902B). Then, the height image generation unit 202 sets the inclination value acquired in S2902B in the correction setting unit 206b as the correction reference angle θr (Step S2903B).

Next, the height image generation unit 202 calculates an inclination value of the profile data Pd in the inclination correction reference region Are extracted in S2901B, for each of the plurality of pieces of profile data Pd (Step S2904B).

Subsequently, the height image generation unit 202 calculates a difference between the inclination value of one piece of profile data Pd and the correction reference angle θr acquired in S2903B as the inclination correction amount Die, for each of the plurality of pieces of profile data Pd (Step S2905B).

Next, the height image generation unit 202 offsets the profile data Pd by the inclination correction amount Die in the rotation direction such that the inclination of one piece of the profile data Pd becomes the correction reference angle θr, for each of the plurality of pieces of profile data Pd (Step S2906B).

Through the above processes of S2901B to S2906B, the profile data Pd is offset in the rotation direction, and the inclination deviation in the rotation direction is aligned.

In this manner, when the inclination of each piece of the profile data Pd is aligned with the inclination of the first line in the inclination correction reference region Are, the correction reference angle θr differs for each measurement object. In such a case, the height image generation unit 202 can dynamically change the correction reference angle θr for each of the measurement objects S in accordance with an inclination of one piece of the profile data Pd of the measurement object S.

(Offset in Rotation Direction)

Here, an offset in the rotation direction of the profile data Pd will be described. Note that it is assumed that the correction reference angle θr is set to 0 degrees for convenience of the description. That is, it is assumed that each piece of the profile data Pd is aligned so as to remove ab inclination generated in each pieces of the profile data Pd.

A case where "high speed" is selected in the correction mode selection field 1311 of FIG. 22B will be described. In this case, in order to implement the offset processing of the profile data Pd at a high speed, the height image generation unit 202 corrects a position in the Z2 direction without correcting a position in the X2 direction of each piece of the profile data Pd. That is, the height image generation unit 202 projects the position in the Z2 direction of pre-correction profile data, rotated by Die in the positive direction from the correction reference angle θr, on a straight line having an inclination of the correction reference angle θr, thereby acquiring profile data after the correction. Such correction of the inclination deviation by projecting the position in the Z2 direction on the straight line of the correction reference angle θr is referred to as an offset in the rotation direction in a high speed mode.

Next, a case where "high accuracy" is selected in the correction mode selection field 1311 in FIG. 22B will be described. In this case, each point of the profile data Pd is rotated in accordance with the inclination correction amount Die in order to implement the offset processing of the profile data Pd with high accuracy. That is, the position of each point of the pre-correction profile data, rotated by Die in the positive direction from the correction reference angle θr, is rotated by Die in the negative direction, thereby acquiring post-correction profile data. Such correction of the inclination deviation by rotating a profile in accordance with the inclination correction amount Die in this manner is referred to as an offset in the rotation direction in a high accuracy mode.

4. Modification (Estimation of Characteristic Point)

Here, as an example, a method of estimating a characteristic point from the profile data Pd obtained by capturing images of the measurement object S having a V-shaped groove by the imaging head 100 will be described. As described in the Z-misalignment correction and the X-misalignment correction, the correction setting unit 206b can receive the setting of the correction reference region Ar so as to include a V-shaped groove portion, and the height image generation unit 202 can extract a bottom point in the correction reference region Ar as a characteristic point.

However, there are cases where it is difficult to measure the groove portion in the imaging head 100, such as a case where the V-shaped groove portion is welded or soldered. Even in such a case, the height image generation unit 202 can offset the profile data Pd so as to align the V-shaped groove portion on a straight line in the Y2 direction by using a characteristic point estimation function to be described in the present embodiment.

First, an alignment setting will be described. The correction setting unit 206b receives a setting of the first correction reference region Ar1 extending in the Y2 direction and the second correction reference region Ar2 extending in the Y2 direction as the correction reference regions Ar on the height image Hi during the setting displayed on the display unit 400. In addition, the correction setting unit 206b receives a setting of a characteristic point extraction method. As the characteristic point extraction method, the correction setting unit 206b can receive, for example, selection of an intersection point between a straight line and a straight line or an intersection point between a circle and a straight line. Hereinafter, a case where the correction setting unit 206b extracts an intersection point of a straight line and a straight line as a characteristic point will be described.

Next, the characteristic point estimation will be described. The height image generation unit 202 identifies the profile data Pd in the first correction reference region Ar1 and the profile data Pd in the second correction reference region Ar2 for each piece of the profile data Pd generated by the profile data generation unit 201. Then, the height image generation unit 202 calculates an approximate straight line of the profile data Pd existing in the first correction reference region Ar1 by a known approximation method such as a least-squares method. In addition, the height image generation unit 202 calculates an approximate straight line similarly for the profile data Pd existing in the second correction reference region Ar2. Further, the height image generation unit 202 calculates an intersection point between the approximate straight line calculated from the first correction reference region Ar1 and the approximate straight line calculated from the second correction reference region Ar2, and sets the intersection point as the characteristic point.

The height image generation unit 202 applies the Z-misalignment correction and the X-misalignment correction to the characteristic point calculated for each of the plurality of pieces of profile data Pd whose positions in the Y2 direction are different. That is, the height image generation unit 202 calculates at least one of the reference Z-height Zr and the reference X-position Xr from a plurality of the characteristic points, and offsets one piece of the profile data Pd in accordance with at least one of a Z-displacement amount, which is a difference between a characteristic point of the one piece of profile data Pd and the reference Z-height Zr, and an X-displacement amount which is a difference between a characteristic point of the one piece of profile data Pd and the reference X-position Xr. As a result, the displacement in at least one of the Z2 direction and the X2 direction is removed, and the profile data Pd in which the characteristic points are aligned in a line in the Y2 direction is obtained.

(Eccentricity Deviation Correction)

When the measurement object S is rotationally moving on a rotary table, an eccentricity deviation occurs in each piece of the profile data Pd. The above-described alignment of the profile data Pd can correct this eccentricity deviation.

When the measurement object S is placed in a state where a center of the measurement object S deviates from a rotation center of the rotary table, the measurement object S seems to vibrate in the X2 direction with respect to the imaging head 100 in accordance with the rotation of the rotary table. Therefore, even if the height image generation unit 202 joins pieces of the profile data Pd generated by the profile data generation unit 201 in the Y2 direction, the pieces of profile data Pd are not aligned on a straight line in the Y2 direction. Even in the case of such an application, the above-described Z-misalignment correction and X-misalignment correction can be applied.

The correction setting unit 206b receives a setting of the correction reference region Ar extending in the Y2 direction on a height image during the setting displayed on the display unit 400 in the same manner as in the above-described Z-misalignment correction and X-misalignment correction. Correction parameters are similar to those of the Z-misalignment correction and the X-misalignment correction, and thus, are omitted.

Next, the height image generation unit 202 calculates a characteristic point from the profile data Pd in the correction reference region Ar extending in the Y2 direction in accordance with the preset correction parameters.

Then, the height image generation unit 202 applies the Z-misalignment correction and the X-misalignment correction to the characteristic point calculated for each of the plurality of pieces of profile data Pd whose positions in the Y2 direction are different. That is, the height image generation unit 202 calculates at least one of the reference Z-height Zr and the reference X-position Xr from a plurality of the characteristic points. Then, the height image generation unit 202 offsets one piece of the profile data Pd in accordance with at least one of a Z-displacement amount, which is a difference between a Z-height of a characteristic point of the one piece of profile data Pd and the reference Z-height Zr, and an X-displacement amount which is a difference between an X-position of a characteristic point of the one piece of profile data Pd and the reference X-position Xr. As a result, a displacement in at least one of the Z2 direction and the X2 direction is corrected.

(Template Fitting)

Next, a case where each piece of the profile data Pd is aligned with a template registered in advance will be described.

As an example, it is assumed that the measurement object S has an outer edge in which an arc and a straight line are combined. In such a case, it is difficult to obtain the height image data Hi representing an accurate shape of the measurement object S even if the profile data Pd is offset such that the Z-height of the characteristic point extracted from each piece of the profile data Pd becomes the reference Z-height Zr or the X-position of the characteristic point becomes the reference X-position Xr.

Therefore, the correction setting unit 206b receives a setting of a correction reference based on the template registered in advance. Then, the height image generation unit 202 offsets the profile data Pd such that the characteristic point extracted from the profile data Pd becomes the correction reference set based on the template. In this manner, the height image generation unit 202 can generate the height image Hi from which the vibration and displacement of the measurement object S have been removed even in the case of the measurement object S whose characteristic points are not aligned on the straight line.

(Correction Setting of Template Fitting)

In a profile alignment of the present embodiment, the correction setting unit 206b receives the registration of the template in advance as the correction reference. A template registration method will be described.

(Template Registration Using Height Image)

For the template registration, for example, the height image Hi generated during the setting by the height image generation unit is used. This case will be described with reference to a flowchart of FIG. 24A. Note that a difference from the flowchart of FIG. 14A will be mainly described herein.

In Step S3506, the display control unit 205 detects an operation of the input unit 300 performed by the user, displays the correction reference region Ar extending in the Y2 direction on the display unit 400, and sets the correction reference region Ar set by the user in the correction setting unit 206b. Note that it is not essential to display the correction reference region Ar on the display unit 400. For example, an input of two coordinates may be received to set the correction reference region Ar in which the received coordinates are set as a diagonal of a rectangle.

Next, in Step S3507, the height image generation unit 202 identifies the profile data Pd included in the correction reference region Ar set in the setting unit, and extracts characteristic points respectively for the plurality of pieces of profile data Pd.

Then, in Step S3508, the height image generation unit 202 sets the respective characteristic points extracted by the height image generation unit 202 in S3507 in the correction setting unit 206b as ideal characteristic points which are correction references. Note that the height image generation unit 202 may set a position of the profile data Pd from which the characteristic point has been extracted and the ideal characteristic point as the correction reference in the correction setting unit 206b in association with each other. That is, the height image generation unit 202 may set a position in the Y2 direction of one piece of the profile data Pd and an X-position and/or a Z-height of an ideal characteristic point of the one piece of profile data Pd in the correction setting unit 206*b* in association with each other for each of the plurality of pieces of profile data Pd whose positions in the Y2 direction are different. The position in the Y2 direction of the profile data Pd may be stored as a line number indicating what number the profile data Pd has been generated from the profile data generation unit 201.

An alignment setting is completed by the above processes of S3501 to S3508. Note that the measurement object S may be precisely positioned with a jig or the like such that no vibration is applied to the measurement object S during the alignment setting.

(Template Registration Using CAD Model)

Figure 24A:
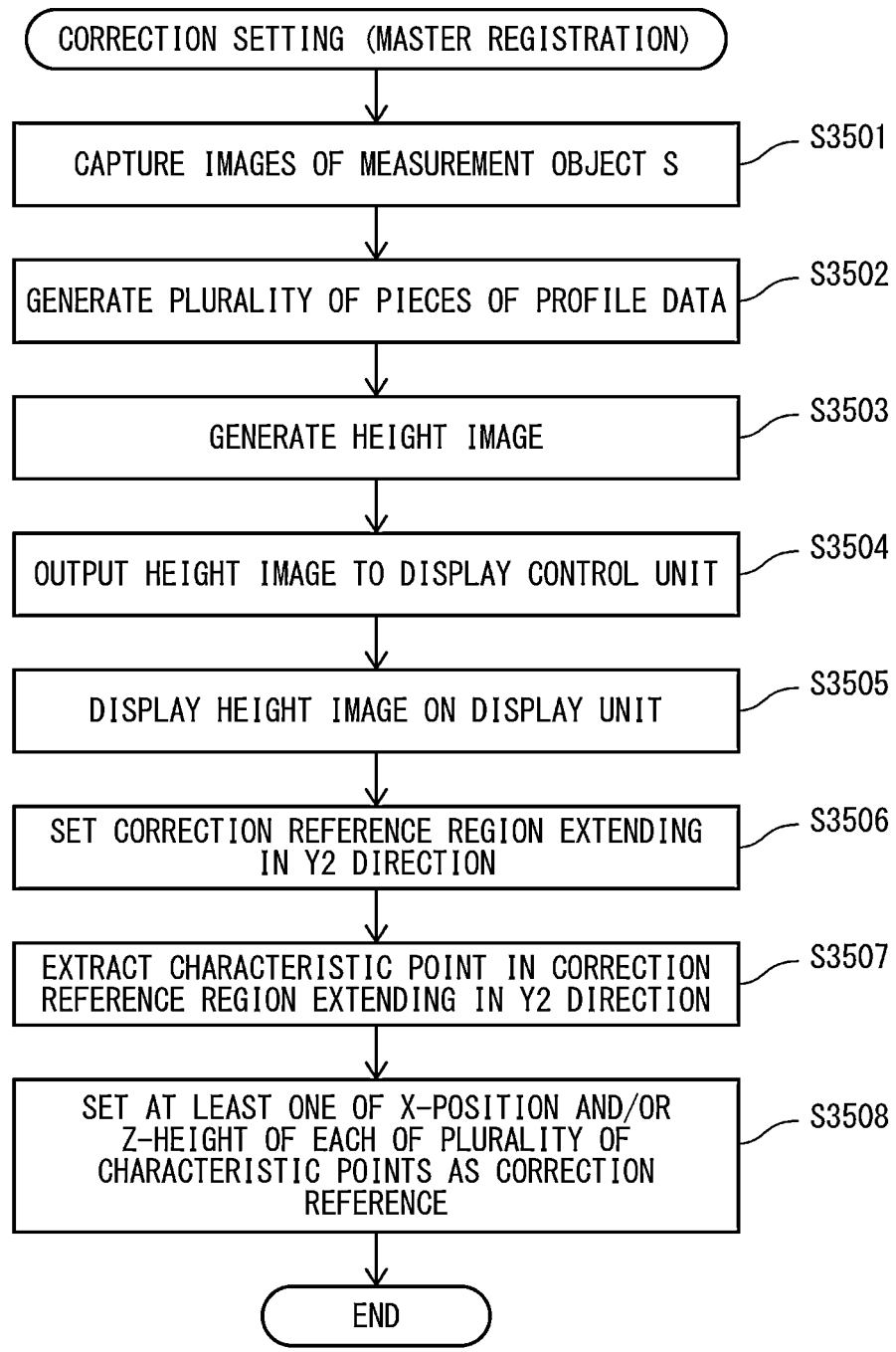
FIGS. 24A and 24B are flowcharts illustrating processing performed by the control unit.

Although the flowchart of FIG. 24A illustrates a procedure of registering the template using the height image data Hi obtained by actually measuring the measurement object S, the template can also be registered using a CAD model. An example thereof will be described next.

The display control unit 205 causes the display unit 400 to display one CAD model selected by an operation of the input unit 300. The processes of S3506 to S3508 in FIG. 24A are executed on the CAD model displayed on the display unit 400. That is, the height image generation unit 202 extracts characteristic points from the CAD model. Then, the height image generation unit 202 can set the respective extracted characteristic points in the correction setting unit 206*b* as ideal characteristic points which are correction references.

Although the case where the profile data Pd is aligned based on the X-position of the edge point extracted as the characteristic point from the height image Hi or CAD data has been mainly described in the above description, the height image generation unit 202 may align the profile data Pd based on the Z-height instead of the X-position of the characteristic point or in addition to the X-position of the characteristic point.

A case where the height image generation unit 202 offsets the profile data Pd based on the Z-height of the characteristic point will be described. In S3507 of FIG. 24A, the height image generation unit 202 identifies the profile data Pd included in the correction reference region Ar. Then, the height image generation unit 202 extracts characteristic points in accordance with correction parameters set in advance for the plurality of pieces of profile data Pd, respectively. Then, in S3508, the height image generation unit 202 sets each of Z-heights of the characteristic points extracted in S3507 in the correction setting unit 206*b* as a correction reference.

Next, a height image for inspection is generated according to the flowchart of FIG. 14B.

Figure 24B:
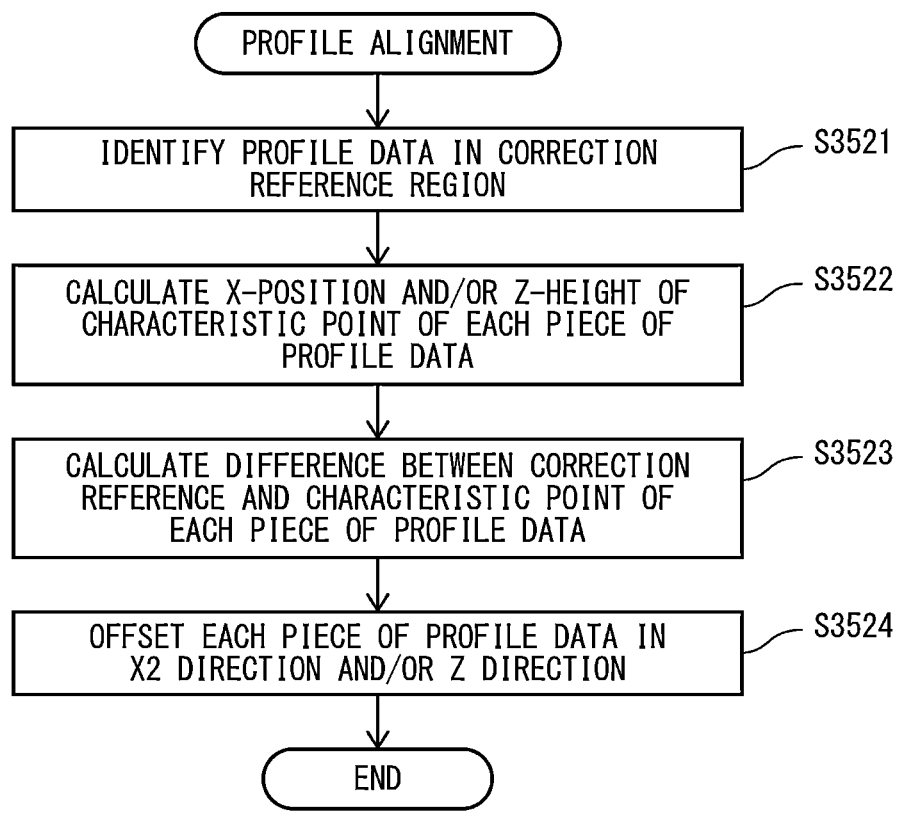

Next, the profile alignment illustrated in S2014 of FIG. 14B will be described with reference to the flowchart of FIG. 24B.

First, the height image generation unit 202 identifies the profile data Pd existing in the correction reference region Ar for each of the plurality of pieces of profile data Pd acquired from the profile data generation unit 201 (Step S3521).

Next, the height image generation unit 202 extracts a characteristic point from the profile data Pd in the correction reference region Ar extracted in S3521, and calculates at least one of an X-position and a Z-height of the characteristic point, for each of the plurality of pieces of profile data Pd (Step S3522).

Subsequently, the height image generation unit 202 calculates a difference between an X-position and/or a Z-height of a characteristic point calculated from one piece of the profile data Pd and an ideal characteristic point, which is a correction reference, corresponding to the one piece of profile data Pd, for each of the plurality of pieces of profile data Pd (Step S3523). The height image generation unit 202 may identify an ideal characteristic point, which is a correction reference, corresponding to one piece of profile data by a line number of the profile data Pd during the setting and a line number of the profile data Pd during the operation. That is, the height image generation unit 202 can use a correction reference with a line number of one, stored in the correction setting unit 206*b*, for the profile data Pd obtained first during the operation.

Then, the height image generation unit 202 offsets each of the plurality of pieces of profile data Pd in at least one of the X2 direction and the Z2 direction by an offset amount calculated in S3523 (Step S3524).

(Correction Amount Memory Function)

In the above description, the case where the difference between the characteristic point of the profile data Pd and the reference X-position Xr, the reference Z-height Zr, or the correction reference is calculated for each piece of the profile data Pd during the operation, and the profile data Pd is offset in accordance with the calculated difference has been described. Here, a case where each piece of the profile data Pd is corrected by a predetermined offset amount when the offset amount (correction amount) is determined in advance will be described.

There is a case where a vibration component added to each piece of the profile data Pd has reproducibility when the measurement object S is conveyed by gripping the measurement object S with a robot connected to a control device, such as a robot control unit and a PLC, or when the measurement object S is moved by gripping the imaging head 100 with a robot. In such a case, the height image generation unit 202 can implement the alignment processing of the profile data Pd at a high speed using a correction amount memory function.

The height image generation unit 202 calculates an offset amount (correction amount) for each of the plurality of pieces of profile data Pd in advance. Then, the height image generation unit 202 can apply an offset amount calculated in advance as the offset amount of the profile data Pd during the operation.

Figure 25A:
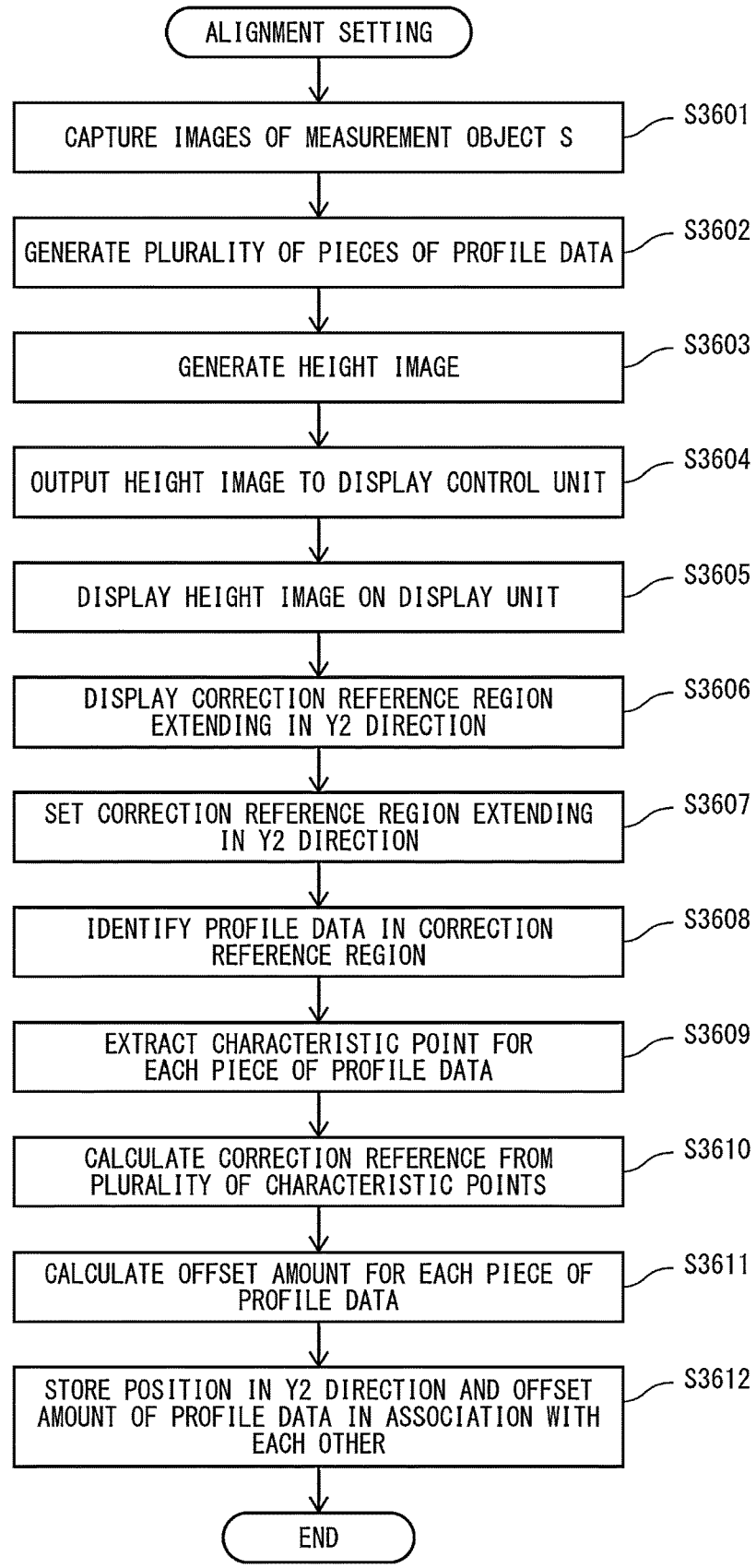
FIGS. 25A and 25B are flowcharts illustrating processing performed by the control unit.

A profile alignment setting method will be described according to a flowchart of FIG. 25A. S3601 to S3607 are similar to S2001 to S2007 in FIG. 14A, and thus, are omitted.

The height image generation unit 202 identifies the profile data Pd included in the correction reference region Ar set in S3607 (Step S3608).

Then, the height image generation unit 202 extracts a characteristic point of the profile data Pd in the correction reference region Ar identified in S3608 for each of the plurality of pieces of profile data Pd whose positions in the Y2 direction are different (Step S3609).

Next, the height image generation unit 202 calculates a correction reference from a plurality of the characteristic points extracted in S3609 (Step S3610). For the calculation of the correction reference, an average of the plurality of characteristic points, a least-squares method, or the like may be used.

Next, the height image generation unit 202 calculates a difference between the characteristic point extracted in S3609 and the correction reference calculated in S3610 as an offset amount, for each of the plurality of pieces of profile data Pd whose positions in the Y2 direction are different, (Step S3611).

Then, the height image generation unit 202 stores the offset amount calculated in S3611 in the correction setting unit 206b in association with the position in the Y2 direction of the profile data Pd, for each of the plurality of pieces of profile data Pd whose positions in the Y2 direction are different (Step S3612). The position in the Y2 direction of the profile data Pd may be stored as a line number indicating what number the profile data Pd has been generated from the profile data generation unit 201.

Next, a height image for inspection is generated according to the flowchart of FIG. 14B.

Figure 25B:
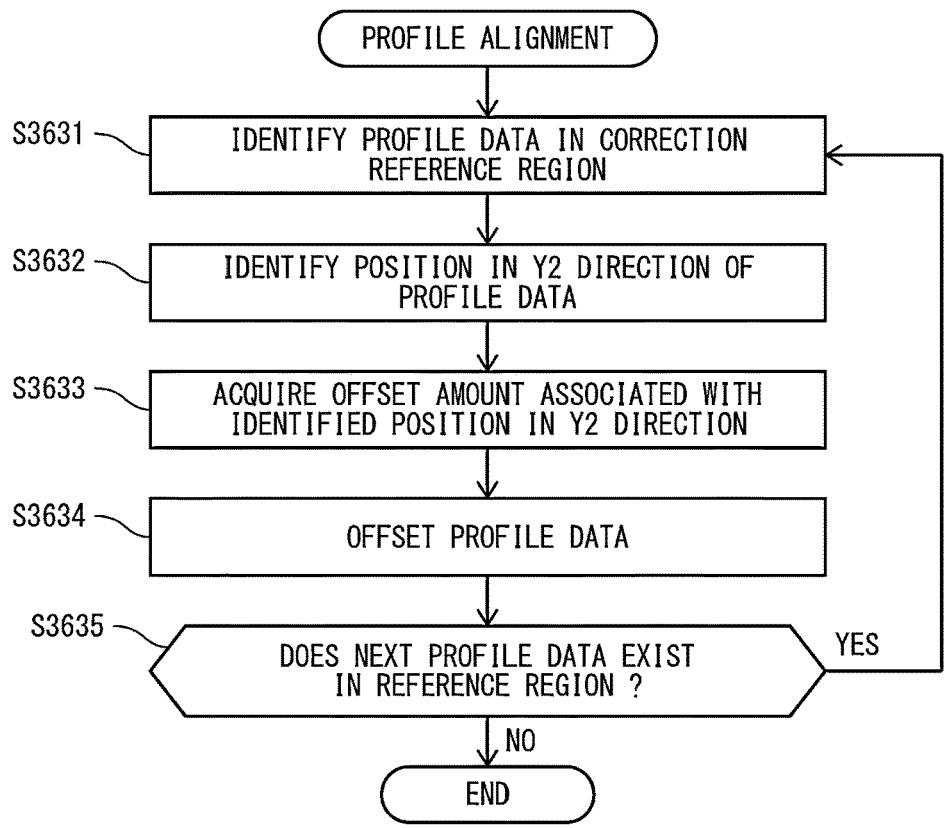

Subsequently, a profile alignment method illustrated in S2014 of FIG. 14B will be described with reference to a flowchart of FIG. 25B.

First, the height image generation unit 202 identifies the profile data Pd existing in the correction reference region Ar for one piece of profile data Pd acquired from the profile data generation unit 201 (Step S3631).

Next, the height image generation unit 202 identifies a position in the Y2 direction of the profile data Pd in the correction reference region Ar extracted in S3631 (Step S3632). The height image generation unit 202 may identify the position in the Y2 direction of the profile data Pd based on a line number of the profile data Pd during the setting and a line number of the profile data Pd during the operation.

Subsequently, the height image generation unit 202 acquires an offset amount corresponding to the position in the Y2 direction identified in S3632 from the correction setting unit 206b (Step S3633). When the height image generation unit 202 identifies the position in the Y2 direction of the profile data Pd based on the line number, an offset amount of the profile data Pd having a line number of 1 stored in the correction setting unit 206b can be used as an offset amount of the profile data Pd obtained first during the operation.

Then, the height image generation unit 202 offsets the one piece of profile data Pd by only the offset amount acquired in S3633 (Step S3634).

Then, the height image generation unit 202 determines whether the next profile data Pd exists in the correction reference region Ar (Step S3635), and repeats the processes of S3631 to S3634 when the next profile data Pd exists. When the next profile data does not exist, that is, when the offset of the profile data Pd is completed for all the profile data Pd in the correction reference region Ar, the profile alignment is ended.

Through the above processes of S3631 to S3635, profiles are aligned.

(Inclination Maintaining Function)

Figure 26:
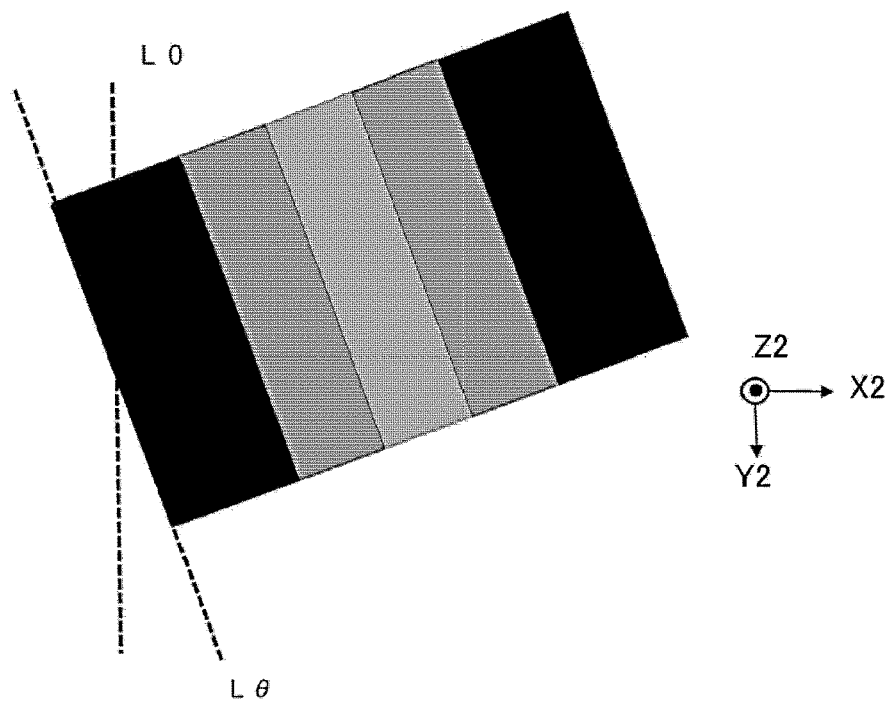
FIG. 26 is a view illustrating the inclination correction.

Although the case of using the average value of the plurality of characteristic points in the calculation of the reference X-position Xr and the reference Z-height Zr has been mainly described in the above description, the present embodiment is not limited thereto. As an example, a case where the measurement object S is scanned while being inclined with respect to the imaging head 100 will be described with reference to FIG. 26. In addition, it is assumed that the height image generation unit 202 extracts an edge point as a characteristic point. In this case, an X-position of the edge point extracted as the characteristic point by the height image generation unit 202 changes in the positive direction of the X2 direction as the measurement object S is scanned in the positive direction of the Y2 direction.

(Inclination Maintaining Function in X-Misalignment Correction)

The height image generation unit 202 extracts the edge points as the characteristic points from the plurality of pieces of profile data Pd in the correction reference region Ar. Then, the height image generation unit 202 calculates an approximate straight line of the edge points from the plurality of the extracted edge points by a known approximation method such as a least-squares method. When the approximate straight line calculated here is used as the reference X-position Xr, the height image generation unit 202 can execute the profile alignment while maintaining the inclination of the measurement object S. In this case, the edge points are aligned along a straight line Le illustrated in FIG. 26.

Note that it is also possible to execute the profile alignment without using such an inclination maintaining function. In this case, a straight line having an inclination of zero in the Y2 direction may be calculated from the plurality of extracted edge points. In this case, a straight line L0 having the inclination of zero in the Y2 direction can be used as the reference X-position Xr.

(Inclination Maintaining Function in Z-Misalignment Correction)

The height image generation unit 202 extracts characteristic points based on a height type set in advance as a correction parameter from the plurality of pieces of profile data Pd in the correction reference region Ar. Here, it is assumed that "bottom" is selected as the height type, which is one of the correction parameters, and the height image generation unit 202 extracts a bottom point as the characteristic point. The height image generation unit 202 calculates an approximate straight line of the bottom points from the plurality of extracted characteristic points by a known approximation method such as a least-squares method. When the approximate straight line calculated here is used as the reference Z-height Zr, the profile alignment can be executed while maintaining the inclination of the measurement object S.

Note that it is also possible to execute the profile alignment without using such an inclination maintaining function. In this case, a straight line having an inclination of zero in the Y2 direction may be calculated from the plurality of extracted bottom points. The straight line having the inclination of zero in the Y2 direction calculated here can be used as the reference Z-height Zr.

(Abnormality Point Removing Function)

Although the difference between the reference X-position Xr and the reference Z-height Zr and the characteristic point is defined as the offset amount in the above description, the present embodiment is not limited thereto. As an example, in a case where an offset amount calculated by the height image generation unit 202 for one characteristic point deviates from a predetermined threshold, the height image generation unit 202 may regard the one characteristic point as an abnormal point and interpolate the offset amount from offset amounts of the preceding and subsequent characteristic points.

In order to implement such an abnormality point removing function, for example, a threshold for determining whether it is an abnormality point may be set in the correction setting unit 206b in advance as a correction parameter. This threshold is a threshold in the X2 direction in the case of the X-misalignment correction, and is a threshold in the Z2 direction in the case of the Z-misalignment correction. When both the X-misalignment correction and the Z-misalignment correction are executed, both the threshold in the X2 direction and the threshold in the Z2 direction may be set.

When detecting that the threshold is set in the correction setting unit 206b, the height image generation unit 202 determines whether an offset amount calculated for one characteristic point deviates by the threshold set in the correction setting unit 206b or more. Then, when detecting the deviation equal to or greater than the threshold, the height image generation unit 202 interpolates the offset amount of the one characteristic point based on offset amounts of characteristic points before and after the one characteristic point. Note that, in such a case, the height image generation unit 202 can calculate the offset amount interpolated based on the offset amounts of the characteristic points immediately before or immediately after the one characteristic point, and the height image generation unit 202 can calculate the offset amount interpolated using a mathematical method such as averaging, internal division, and external division of offset amounts of a plurality of characteristic points.

Further, in a case where a plurality of characteristic points whose offset amounts deviate by the threshold or more to form a cluster, the height image generation unit 202 may offset the profile data Pd based on the offset amount deviating by the threshold or more without regarding the characteristic points included in the cluster as the abnormal points.

Note that a threshold in the rotation direction may be further settable as the above threshold. In this case, the correction amount of the inclination correction described above can be limited.

(Estimation of Reference Plane)

Although the reference X-position Xr and the reference Z-height Zr are calculated from the correction reference region Ar set on the height image in the above description, the present embodiment is not limited thereto. As an example, a case where the measurement object S moves on a reference plane RS provided with a regular three-dimensional pattern will be described. In this case, at least one of the reference X-position Xr and the reference Z-height Zr may be calculated based on the regularity of the three-dimensional pattern.

FIG. 27A is a view of the reference plane RS provided with the regular three-dimensional pattern as viewed from the X2 direction. The reference plane RS is formed by aligning repeating units Ru in the Y2 direction.

FIG. 27B is a view illustrating that the measurement object S moves in the movement direction A on the reference plane RS. The measurement object S has not flowed onto repeating units Ru1 and Ru2, and the measurement objects S are flowing on the rear side of a repeating unit Ru3. The movement direction of the measurement object is the positive direction of the Y2 direction as indicated by an arrow A.

The height image generation unit 202 detects the reference plane RS having the regularity of the repeating units Ru based on a plurality of pieces of profile data of the reference plane RS. Then, the height image generation unit 202 sets a height Rh of the reference plane RS as the reference height Zr in the correction setting unit 206b. Thereafter, the height image generation unit 202 offsets the profile data Pd in the Z2 direction based on an offset amount, which is a difference between a Z-height of a characteristic point extracted from one piece of the profile data and the reference Z-height. Then, the height image generation unit 202 can obtain the height image Hi indicating a shape of the measurement object S by arranging the profile data Pd, offset in the Z direction, in the Y2 direction.

(Combination of Plurality of Types of Correction)

Although the case where the profile data Pd is offset in the Z2 direction and the case where the profile data Pd is offset in the X2 direction have been mainly described in the above description, the present embodiment is not limited thereto. The height image generation unit 202 may offset the profile data Pd in the Z2 direction and the X2 direction, and may further offset the profile data Pd in the rotation direction.

In a case where the profile data Pd is offset in a plurality of directions in this manner, the correction reference region Ar2 in a second direction can follow a correction reference calculated from the correction reference region Ar1 in a first direction. That is, the correction reference region Ar1 in the first direction can be set in a fixed coordinate system with respect to the height image Hi, and the correction reference region Ar2 in the second direction can be set in a relative coordinate system with a measurement object as a reference.

Figure 28:
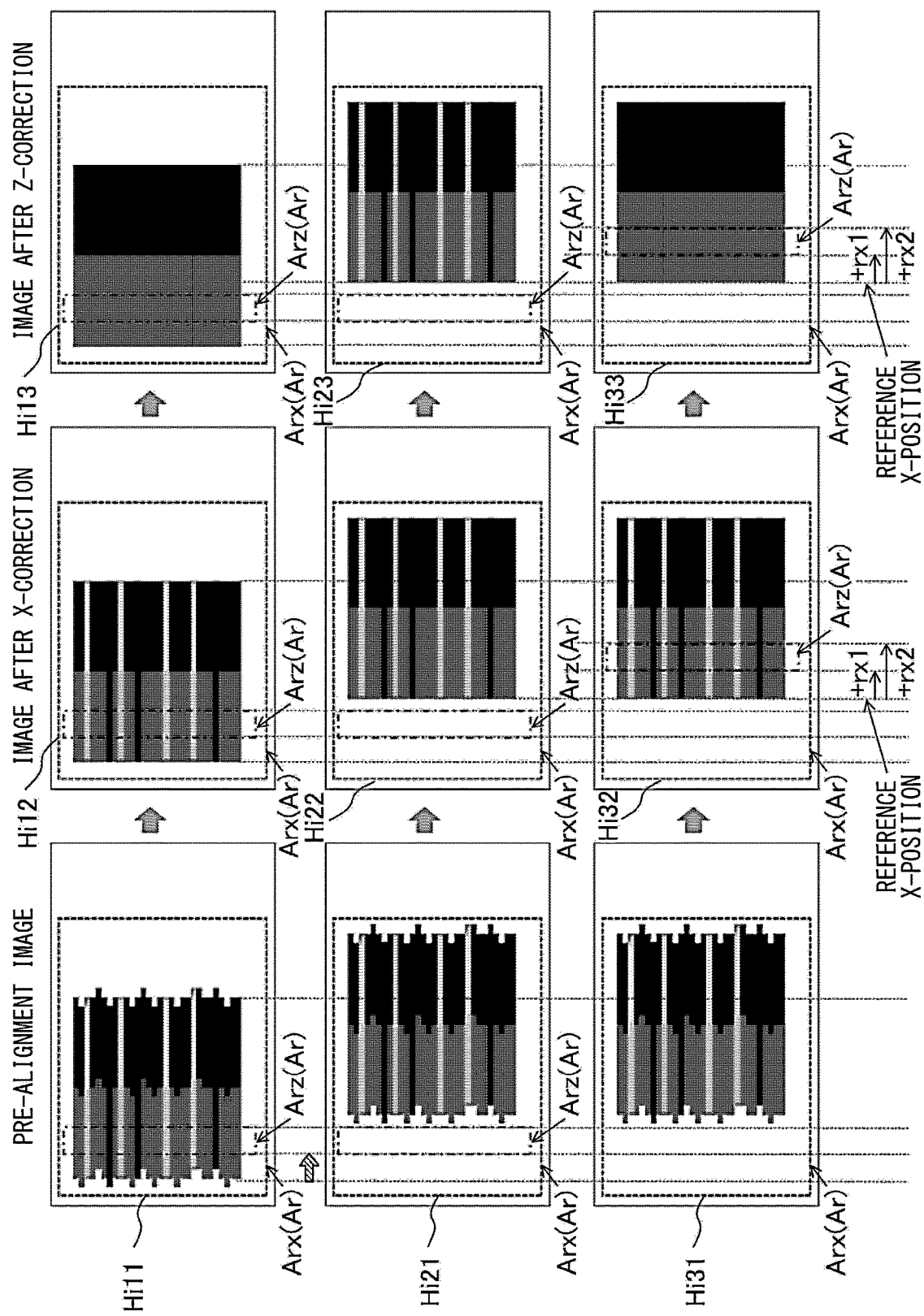
FIG. 28 is a view illustrating a case where a plurality of correction reference regions are set.

Views on the upper part of FIG. 28 illustrate a case where the X-misalignment correction and the Z-misalignment correction are sequentially applied to a pre-alignment height image. In addition, the correction reference region Ar1 in the first direction corresponds to the X-correction reference region Arx, and the correction reference region Ar2 in the second direction corresponds to the Z-correction reference region Arz. That is, the height image generation unit 202 acquires the X-correction reference region Arx from the correction setting unit 206b, and extracts edge points, which are characteristic points, from the pre-alignment height image. The height image generation unit 202 calculates the reference X-position Xr from the extracted edge points which are the characteristic points. Then, the height image generation unit 202 offsets the profile data Pd in the X2 direction such that X-positions of the characteristic points are aligned on a straight line in the Y2 direction to generate an X-correction height image.

Next, the height image generation unit 202 acquires the Z-correction reference region Arz from the correction setting unit 206b, and extracts characteristic points from the X-correction height image in which the profile data Pd is offset in the X2 direction. The characteristic point herein is extracted in accordance with a preset correction parameter such as a peak point and a bottom point. Then, the height image generation unit 202 calculates the Z-correction reference Zr from the extracted characteristic points. Thereafter, the height image generation unit 202 offsets the profile data Pd in the Z2 direction such that Z-heights of the characteristic points are aligned on a straight line in the Y2 direction to generate a height image for inspection.

Views on the middle part of FIG. 28 illustrate a case where a position of the measurement object S in the X2 direction is changed as compared with the case illustrated in the upper part of FIG. 28 and is captured by the imaging head 100.

In this case, the X-correction reference region Arx is set in a fixed coordinate system with respect to the height image Hi, but is set in a relatively wide range with respect to the measurement object S. Therefore, the height image generation unit 202 can extract characteristic points which are edge points, offset profile data in the X2 direction based on the edge points, and generate an X-correction height image similarly to the case illustrated in the upper part of FIG. 28.

On the other hand, the Z-correction reference region Arz is also set in the fixed coordinate system with respect to the height image Hi. In this case, as illustrated in a height image Hi22 in the middle part of FIG. 28, a relative position of the Z-correction reference region Arz with respect to the measurement object S is changed from a height image Hi12 in the upper part of FIG. 28 and deviates from the measurement object S as the position of the measurement object S is changed. As a result, the height image generation unit 202 extracts an erroneous characteristic point from the Z-correction reference region Arz. Then, the height image generation unit 202 generates a height image in which a displacement in the Z2 direction remains as illustrated in a height image Hi 23 in the middle part of FIG. 28. Note that the case where the Z-correction reference region Arz is out of the measurement object has been exemplified here for the sake of the description, an erroneous characteristic point may be extracted at least when there is a change from the case illustrated in the upper part of FIG. 28.

In order to prevent the generation of the height image in which the displacement remains in this manner, the Z-correction reference region Arz, which is the correction reference region Ar in the second direction, can follow the X-correction reference region Arx which is the correction reference region Ar1 in the first direction. That is, the correction reference region Ar2 in the second direction can be set in the relative coordinate system with the measurement object S as the reference. A case where the correction reference region Ar2 in the second direction is set in the relative coordinate system with the measurement object S as the reference in this manner is illustrated in the lower part of FIG. 28.

Views on the lower part of FIG. 28 illustrate the measurement object S in which a positional change occurs in the X2 direction similarly to the middle part of FIG. 28. The height image generation unit 202 extracts characteristic points which are edge points, calculates the reference X-position Xr based on the edge points, offsets profile data in the X2 direction, and generates the X-correction height image similarly to the case of the middle part of FIG. 28.

Next, the height image generation unit 202 sets the Z-correction reference region Arz, which is the correction reference region Ar2 in the second direction, following the reference X-position Xr. That is, the correction setting unit 206b receives a setting of the Z-correction reference region Arz in the relative coordinate system based on the measurement object S during the setting. In the case of the lower part of FIG. 28, the correction setting unit 206b can receive a range of +rx1 to +rx2 with respect to the reference X-position Xr as a range in the X2 direction of the Z-correction reference region Arz. Alternatively, the correction setting unit 206b can receive the setting of the Z-correction reference region Arz based on a position of the measurement object S included in the X-correction height image as a relative position with respect to the measurement object S. As a result, even when the position of the measurement object S in the X2 direction is changed and captured by the imaging head 100, the relative position of the Z-correction reference region Arz with respect to the measurement object S is maintained constant. As a result, the height image generation unit 202 can align the profile data Pd more accurately.

An alignment result in the case where the correction reference region Arz in the second direction is set to follow the correction reference calculated from the correction reference region Ar1 in the first direction or the measurement object S is illustrated in a height image Hi33 in the lower part of FIG. 28. Displacements in the X2 direction and the Z2 direction have been removed in the height image Hi33 in the lower part of FIG. 28 similarly to the height image Hi13 in the upper part of FIG. 28.

Although the Z-misalignment correction is applied after the X-misalignment correction is applied in the above description, the height image generation unit 202 can combine rotational correction to execute the alignment of the profile data Pd or can change the alignment order. The alignment order may be changed such that the X-misalignment correction is applied after the Z-misalignment correction is applied.

For example, in a case where a cable in which the same cylindrical shape extends in a certain direction is used as the measurement object S, the Z-misalignment correction and the X-misalignment correction can be applied in order of children. In this case, the correction reference region Ar1 in the first direction corresponds to the Z-correction reference region Arz, and the correction reference region Ar2 in the second direction corresponds to the X-correction reference region Arx. In addition, a correction reference calculated from the correction reference region Ar1 in the first direction corresponds to the reference Z-height Zr, and a height image obtained by offsetting the profile data Pd in the Z2 direction, which is the first direction, becomes a Z-correction height image.

First, the height image generation unit 202 extracts characteristic points from the preset Z-correction reference region Arz. In this example, a peak point is extracted as the characteristic point. Then, the height image generation unit 202 calculates the reference Z-height Zr from a plurality of the peak points extracted as the characteristic points. Thereafter, the height image generation unit 202 offsets the profile data Pd in the Z2 direction such that Z-heights of the characteristic points are aligned on a straight line in the Y2 direction to generate the Z-correction height image.

Next, the height image generation unit 202 sets the X-correction reference region Arx in a predetermined height region with respect to the Z-reference height Zr, such as a height region of −rz with respect to the reference Z-height Zr, and extracts edge points in the X-correction reference region Arx. That is, the X-correction reference region Arx may be set based on the reference Z-height Zr as a relative position with respect to the measurement object S. Then, the height image generation unit 202 calculates the reference X-position Xr of the profile data Pd based on the extracted edge points. Thereafter, the height image generation unit 202 offsets the profile data Pd in the X2 direction in accordance with a difference between an X-position of the edge point and the reference X-position Xr. As a result, an appropriate edge point is extracted regardless of the height at which the cable as the measurement object S is captured by the imaging head 100.

(Following of Correction Reference Region Ar)

It has been described that the correction reference region Ar is set with respect to the measurement object S on the height image generated by the height image generation unit 202 in the above description. The correction reference region Ar can be set in a relative positional relationship with respect to the measurement object S.

Specifically, the correction setting unit 206b receives the designation of the correction reference region Ar as a relative position with respect to the measurement object S.

Then, the height image generation unit 202 acquires the correction reference region Ar set in the correction setting unit 206b.

Next, the height image generation unit 202 identifies a position of the measurement object S from the height image Hi obtained during the operation. The position of the measurement object S can be identified using, for example, pattern analysis of the height image Hi, contour information, gradation variation information, and the like.

Then, the height image generation unit 202 sets the correction reference region Ar based on the identified position of the measurement object S.

As a result, the correction reference region Ar can be accurately set for the measurement object S flowing on the belt conveyor C in various directions without adjusting the direction of the measurement object S in advance.

(Automatic Alignment Function)

Although the case where the correction reference region Ar is set in advance has been described in the above description, this procedure may be omitted. A case where the profile alignment is automatically performed without setting the correction reference region Ar will be described.

The height image generation unit 202 offsets each of a plurality of pieces of profile data Pd so as to reduce a difference between the plurality of pieces of profile data Pd generated by the profile data generation unit 201.

Specifically, the height image generation unit 202 compares reference profile data to be subjected to the correction amount calculation, with referred profile data, which is used to calculate a correction amount, to calculate a difference while moving the profile data a plurality of times.

First, the height image generation unit 202 moves the reference profile data in the X2 direction by a first amount. In this state, the height image generation unit 202 calculates differences from the referred profile data for the respective X-coordinates of the reference profile data. Then, the height image generation unit 202 obtains an average value or a total value of the differences calculated for the respective X-coordinates.

Next, the height image generation unit 202 moves the reference profile data in the X2 direction by a second amount. Even in this state, the height image generation unit 202 calculates differences from the referred profile data for the respective X-coordinates of the reference profile data, and obtains an average value or a total value of the differences calculated for the respective X-coordinates.

The height image generation unit 202 calculates a plurality of the average values or the total values by repeating the movement of the reference profile data. Then, the height image generation unit 202 can calculate a movement amount by which the calculated value becomes small as the correction amount in the X2 direction.

Note that profile data immediately before or after the reference profile data can be used as the referred profile data. That is, the correction amount is calculated for each piece of the profile data so as to reduce a displacement of one piece of the profile data from the preceding or subsequent profile data.

Here, the method of calculating the correction amount by moving the profile data a plurality of times in the X2 direction has been described, but the height image generation unit 202 can also calculate an offset amount in the Z2 direction and a correction amount in the rotation direction in the same manner.

That is, the height image generation unit 202 moves the reference profile data to obtain a matching degree with the referred profile data. Then, the height image generation unit 202 calculates a correction amount so as to increase the matching degree between the reference profile data and the referred profile data, and moves the reference profile data based on the correction amount.

As a result, it is unnecessary for the user to perform a preliminary setting, and the alignment between the pieces of profile data Pd can be performed by correcting each of the plurality of pieces of profile data Pd so as to reduce the difference between the pieces of profile data.

[2] Second Embodiment

Figure 29:
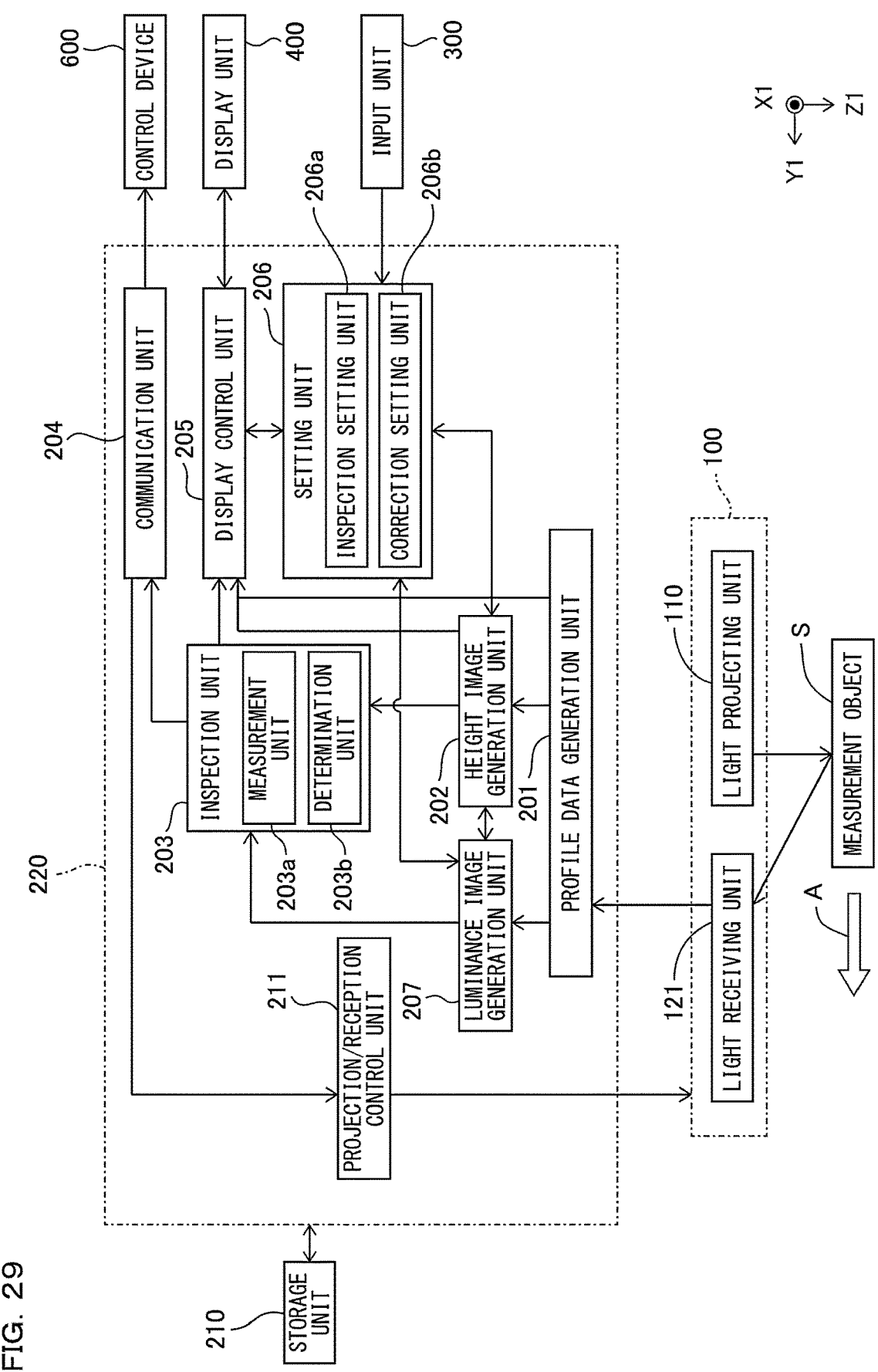
FIG. 29 is a block diagram illustrating a configuration of a processing device according to a second embodiment of the present invention.

A difference between a shape inspection device 500 according to a second embodiment of the present invention and the shape inspection device 500 according to the first embodiment will be described. FIG. 29 is a block diagram illustrating a configuration of the control unit 220 of the optical displacement measurement system 500 according to the second embodiment. As illustrated in FIG. 29, the control unit 220 further includes a luminance image generation unit 207 as a functional unit in addition to the functional units included in the first embodiment. The control unit 220 receives a profile alignment setting according to the second embodiment. The profile alignment setting according to the second embodiment will be described hereinafter.

The profile data generation unit 201 generates profile data Pd corresponding to each position in the Y2 direction of the moving measurement object S based on a light reception signal output from the light receiving unit 121. In addition, the profile data generation unit 201 can also output the generated profile data Pd to the luminance image generation unit 207.

The luminance image generation unit 207 arranges a plurality of pieces of the profile data Pd generated by the profile data generation unit 201 in the Y2 direction to generate the luminance image Ii of the measurement object S. Since the luminance image Ii has been described with reference to FIGS. 6 to 7B, details thereof are omitted, but the luminance image Ii is generated by arranging the peak luminance values Iij respectively associated with points defined by the positions xi and yj in the Y2 direction.

In profile alignment according to the second embodiment, the correction setting unit 206b receives a setting of the correction reference region Ar on the luminance image Ii instead of the height image Hi. The alignment setting using the luminance image Ii in this manner can be used in a case of inspecting the measurement object S having different colors. The alignment setting using the luminance image Ii will be described with reference to FIGS. 15A and 15B.

In the alignment setting using the height image Hi, the correction setting unit 206b receives the designation of the height as the edge level which is one of the correction parameters. In the alignment setting using the luminance image Ii, the correction setting unit 206b receives selection of a luminance image as an edge extraction target in the edge selection field 1202. In addition, the correction setting unit 206b receives the designation of a luminance value, instead of the height, as an edge level in the edge level setting field 1203.

The height image generation unit 202 acquires the luminance value set as the edge level from the correction setting unit 206b. In addition, the height image generation unit 202 acquires the luminance image Ii generated by the luminance image generation unit 207. Then, the height image generation unit 202 extracts characteristic points from the luminance image Ii based on the luminance value acquired from the correction setting unit 206b. When the characteristic points are extracted by the height image generation unit 202 with respect to the plurality of pieces of profile data Pd constituting the luminance image Ii, the height image generation unit 202 calculates the reference X-position Xr, which is a correction reference, based on the plurality of characteristic points. Then, the height image generation unit 202 offsets each piece of the profile data Pd in accordance with an offset amount which is a difference between the reference X-position Xr and an X-position of the characteristic point. Then, the height image generation unit 202 arranges pieces of the profile data Pd in the Y2 direction to generate a height image for inspection in which a displacement between the plurality of pieces of profile data Pd whose positions in the Y2 direction are different is reduced.

The above-described embodiments are merely examples in all respects, and should not be construed as limiting. Further, all modifications and changes belonging to the equivalent range of the claims fall within the scope of the present aspect.

As described above, the present invention can be used, for example, in the case of inspecting a shape of a measurement object moved at a constant speed by a belt conveyor or the like.

What is claimed is:

1. A shape inspection device comprising:
   a light projector that irradiates a measurement object relatively moving in a direction of a Y axis, which intersects with an X axis, with slit light spreading in a direction of the X axis or spot light scanning in the X-axis direction;
   a light receiver that receives reflected light from each position in the X-axis direction and outputs a light reception signal indicating a light receiving amount;
   a profile data generation unit that generates profile data of the measurement object in a plane intersecting with the Y-axis direction based on the light reception signal;
   an inspection unit that inspects a shape of the measurement object based on the profile data generated by the profile data generation unit;
   a height image generation unit that sequentially acquires the profile data of the measurement object relatively moving in the Y-axis direction and generates a height image of the measurement object based on a plurality of pieces of the sequentially acquired profile data;
   a display controller that causes a display to display a height image for a setting generated by the height image generation unit; and
   a setting unit that receives a setting of a two-dimensional region, which extends in the direction corresponding to the Y axis as a correction reference region, on the height image for a setting displayed on the display,
   wherein the height image generation unit further
   identifies profile data included in the correction reference region and calculates an inclination value of the profile data for each of the pieces of profile data generated by the profile data generation unit, and
   corrects the height image by moving each of the pieces of profile data in a rotation direction in a plane, which intersects with the direction corresponding to the Y axis, based on a difference between the calculated inclination value and a predetermined correction reference angle.

2. The shape inspection device according to claim 1, wherein
   the setting unit
   receives an inclination value of one piece of the profile data included in the correction reference region as the correction reference angle, and
   dynamically stores the correction reference angle in accordance with an inclination value of the measurement object for each of the height images for inspection.

3. The shape inspection device according to claim 1, wherein
   the height image generation unit arranges the pieces of profile data, offset in the rotation direction and generates the height image representing a three-dimensional shape of the measurement object.

4. The shape inspection device according to claim 1, wherein
   the setting unit receives an input of an angle and sets the input angle as the correction reference angle.

5. The shape inspection device according to claim 1, wherein
   the height image generation unit projects the profile data along a straight line relative to the correction reference angle so as to correct the height image by moving each of the pieces of profile data in a rotation direction in a plane.

6. The shape inspection device according to claim 1, wherein
   the height image generation unit rotates the profile data in accordance with the difference between the calculated inclination value and a predetermined correction reference angle so as to correct the height image by moving each of the pieces of profile data in a rotation direction in a plane.

7. The shape inspection device according to claim 1, wherein
   wherein the height image generation unit further
   extracts a characteristic point included in the correction reference region for each of the pieces of profile data generated by the profile data generation unit, and
   corrects the height image by moving each of the pieces of profile data in a plane intersecting with a direction corresponding to the Y axis based on positions of a plurality of the extracted characteristic points.

* * * * *